US010907308B2

(12) United States Patent
Barnholtz et al.

(10) Patent No.: US 10,907,308 B2
(45) Date of Patent: Feb. 2, 2021

(54) MULTI-PLY FIBROUS STRUCTURE-CONTAINING ARTICLES

(71) Applicant: The Procter & Gamble Company, Cincinnati, OH (US)

(72) Inventors: Steven Lee Barnholtz, West Chester, OH (US); Christopher Michael Young, Loveland, OH (US); Timothy James Klawitter, Mason, OH (US); James Roy Denbow, Mason, OH (US); Michael Gomer Stelljes, Mason, OH (US); Michael Donald Suer, Colerain Township, OH (US); Jeffrey Glen Sheehan, Symmes Township, OH (US); Paul Dennis Trokhan, Hamilton, OH (US); Kathryn Christian Kien, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 192 days.

(21) Appl. No.: 16/108,168

(22) Filed: Aug. 22, 2018

(65) Prior Publication Data

US 2019/0063003 A1 Feb. 28, 2019

Related U.S. Application Data

(60) Provisional application No. 62/548,708, filed on Aug. 22, 2017.

(51) Int. Cl.
| | | |
|---|---|---|
| *D21H 27/40* | (2006.01) |
| *D21H 27/00* | (2006.01) |
| *D21H 25/00* | (2006.01) |
| *D21H 27/38* | (2006.01) |
| *D21H 27/02* | (2006.01) |
| *D21H 27/30* | (2006.01) |
| *B31F 1/07* | (2006.01) |
| *D21F 11/00* | (2006.01) |
| *D21F 11/08* | (2006.01) |
| *D21H 15/10* | (2006.01) |
| *B31F 5/00* | (2006.01) |
| *B32B 3/28* | (2006.01) |
| *B32B 5/02* | (2006.01) |
| *B32B 29/02* | (2006.01) |
| *D01D 5/098* | (2006.01) |
| *B32B 3/30* | (2006.01) |
| *B32B 5/26* | (2006.01) |
| *B32B 7/12* | (2006.01) |
| *B32B 29/00* | (2006.01) |
| *B32B 37/06* | (2006.01) |
| *B32B 37/12* | (2006.01) |

(52) U.S. Cl.
CPC ............ *D21H 27/40* (2013.01); *B31F 1/07* (2013.01); *B31F 5/00* (2013.01); *D21F 11/006* (2013.01); *D21F 11/08* (2013.01); *D21H 15/10* (2013.01); *D21H 25/005* (2013.01); *D21H 27/002* (2013.01); *D21H 27/007* (2013.01); *D21H 27/008* (2013.01); *D21H 27/02* (2013.01); *D21H 27/30* (2013.01); *D21H 27/38* (2013.01); *B31F 2201/0738* (2013.01); *B31F 2201/0761* (2013.01); *B32B 3/28* (2013.01); *B32B 3/30* (2013.01); *B32B 5/022* (2013.01); *B32B 5/26* (2013.01); *B32B 7/12* (2013.01); *B32B 29/005* (2013.01); *B32B 29/02* (2013.01); *B32B 37/065* (2013.01); *B32B 37/12* (2013.01); *B32B 2250/20* (2013.01); *B32B 2250/40* (2013.01); *B32B 2307/54* (2013.01); *B32B 2307/546* (2013.01); *B32B 2307/726* (2013.01); *B32B 2307/728* (2013.01); *B32B 2323/10* (2013.01); *B32B 2554/00* (2013.01); *B32B 2555/00* (2013.01); *D01D 5/0985* (2013.01)

(58) Field of Classification Search
USPC ........................................................ 162/123
See application file for complete search history.

(56) References Cited

U.S. PATENT DOCUMENTS

| | | |
|---|---|---|
| 7,311,800 B2 | 12/2007 | Russell et al. |
| 7,524,399 B2 | 4/2009 | Hermans et al. |
| 7,828,932 B2 | 11/2010 | Hermans et al. |
| 2005/0067126 A1 | 3/2005 | Horenziak et al. |
| 2007/0207293 A1 | 9/2007 | Santiago |
| 2010/0030174 A1 | 2/2010 | Buschur et al. |
| 2013/0302566 A1 | 11/2013 | Barnholtz et al. |
| 2016/0355950 A1 | 12/2016 | Young et al. |

FOREIGN PATENT DOCUMENTS

| | | |
|---|---|---|
| WO | WO 96/09435 A1 | 3/1996 |
| WO | WO-2010/021572 A1 | 2/2010 |

OTHER PUBLICATIONS

PCT International Search Report dated Nov. 27, 2018—5 pages.
All Office Actions U.S. Appl. No. 16/108,168.

*Primary Examiner* — Mark Halpern
(74) *Attorney, Agent, or Firm* — C. Brant Cook

(57) ABSTRACT

Articles, for example multi-ply fibrous structure-containing articles such as multi-ply sanitary tissue products, containing two or more fibrous structure plies, and more particularly to multi-ply articles containing two or more fibrous structure plies having a plurality of fibrous elements wherein the articles exhibit improved bulk and absorbent properties compared to known articles and methods for making same, are provided.

20 Claims, 22 Drawing Sheets

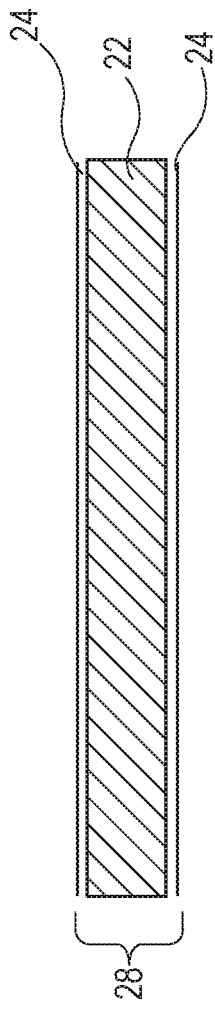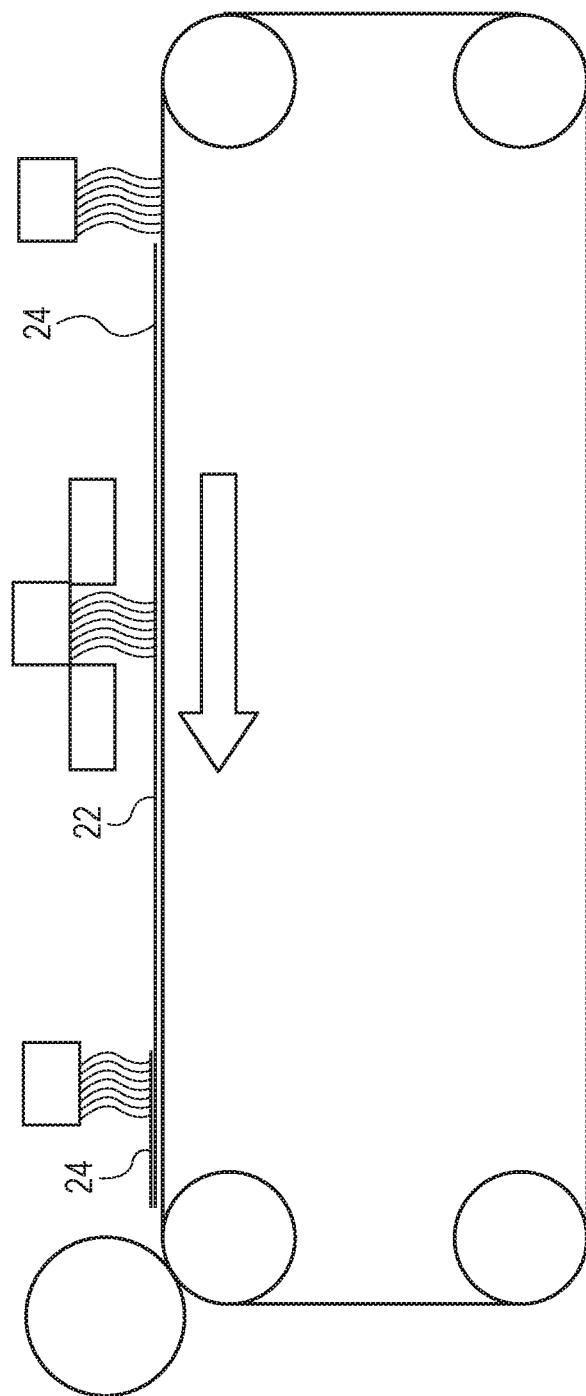

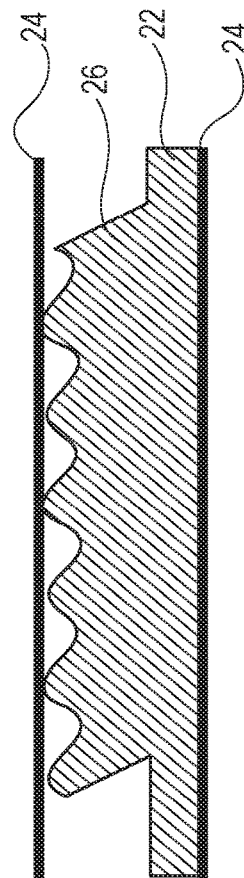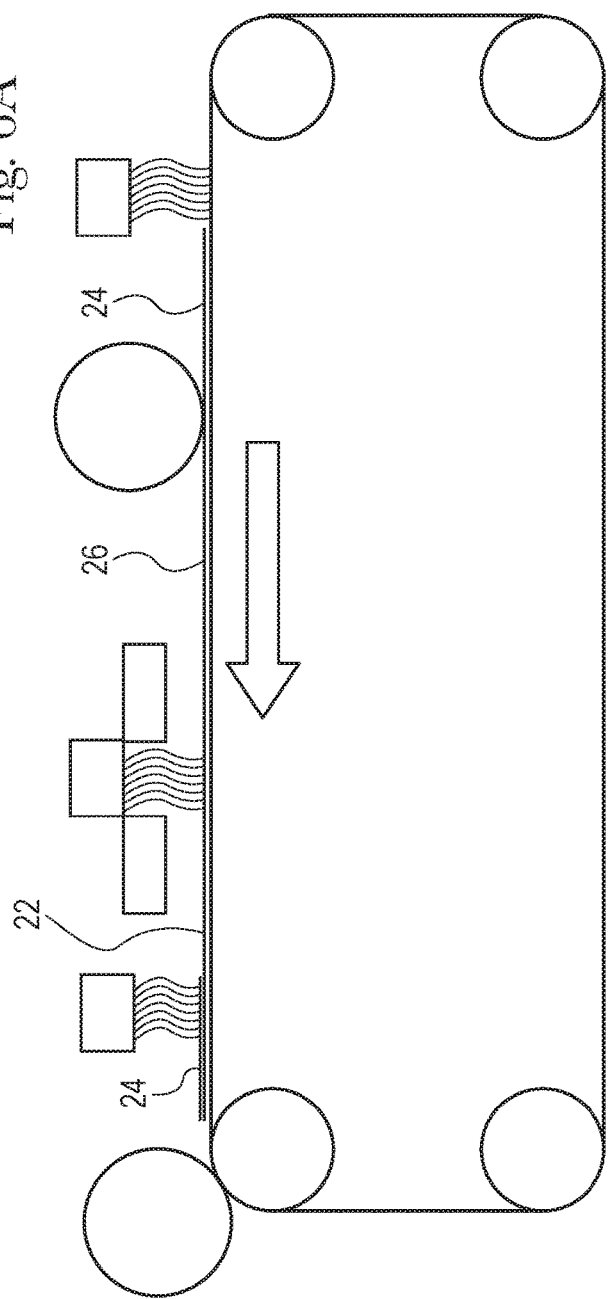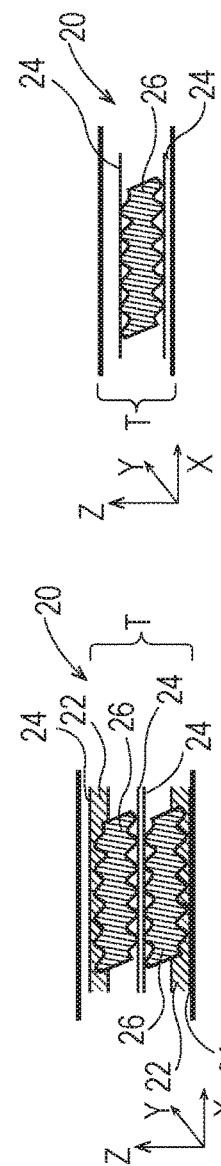

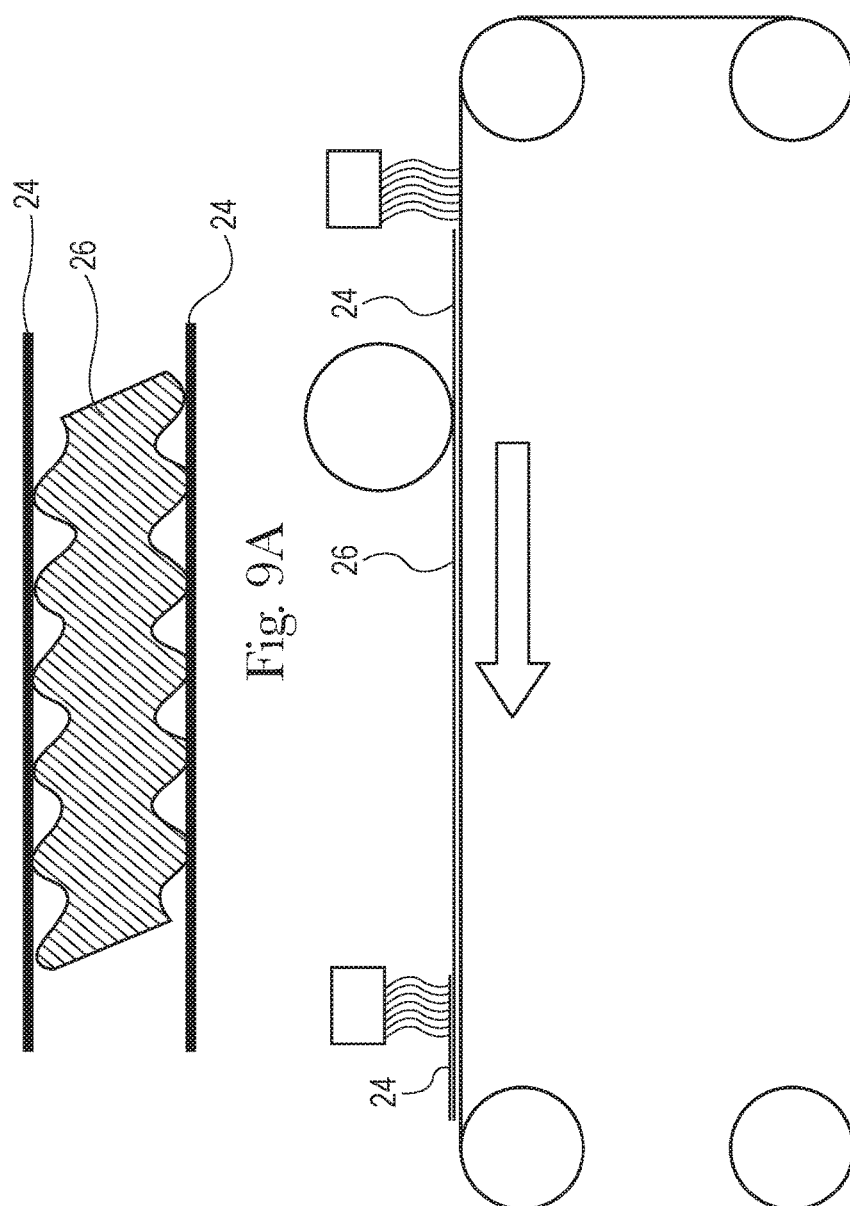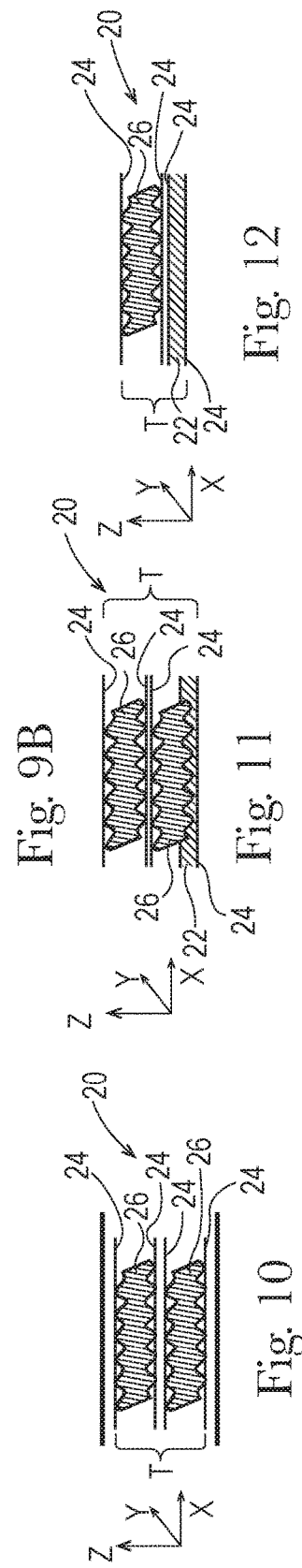

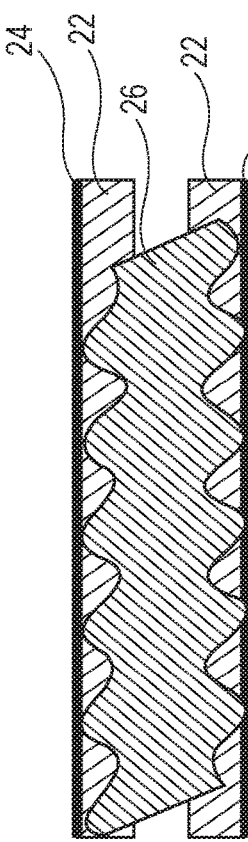
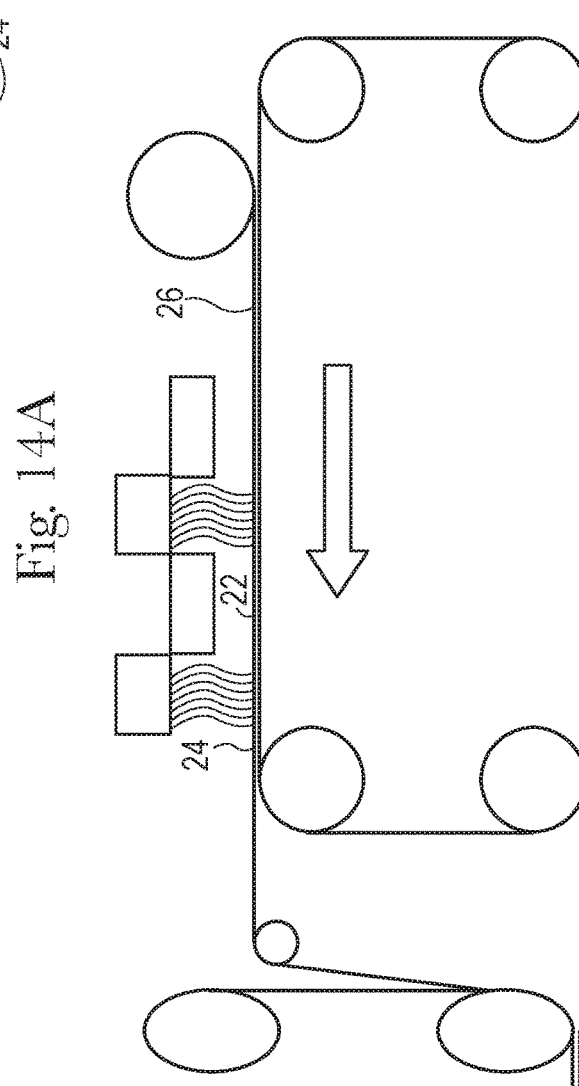
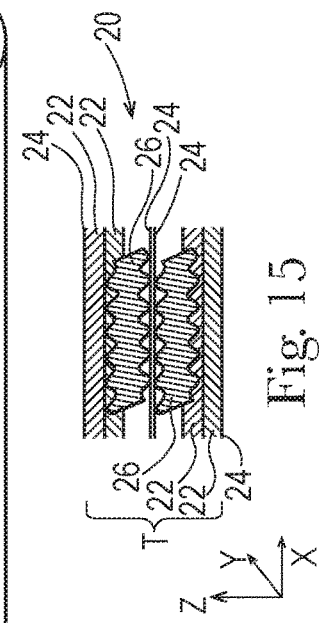
Fig. 14A
Fig. 14B
Fig. 13
Fig. 15

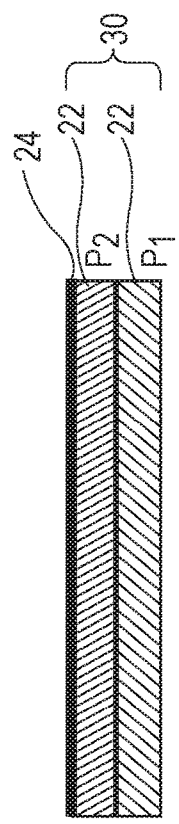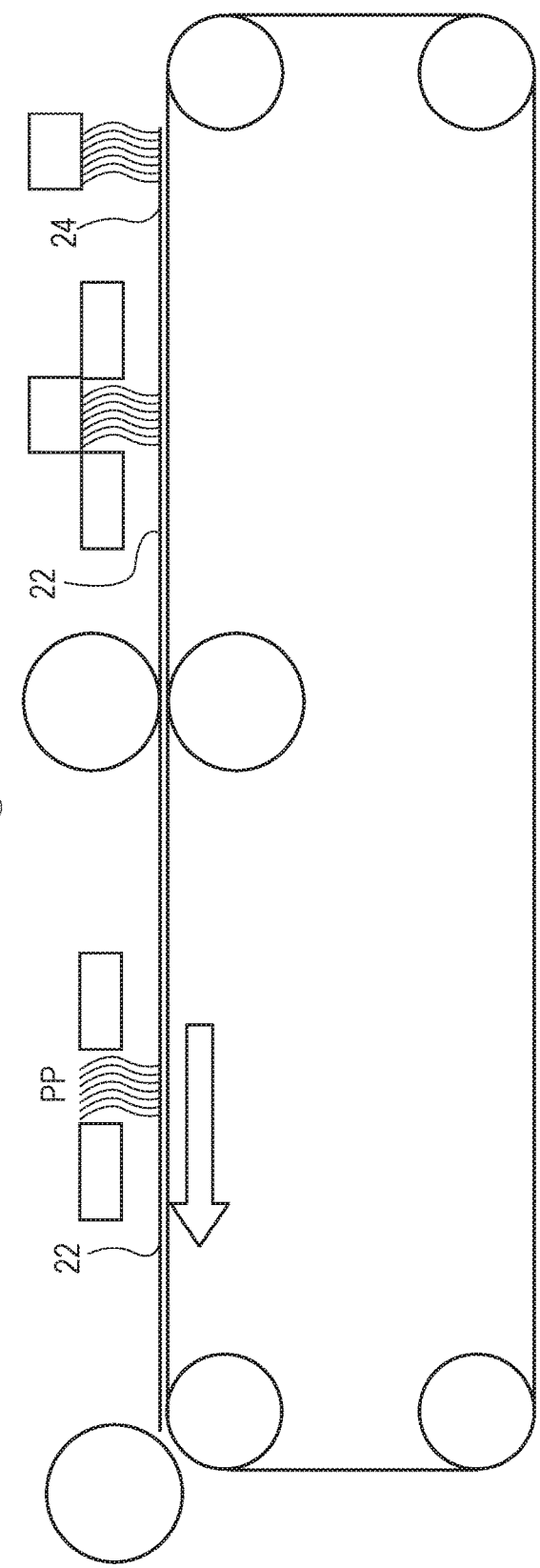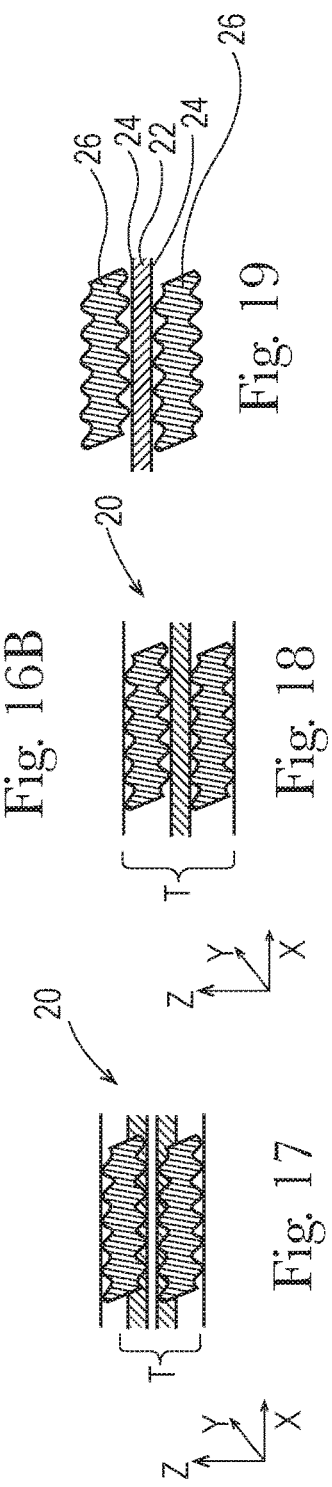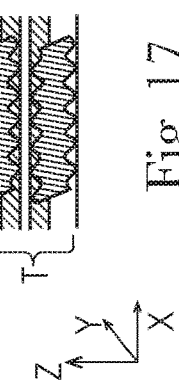

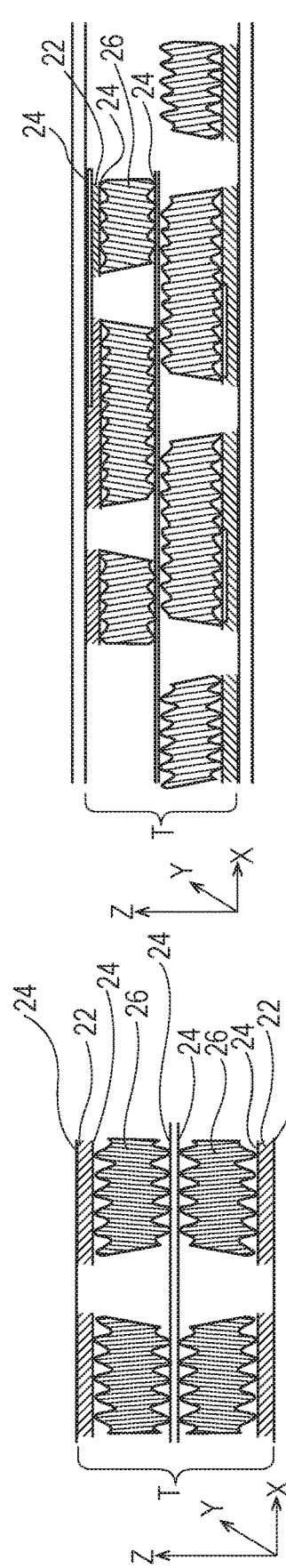
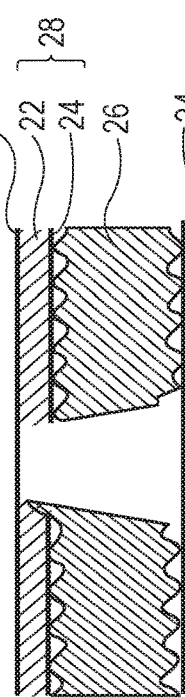
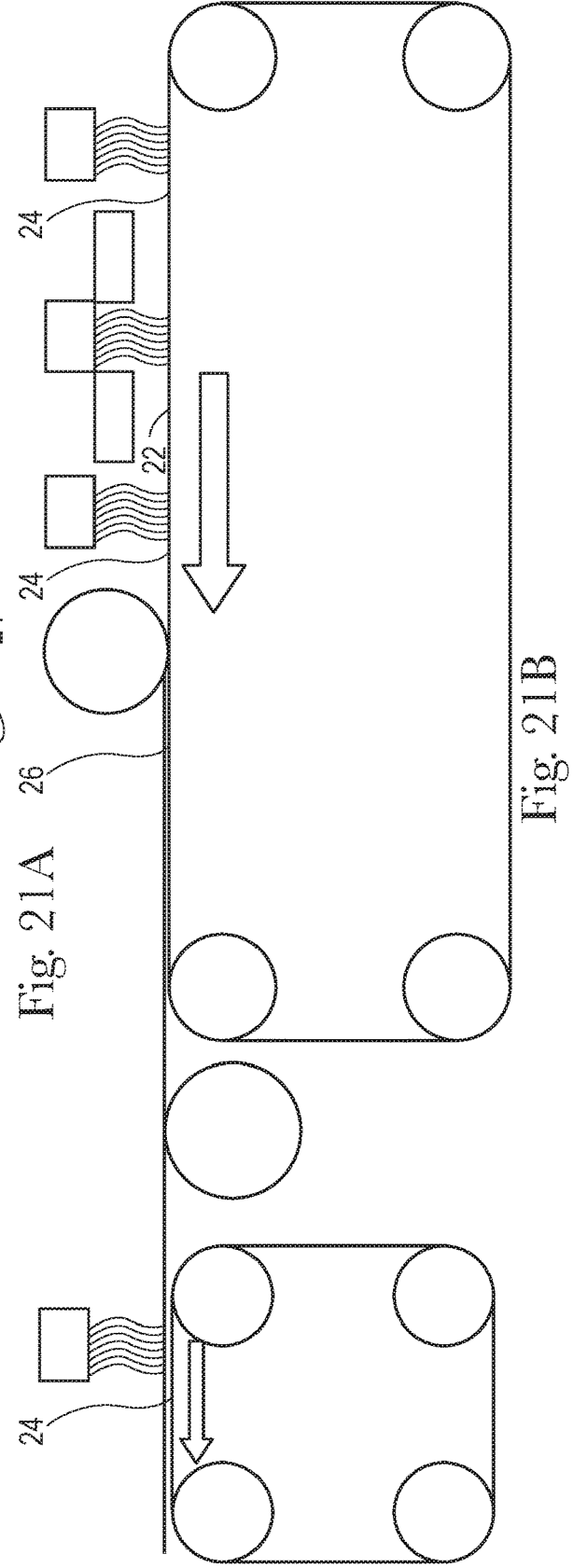

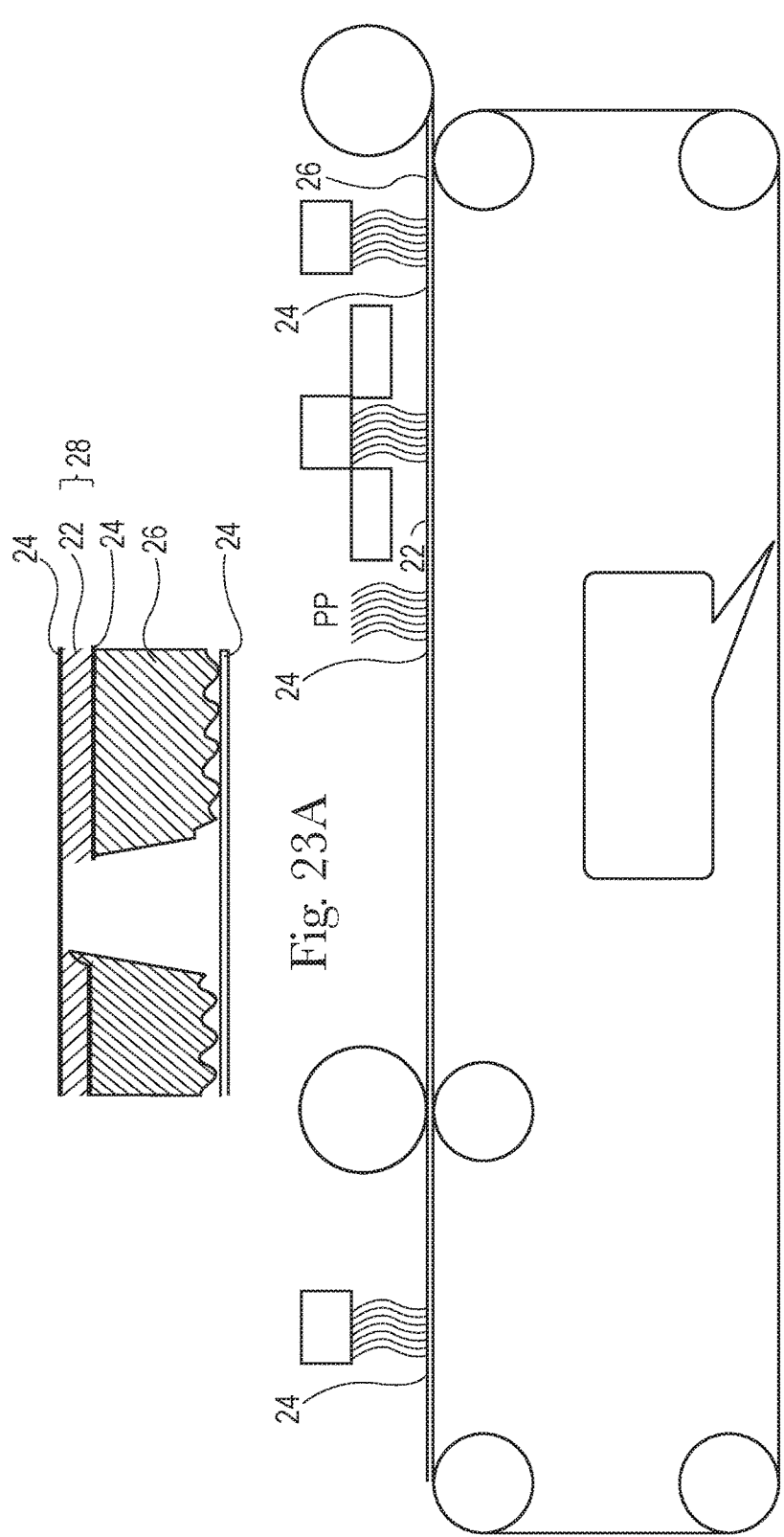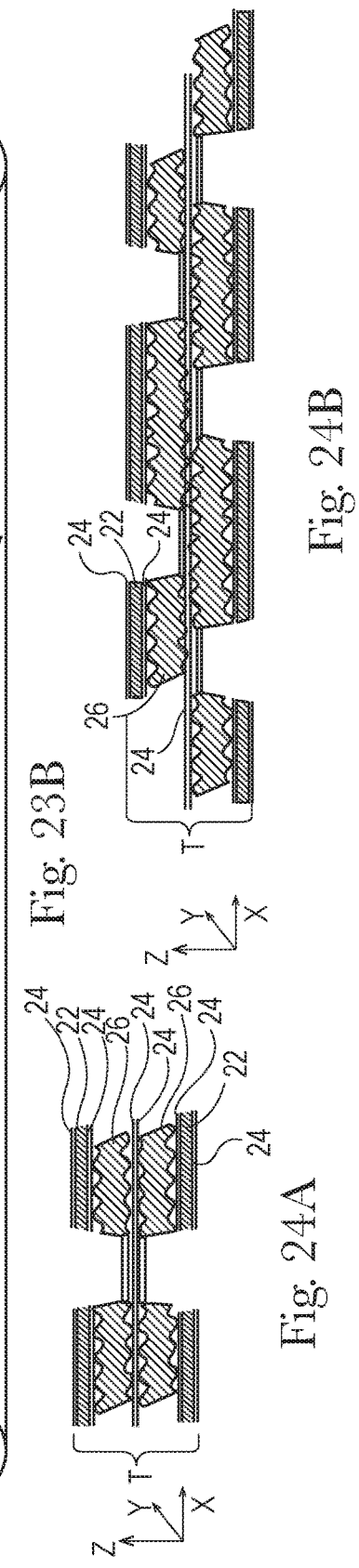
Fig. 23A
Fig. 23B
Fig. 24A
Fig. 24B

MULTI-PLY FIBROUS STRUCTURE-CONTAINING ARTICLES

FIELD OF THE INVENTION

The present invention relates to articles, for example multi-ply fibrous structure-containing articles such as multi-ply sanitary tissue products, comprising two or more fibrous structure plies, and more particularly to multi-ply articles comprising two or more fibrous structure plies comprising a plurality of fibrous elements wherein the articles exhibit improved bulk and absorbent properties compared to known articles and methods for making same.

BACKGROUND OF THE INVENTION

Consumers of articles, such as sanitary tissue products, for example paper towels, desire improved roll bulk and/or wet and/or dry sheet bulk compared to known sanitary tissue products, especially paper towels, without negatively impacting the softness and/or stiffness and/or flexibility of the sanitary tissue product. In the past, in order to achieve greater roll bulk and/or wet and/or dry sheet bulk in sanitary issue products, such as paper towels, the softness and/or stiffness and/or flexibility of the sanitary tissue products was negatively impacted.

Consumers of articles, such as sanitary tissue products, for example paper towels, desire improved absorbency compared to known sanitary tissue products, especially paper towels, without negatively impacting the softness and/or stiffness and/or flexibility of the sanitary tissue product. In the past, in order to achieve greater absorbency in sanitary issue products, such as paper towels, the softness and/or stiffness and/or flexibility of the sanitary tissue products were negatively impacted.

Consumers of articles, such as sanitary tissue products, for example paper towels, desire improved absorbency compared to known sanitary tissue products, especially paper towels, without negatively impacting the strength of the sanitary tissue product. In the past, in order to achieve greater absorbency in sanitary issue products, such as paper towels, the strength of the sanitary tissue products was negatively impacted.

Consumers of articles, such as sanitary tissue products, for example paper towels, desire improved hand protection during use as measured according to the Hand Protection Test Method described herein compared to known sanitary tissue products, especially paper towels, without negatively impacting absorbency. In the past, in order to achieve greater hand protection in sanitary issue products, such as paper towels, the absorbency of the sanitary tissue products was negatively impacted.

Consumers of articles, such as sanitary tissue products, for example paper towels, desire improved roll bulk and/or wet and/or dry sheet bulk compared to known sanitary tissue products, especially paper towels, without negatively impacting the opacity of the sanitary tissue product. In the past, in order to achieve greater roll bulk and/or wet and/or dry sheet bulk in sanitary issue products, such as paper towels, the opacity of the sanitary tissue products was negatively impacted.

Consumers of articles, such as sanitary tissue products, for example paper towels, desire improved reopenability during use as measured by the Wet Web-to-Web CoF (Coefficient of Friction) Test Method described herein compared to known sanitary tissue products, especially paper towels, without negatively impacting absorbency. In the past, in order to achieve improved reopenability in sanitary issue products, such as paper towels, the absorbency of the sanitary tissue products was negatively impacted.

Consumers of articles, such as sanitary tissue products, for example paper towels, desire improved absorbency, especially absorbent capacity, compared to known sanitary tissue products, especially paper towels, without negatively impacting the surface drying of the sanitary tissue product. In the past, in order to achieve greater absorbency in sanitary issue products, such as paper towels, the surface drying of the sanitary tissue products was negatively impacted.

Consumers of articles, such as sanitary tissue products, for example paper towels, desire improved wet sheet bulk during use, compared to known sanitary tissue products, especially paper towels, without negatively impacting the surface drying of the sanitary tissue product. In the past, in order to achieve greater wet sheet bulk in sanitary issue products, such as paper towels, the surface drying of the sanitary tissue products was negatively impacted.

In the past, fibers, such as cellulose pulp fibers, have been used in known fibrous structures to achieve bulk and absorbency properties in articles, such as sanitary tissue products, for example paper towels, but such bulk and absorbency properties have been plagued with negatives as described above, such as softness and/or flexibility and/or stiffness negatives and/or the ability to maintain the bulk properties when wet. Examples of such known articles comprising such fibrous structures are described below.

Articles comprising fibrous structures comprising a plurality of fibrous elements, for example filaments and fibers are known in the art. For example, one such prior art article 10 comprising a fibrous structure comprising a plurality of fibrous elements (filaments and/or fibers) as shown in Prior Art FIG. 1 comprises a meltblown or spunbond polymeric abrasive layer 12 and an absorbent layer 14, such as a wet-laid fibrous structure, a coform fibrous structure, or an air-laid fibrous structure. However, such known articles, for example multi-ply fibrous structure-containing articles that may exhibit embossments that result in the multi-ply fibrous structure articles having a Core Height Value (MikroCAD Value) of greater than 0.60 mm as measured according to the Surface Texture Analysis Test Method do not exhibit the properties of the multi-ply fibrous structure-containing articles of the present invention because they are not bonded together via a water-resistant bond and therefore the height of the embossments are significantly reduced upon wetting of the prior art articles.

Accordingly, there is a need for articles comprising fibrous structures that exhibit improved bulk and/or absorbent properties that are consumer acceptable that maintain sufficient bulk properties when wet during use by consumers and/or without negatively impacting the softness and/or flexibility and/or stiffness of such articles and/or with improving the softness and/or flexibility and/or stiffness of such articles and methods for making same.

SUMMARY OF THE INVENTION

The present invention fulfills the need described above by providing articles comprising two or more fibrous structure plies that exhibit improved bulk and/or absorbent properties that are consumer acceptable while still maintaining such bulk properties when wet and/or without negatively impacting the softness and/or flexibility and/or stiffness of such articles and/or with improving the softness and/or flexibility and/or stiffness of such articles and methods for making same.

One solution to the problem identified above are sided articles, such as sanitary tissue products, for example paper towels, that comprise two or more fibrous structure plies bonded together via a water-resistant bond that utilize a plurality of fibrous elements, such as filaments and/or fibers, wherein at least one of the fibrous structure plies comprises embossments, for example embossments that exhibit an embossment height such that the multi-ply fibrous structure-containing article exhibits a Core Height Value (MikroCAD Value) of greater than 0.60 mm and/or greater than 0.75 mm and/or greater than 0.90 mm and/or greater than 1.00 mm and/or greater than 1.10 mm and/or greater than 1.20 mm and/or greater than 1.30 mm and/or greater than 1.40 mm and/or greater than 1.50 mm and/or greater than 1.60 mm and/or greater than 1.70 mm as measured according to the Surface Texture Analysis Test Method described herein, wherein the embossed fibrous structure ply is bonded to at least one other fibrous structure ply via one or more and/or two or more and/or a plurality of water-resistant bonds (for example thermal bonds and/or water-resistant adhesive bonds) such that a void volume is created between the two fibrous structure plies at the embossments and such that the articles exhibit improved bulk and/or absorbent properties compared to known fibrous structure-containing articles.

It has unexpectedly been found that the arrangement of the multi-ply fibrous structure plies of the present invention within the articles of the present invention and/or type of fibrous structures and/or type of fibrous elements, for example filaments and/or fibers, within the articles of the present invention result in the article of the present invention exhibiting novel properties, such as bulk and/or absorbent properties without negatively impacting the softness and/or flexibility and/or stiffness of the articles.

Palindromic multi-ply fibrous structure-containing articles (A:A, Ab:bA, A:B:A, etc.) where both exterior sides, for example the one or more functional sides, such as a side of the multi-ply fibrous structure-containing article, that a consumer uses to contact a surface during cleaning a surface and/or absorbing a spill off a surface, of the multi-ply fibrous structure-containing articles are known. Their symmetrical nature, however, limits the multi-ply fibrous structure-containing articles because they cannot have their individual sides attuned to different properties, such as absorbency (measured according to the various absorbency test methods described herein), surface feel (measured according to the Emtec Test Method described herein), hand protection (measured according to the Hand Protection Test Method described herein), and/or Reopenability (measured according to the Web-to-Web CoF Test Method described herein).

It has been unexpectedly found by the inventors that by independently controlling and/or designing the characteristics/properties of each functional side of the multi-ply fibrous structure-containing article of the present invention to be different, consumers desire such multi-ply fibrous structure-containing articles compared to the known multi-ply fibrous structure-containing articles. These characteristic/property differences between the two functional sides results topographic (i.e., texture differences, thickness differences, thickness resiliency even when wet) differences and/or compositional (pulp fibers (airlaid and wet laid pulp fibers), synthetic staple fibers, filaments, for example continuous filaments).

For clarity purposes, one non-limiting example of a topographically different (non-palindromic, different functional sides) multi-ply fibrous structure-containing article according to the present invention is a multi-ply fibrous structure-containing article in which one fibrous structure ply has been locally deformed, textured, embossed at an embossment height such that the fibrous structure ply exhibits a Core Height Value (MikroCAD Value) of greater than 0.60 mm and/or greater than 0.75 mm and/or greater than 0.90 mm and/or greater than 1.00 mm and/or greater than 1.10 mm and/or greater than 1.20 mm and/or greater than 1.30 mm and/or greater than 1.40 mm and/or greater than 1.50 mm and/or greater than 1.60 mm and/or greater than 1.70 mm as measured according to the Surface Texture Analysis Test Method described herein, then attached to a non-deformed and/or less textured ply fibrous structure ply, if embossed, it comprises no embossments exhibiting an embossment height such that the fibrous structure ply exhibits a Core Height Value (MikroCAD Value) of greater than 0.60 mm, for example less than 0.60 mm and/or less than 0.50 mm and/or less than 0.40 mm and/or less than 0.30 mm and/or less than 0.20 mm and/or less than 0.10 mm and/or less than 0.050 mm as measured according to the Surface Texture Analysis Test Method described herein such that the multi-ply fibrous structure-containing article exhibits a Core Height Difference Value (MikroCAD Difference Value) of greater than 0.50 mm and/or greater than 0.55 mm and/or greater than 0.60 mm and/or greater than 0.64 mm and/or greater than 0.75 mm and/or greater than 0.84 mm and/or greater than 0.95 mm and/or greater than 1.00 mm and/or greater than 1.05 mm and/or greater than 1.10 mm and/or greater than 1.15 mm and/or greater than 1.20 mm and/or greater than 1.25 mm as measured according to the Surface Texture Analysis Test Method described herein. These properties has shown to generate excellent dry and wet resiliency due to the textured sheet being longer than the flatter sheet when bonded together at a point that exhibits strength even when wet (a water-resistant bond, such as a thermal bond and/or a water-resistant adhesive bond). This "durable when wet bond" (water-resistant bond) creates a "pucker", facilitating an interply void volume between two or more of the fibrous structure plies (the water-resistant bonded fibrous structure plies) and/or absorbent capacity, absorbent rate, both measured according to the CRT Test Method, and wet and dry thickness (sometimes referred to as caliper) and compressive recovery (resiliency). Furthermore, the resiliency of the water-resistant bond between bonded fibrous structure plies when wet is an important property/characteristic to the consumers.

For clarity purposes, one non-limiting example of a compositionally different (non-palindromic, different functional sides), for example different fibrous elements within the multi-ply fibrous structure-containing article according to the present invention is a multi-ply fibrous structure-containing article in which one or more fibrous structure plies is comprised of filaments, airlaid pulp fibers, wetlaid pulp fibers, synthetic staple fibers, or other materials, and one or more other fibrous structure plies is comprised of different elements. These compositional differences affect attributes of the sheet, such as hand feel, softness, hand protection, and reopenability of the multi-ply fibrous structure-containing articles of the present invention.

A non-limiting example of a compositionally and topographically different (non-palindromic, different functional sides) multi-ply fibrous structure-containing article comprises different fibrous elements and different topography as exemplified in the previous two paragraphs.

It has been shown that sided differences in texture within a multi-ply fibrous structure-containing article that exhibits a Core Height Difference Value (MikroCAD Difference Value) of the present invention exhibits significant consumer benefits during use. Without being bound by theory, if one side of the multi-ply fibrous structure-containing article (a single fibrous structure ply) has a texture, for example an embossment such that the multi-ply fibrous structure-containing article and/or single ply fibrous structure ply making the side exhibits a Core Height Value (MikroCAD Value) of greater than 0.60 mm and greater as described above as measured according to the Surface Texture Analysis Test Method described herein, and the other (opposite) side of the multi-ply fibrous structure-containing article and/or single fibrous structure ply making the side exhibits a Core Height Value (MikroCAD Value) of less than than 0.60 mm and/or less as described above as measured according to the Surface Texture Analysis Test Method described herein such that the multi-ply fibrous structure-containing article exhibits a Core Height Difference Value (MikroCAD Difference Value) of greater than 0.50 mm Core Height Value (MikroCAD Value) and/or greater as described above as measured according to the Surface Texture Analysis Test Method described herein. Examples of the consumer benefits achieved with the multi-ply fibrous structure-containing article include improved visual appearance and consumer appeal through highly textured surface appearing on the outside of a roll of multi-ply fibrous structure-containing article, and the textured side of the multi-ply fibrous structure-containing article provides a better scrub surface, while the flatter side (non-textured side and/or less textured side) of the multi-ply fibrous structure-containing article can be used for improved surface drying compared to known multi-ply fibrous structure-containing articles.

It has also been unexpectedly found that the sided multi-ply fibrous structure-containing articles of the present invention exhibit differences in TS7 values as measured by the Emtec Test Method described herein are provide consumer benefits over known multi-ply fibrous structure-containing articles. Without being bound by theory, it is believed that lower TS7 values correlate with softness perception of the consumer. It has been found by the inventors that having one side of an article with a different TS7 value allows the article to be used in a wider variety of contexts. For example, the multi-ply fibrous structure-containing articles of the present invention that exhibit lower TS7 values may be used for napkins, facial wiping, surface polishing, and other delicate tasks and multi-ply fibrous structure-containing articles of the present invention that exhibit higher TS7 values may be used for scrubbing, hard surface cleaning, and removal of viscous, sticky, or otherwise hard to clean messes and a multi-ply fibrous structure-containing article of the present invention that exhibits both a low and a high TS7 value allows the consumer to readily accomplish all of these tasks with one article.

It has been found that the sided multi-ply fibrous structure-containing articles of the present invention exhibit differences in the Hand Protection Values as measured according to the Hand Protection Test Method described herein provide consumer benefits over known multi-ply fibrous structure-containing articles. Without being bound by theory, it is believed that Hand Protection Values are a function of in-plane rate and permeability and/or through-plane rate and permeability and/or hydrophilicity of the multi-ply fibrous structure-containing article and/or its fibrous structure plies and/or contact angle of the multi-ply fibrous structure-containing article and/or its fibrous structure plies and/or capillary pressure of the multi-ply fibrous structure-containing article and/or its fibrous structure plies. Being able to independently control the Hand Protection Value for either side of the multi-ply fibrous structure-containing article allows for consumer benefits such as having both a rapid acquisition of a mess while also protecting a consumer's hand from the mess. A balance must be made between having too high of a Hand Protection Value, the extreme example being a continuous, impermeable film, and too low of a Hand Protection Value, the extreme example being a piece of cheesecloth. The multi-ply fibrous structure-containing articles of the present invention exhibit new to the world Hand Protection Values that are consumer relevant and desirable.

In one example of the present invention, an article, for example a multi-ply fibrous structure-containing article, comprising a plurality of fibrous elements, for example filaments and/or fibers, wherein the article comprises two or more fibrous structure plies, for example two or more different fibrous structure plies such that the article exhibits sidedness (one side of the article is not the same as the other side of the article, for example one surface of the article is not the same as the other surface of the article), wherein at least one of the fibrous structure plies is embossed such that the article exhibits one or more of the following bulk characteristics selected from the group consisting of:

a. a Dry Thick Compression of greater than 2450 and/or greater than 2500 and/or greater than 2700 and/or greater than 3000 and/or greater than 3500 and/or greater than 4000 and/or greater than 4500 and/or greater than 5000 and/or greater than 5500 (mils*mils/log(gsi)) as measured according to the Dry Thick Compression and Recovery Test Method described herein;

b. when the article, for example at least one of the fibrous structure plies, comprises a plurality of filaments, then the article exhibits a Dry Thick Compression of greater than 575 and/or greater than 600 and/or greater than 650 and/or greater than 700 and/or greater than 800 and/or greater than 1000 and/or greater than 1250 and/or greater than 1400 and/or greater than 1500 and/or greater than 1750 and/or greater than 2000 and/or greater than 2250 and/or greater than 2450 and/or greater than 2500 and/or greater than 2700 and/or greater than 3000 (mils*mils/log(gsi)) as measured according to the Dry Thick Compression and Recovery Test Method described herein;

c. a Dry Thick Compressive Recovery of greater than 1500 and/or greater than 1600 and/or greater than 1800 and/or greater than 2000 and/or greater than 2250 and/or greater than 2500 and/or greater than 2750 and/or greater than 3000 and/or greater than 3500 (mils*mils/log(gsi)) as measured according to the Dry Thick Compression and Recovery Test Method described herein;

d. when the article, for example at least one of the fibrous structure plies, comprises a plurality of filaments, then the article exhibits a Dry Thick Compressive Recovery of greater than 475 and/or greater than 500 and/or greater than 750 and/or greater than 900 and/or greater than 1000 and/or greater than 1250 and/or greater than 1500 and/or greater than 1750 and/or greater than 2000 and/or greater than 2250 and/or greater than 2500 and/or greater than 2750 and/or greater than 3000 and/or greater than 3250 and/or greater than 3500 (mils*mils/log(gsi)) as measured according to the Dry Thick Compression and Recovery Test Method described herein;

e. a Wet Thick Compression of greater than 1800 and/or greater than 2000 and/or greater than 2500 and/or greater than 3000 and/or greater than 3500 and/or greater than 4000 and/or greater than 4500 and/or greater than 5000 and/or greater than 5250 (mils*mils/log(gsi)) as measured according to the Wet Thick Compression and Recovery Test Method described herein;

f. when the article, for example at least one of the fibrous structure plies, comprises a plurality of filaments, then the article exhibits a Wet Thick Compression of greater than 795 and/or greater than 850 and/or greater than 900 and/or greater than 1000 and/or greater than 1250 and/or greater than 1500 and/or greater than 1800 and/or greater than 2000 and/or greater than 2500 and/or greater than 3000 and/or greater than 3500 and/or greater than 4000 and/or greater than 4500 and/or greater than 5000 and/or greater than 5500 (mils*mils/log(gsi)) as measured according to the Wet Thick Compression and Recovery Test Method described herein;

g. a Wet Thick Compressive Recovery of greater than 850 and/or greater than 900 and/or greater than 1000 and/or greater than 1250 and/or greater than 1500 and/or greater than 1750 and/or greater than 2000 (mils*mils/log(gsi)) as measured according to the Wet Thick Compression and Recovery Test Method described herein;

h. when the article, for example at least one of the fibrous structure plies, comprises a plurality of filaments, then the article exhibits a Wet Thick Compressive Recovery of greater than 475 and/or greater than 500 and/or greater than 750 and/or greater than 850 and/or greater than 900 and/or greater than 1000 and/or greater than 1250 and/or greater than 1500 and/or greater than 1750 and/or greater than 2000 (mils*mils/log(gsi)) as measured according to the Wet Thick Compression and Recovery Test Method described herein; and i. combinations thereof, is provided.

In another example of the present invention, an article, for example a multi-ply fibrous structure-containing article, comprising a plurality of fibrous elements, for example filaments and/or fibers, wherein the article comprises two or more fibrous structure plies, for example two or more different fibrous structure plies such that the article exhibits sidedness (one side of the article is not the same as the other side of the article, for example one surface of the article is not the same as the other surface of the article), wherein at least one of the fibrous structure plies is embossed such that at least two of the fibrous structure plies of the article exhibit a Core Height Difference Value (MikroCAD Difference Value) of greater than 0.50 mm and/or greater than 0.55 mm and/or greater than 0.60 mm and/or greater than 0.64 mm and/or greater than 0.75 mm and/or greater than 0.84 mm and/or greater than 0.95 mm and/or greater than 1.00 mm and/or greater than 1.05 mm and/or greater than 1.10 mm and/or greater than 1.15 mm and/or greater than 1.20 mm and/or greater than 1.25 mm and/or at least 1.30 mm as measured according to the Surface Texture Analysis Test Method described herein, is provided.

In another example of the present invention, an article, for example a multi-ply fibrous structure-containing article, comprising a plurality of fibrous elements, for example filaments and/or fibers, wherein the article comprises two or more fibrous structure plies, for example two or more different fibrous structure plies such that the article exhibits sidedness (one side of the article is not the same as the other side of the article, for example one surface of the article is not the same as the other surface of the article), wherein at least one of the fibrous structure plies is embossed such that the article exhibits a Hand Protection Value of greater than 1.00 seconds and/or greater than 1.25 seconds and/or greater than 1.50 seconds and/or greater than 1.75 seconds and/or greater than 2.00 seconds and/or greater than 2.25 seconds and/or greater than 2.50 seconds and/or greater than 3.00 seconds and/or greater than 3.50 seconds and/or greater than 4.00 seconds and/or greater than 5.00 seconds and/or greater than 7.50 seconds and/or greater than 10.00 seconds and/or greater than 15.00 seconds and/or greater than 20.00 seconds and/or greater than 22.00 seconds as measured according to the Hand Protection Test Method described herein, and optionally one or more of the bulk characteristics of the articles and/or fibrous structure plies making up the articles of the present invention and/or one or more of the absorbency characteristics of the articles and/or fibrous structure plies making up the articles of the present invention, for example a CRT Rate of greater than 0.33 g/second and/or greater than 0.35 g/second and/or greater than 0.36 g/second and/or greater than 0.37 g/second and/or greater than 0.38 g/second and/or greater than 0.39 g/second and/or greater than 0.40 g/second and/or greater than 0.41 g/second and/or greater than 0.42 g/second as measured according to the CRT Test Method described herein, is provided.

In yet another example of the present invention, an article, for example a multi-ply fibrous structure-containing article, comprising a plurality of fibrous elements, for example filaments and/or fibers, wherein the article comprises two or more fibrous structure plies, for example two or more different fibrous structure plies such that the article exhibits sidedness (one side of the article is not the same as the other side of the article, for example one surface of the article is not the same as the other surface of the article), wherein at least one of the fibrous structure plies is embossed such that the article exhibits a Wet Web-Web CoF Front-to-Front Value of less than 1.00 and/or less than 0.98 and/or less than 0.96 and/or less than 0.92 and/or less than 0.90 and/or less than 0.88 g/g and/or a Wet Web-Web Back-to-Back Value of less than 1.20 and/or less than 1.10 and/or less than 1.00 and/or less than 0.90 and/or less than 0.80 and/or less than 0.70 g/g and/or Wet Web-Web COF Back-to-Front Value of less than 1.10 and/or less than 1.00 and/or less than 0.90 and/or less than 0.80 and/or less than 0.70 g/g as measured according to the Wet Web-Web COF Test Method described herein, and optionally one or more of the bulk characteristics of the articles and/or fibrous structure plies making up the articles of the present invention and/or one or more of the absorbency characteristics of the articles and/or fibrous structure plies making up the articles of the present invention, for example a CRT Rate of greater than 0.33 g/second and/or greater than 0.35 g/second and/or greater than 0.36 g/second and/or greater than 0.37 g/second and/or greater than 0.38 g/second and/or greater than 0.39 g/second and/or greater than 0.40 g/second and/or greater than 0.41 g/second and/or greater than 0.42 g/second as measured according to the CRT Test Method described herein, is provided.

The present invention provides novel articles comprising two or more fibrous structure plies wherein at least one of the fibrous structure plies comprises embossments such that the articles exhibit improved bulk and/or absorbent properties, and methods for making same.

BRIEF DESCRIPTION OF THE DRAWINGS

FIG. 2A is a cross-sectional representation of an example of a co-formed fibrous structure web according to the present invention;

FIG. 2B is an example of a process for making the co-formed fibrous structure web of FIG. 2A;

FIG. 6A is a cross-sectional representation of another example of a fibrous structure web according to the present invention;

FIG. 6B is an example of a process for making the fibrous structure web of FIG. 6A;

FIG. 7 is a cross-sectional representation of another example of an article according to the present invention;

FIG. 8 is a cross-sectional representation of another example of an article according to the present invention;

FIG. 9A is a cross-sectional representation of another example of an article according to the present invention;

FIG. 9B is an example of a process for making the article according to FIG. 9A

FIG. 10 is a cross-sectional representation of another example of an article according to the present invention;

FIG. 11 is a cross-sectional representation of another example of an article according to the present invention;

FIG. 12 is a cross-sectional representation of another example of an article according to the present invention;

FIG. 13 is a cross-sectional representation of another example of an article according to the present invention;

FIG. 14A is a cross-sectional representation of another example of an article according to the present invention;

FIG. 14B is an example of a process for making the article of FIG. 14A;

FIG. 15 is a cross-sectional representation of another example of an article according to the present invention;

FIG. 16A is a cross-sectional representation of another example of an article according to the present invention;

FIG. 16B is an example of a process for making the article of FIG. 16A;

FIG. 17 is a cross-sectional representation of another example of an article according to the present invention;

FIG. 18 is a cross-sectional representation of another example of an article according to the present invention;

FIG. 19 is a cross-sectional representation of another example of an article according to the present invention;

FIG. 20A is a cross-sectional representation of another example of an article according to the present invention;

FIG. 20B is a cross-sectional representation of another example of an article according to the present invention;

FIG. 21A is a cross-sectional representation of another example of a fibrous structure web according to the present invention suitable for use in the article of FIGS. 20A and 20B;

FIG. 21B is an example of a process for making the fibrous structure web of FIG. 21A;

FIG. 23A is a cross-sectional representation of another example of a fibrous structure web according to the present invention suitable for use in the article of FIGS. 22A and 22B;

FIG. 23B is an example of a process for making the fibrous structure web of FIG. 23A;

FIG. 24A is a cross-sectional representation of another example of an article according to the present invention;

FIG. 24B is a cross-sectional representation of another example of an article according to the present invention;

DETAILED DESCRIPTION OF THE INVENTION

Figure 1:
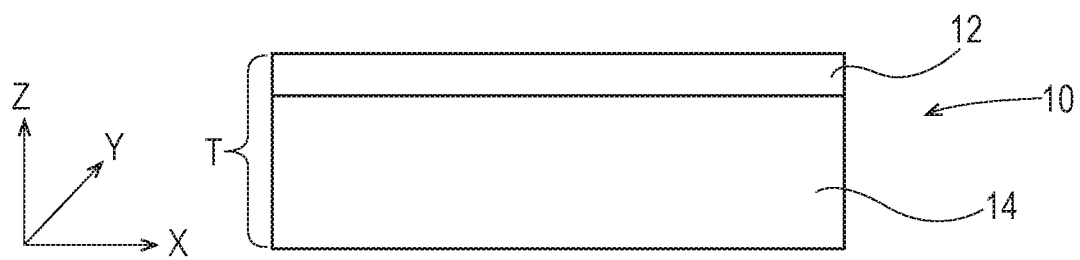
FIG. 1 is a cross-sectional representation of an example of a prior art article.

"Article" as used herein means a consumer-usable structure comprising two or more and/or three or more and/or four or more fibrous structure plies, which may comprise one or more and/or two or more and/or three or more and/or four or more fibrous structure webs, according to the present invention. In one example the article is a dry article. In addition, the article may be a sanitary tissue product. A fibrous structure ply of the present invention may comprise one or more and/or two or more and/or three or more different fibrous structure webs selected from the group consisting of: wet-laid fibrous structure webs, air-laid fibrous structure webs, co-formed fibrous structure web, meltblown fibrous structure webs, and spunbond fibrous structure webs. In one example, a fibrous structure ply and/or an article according to the present invention is void of a hydroentangled fibrous structure webs and/or is not hydroentangled. In another example, a fibrous structure ply and/or an article according to the present invention is void of a carded fibrous structure webs and/or is not carded. In addition to the fibrous structure webs, the fibrous structure plies and/or articles of the present invention may further comprise other solid matter, such as sponges, foams, particle, such as absorbent gel materials, and mixtures thereof.

In one example, two or more fibrous structure webs may be associated together to form a fibrous structure ply of the present invention.

In one example, two or more fibrous structure plies of the present invention may be associated together to form an article of the present invention.

In one example, a fibrous structure ply and/or an article of the present invention comprises one or more co-formed fibrous structure webs. In addition to the co-formed fibrous structure web, the fibrous structure ply and/or the article may further comprise one or more wet-laid fibrous structure webs, for example 100% pulp fibers or a mixture of pulp fibers and synthetic staple fibers. In one example, a fibrous structure ply may comprise one or more co-formed fibrous structure webs associated with one or more wet-laid fibrous structure webs, for example one or more co-formed fibrous structure webs (with or without scrim) may be formed directly onto a wet-laid fibrous structure web to associate the co-formed fibrous structure web with the wet-laid fibrous structure web forming a fibrous structure ply. Also in addition to the co-formed fibrous structure web with or without one or more wet-laid fibrous structure web, the fibrous structure ply may further comprise one or more meltblown fibrous structure webs, which may be considered scrims on the co-formed fibrous structure webs.

In another example, a fibrous structure ply and/or an article of the present invention may comprise one or more multi-fibrous element fibrous structure webs (e.g., a fibrous structure comprising a mixture of filaments and fibers), such as a co-formed fibrous structure web, and one or more mono-fibrous element fibrous structure webs (e.g., a fibrous structure comprising only fibers or only filaments, not a mixture of fibers and filaments), such as a wet-laid fibrous structure web and/or a meltblown fibrous structure web.

In one example, at least a portion of fibrous structure plies of the present invention and/or the articles of the present invention exhibit a basis weight of about 150 gsm or less and/or about 100 gsm or less and/or from about 30 gsm to about 95 gsm.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). Non-limiting examples of suitable sanitary tissue products of the present invention include paper towels, bath tissue, facial tissue, napkins, baby wipes, adult wipes, wet wipes, cleaning wipes, polishing wipes, cosmetic wipes, car care wipes, wipes that comprise an active agent for performing a particular function, cleaning substrates for use with implements, such as a Swifter® cleaning wipe/pad. The sanitary tissue product may be convolutedly wound upon itself about a core or without a core to form a sanitary tissue product roll.

The sanitary tissue products of the present invention may exhibit a basis weight between about 10 g/m$^2$ to about 500 g/m$^2$ and/or from about 15 g/m$^2$ to about 400 g/m$^2$ and/or from about 20 g/m$^2$ to about 300 g/m$^2$ and/or from about 20 g/m$^2$ to about 200 g/m$^2$ and/or from about 20 g/m$^2$ to about 150 g/m$^2$ and/or from about 20 g/m$^2$ to about 120 g/m$^2$ and/or from about 20 g/m$^2$ to about 110 g/m$^2$ and/or from about 20 g/m$^2$ to about 100 g/m$^2$ and/or from about 30 to 90 g/m$^2$. In addition, the sanitary tissue product of the present invention may exhibit a basis weight between about 40 g/m$^2$ to about 500 g/m$^2$ and/or from about 50 g/m$^2$ to about 400 g/m$^2$ and/or from about 55 g/m$^2$ to about 300 g/m$^2$ and/or from about 60 to 200 g/m$^2$. In one example, the sanitary tissue product exhibits a basis weight of less than 100 g/m$^2$ and/or less than 80 g/m$^2$ and/or less than 75 g/m$^2$ and/or less than 70 g/m$^2$ and/or less than 65 g/m$^2$ and/or less than 60 g/m$^2$ and/or less than 55 g/m$^2$ and/or less than 50 g/m$^2$ and/or less than 47 g/m$^2$ and/or less than 45 g/m$^2$ and/or less than 40 g/m$^2$ and/or less than 35 g/m$^2$ and/or to greater than 20 g/m$^2$ and/or greater than 25 g/m$^2$ and/or greater than 30 g/m$^2$ as measured according to the Basis Weight Test Method described herein.

The sanitary tissue products of the present invention may exhibit a density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

The sanitary tissue products of the present invention may comprises additives such as softening agents, temporary wet strength agents, permanent wet strength agents, bulk softening agents, silicones, wetting agents, latexes, especially surface-pattern-applied latexes, dry strength agents such as carboxymethylcellulose and starch, and other types of additives suitable for inclusion in and/or on sanitary tissue products.

"Fibrous structure ply" as used herein means a unitary structure comprising one or more fibrous structure webs that are associated with one another, such as by compression bonding (for example by passing through a nip formed by two rollers), thermal bonding (for example by passing through a nip formed by two rollers where at least one of the rollers is heated to a temperature of at least about 120° C. (250° F.), microselfing, needle punching, and gear rolling, to form the unitary structure, for example a unitary structure that exhibits sufficient integrity to be processed with web handling equipment and/or exhibits a basis weight of at least 6 gsm and/or at least 8 gsm and/or at least 10 gsm and/or at least 15 gsm and/or at least 20 gsm and/or at least 30 gsm and/or at least 40 gsm. The unitary structure may also be referred to as a ply.

"Fibrous structure web" as used herein means a structure that comprises a plurality of fibrous elements, for example a plurality of filaments and/or a plurality of fibers, for example pulp fibers, for example wood pulp fibers, and/or cellulose fibrous elements and/or cellulose fibers, such as pulp fibers, for example wood pulp fibers. In addition to the fibrous elements, the fibrous structures may comprise particles, such as absorbent gel material particles. In one example, a fibrous structure according to the present invention means an orderly arrangement of fibrous elements within a structure in order to perform a function. In another example, a fibrous structure according to the present invention is a nonwoven. In one example, the fibrous structures of the present invention may comprise wet-laid fibrous structures, for example embossed conventional wet pressed fibrous structures, through-air-dried (TAD) fibrous structures both creped and/or uncreped, belt-creped fibrous structures, fabric-creped fibrous structures, and combinations thereof, air-laid fibrous structures, such as thermally-bonded air-laid (TBAL) fibrous structures, melt-bonded air-laid (MBAL), latex-bonded air-laid (LBAL) fibrous structures and combinations thereof, co-formed fibrous structures, meltblown fibrous structures, and spunbond fibrous structures, carded fibrous structures, and combinations thereof. In one example, the fibrous structure is a non-hydroentangled fibrous structure. In another example, the fibrous structure is a non-carded fibrous structure.

In another example of the present invention, a fibrous structure comprises a plurality of inter-entangled fibrous elements, for example inter-entangled filaments.

Non-limiting examples of fibrous structure plies and/or fibrous structure webs of the present invention include paper.

The fibrous structure webs of the present invention may be homogeneous or may be layered. If layered, the fibrous structure webs may comprise at least two and/or at least three and/or at least four and/or at least five layers.

Any one of the fibrous structure webs may itself be a fibrous structure ply in the multi-ply fibrous structure-containing article of the present invention if the fibrous structure web exhibits sufficient integrity to be processed with web handling equipment and/or exhibits a basis weight of at least 6 gsm and/or at least 8 gsm and/or at least 10 gsm and/or at least 15 gsm and/or at least 20 gsm and/or at least 30 gsm and/or at least 40 gsm. An example of such a fibrous structure web, for example a wet-laid fibrous structure web exhibiting a basis weight of at least 10 gsm and/or at least 15 gsm and/or at least 20 gsm can be a fibrous structure ply itself.

Non-limiting examples of processes for making the fibrous structure webs of the present invention include known wet-laid papermaking processes, for example conventional wet-pressed (CWP) papermaking processes and through-air-dried (TAD), both creped TAD and uncreped TAD, papermaking processes, and air-laid papermaking processes. Such processes typically include steps of preparing a fiber composition in the form of a fiber suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of the fibers onto a forming wire, fabric, or belt such that an embryonic web material is formed, after which drying and/or bonding the fibers together results in a fibrous structure web and/or fibrous structure ply. Further processing of the fibrous structure web and/or fibrous structure ply may be carried out such as calendering, consolidating, embossing, surface treating, and the like. For example, in typical papermaking processes, the fibrous structure web and/or fibrous structure ply is wound on the reel at the end of papermaking, often referred to as a parent roll, and may subsequently be converted into a fibrous structure ply by associating the fibrous web with one or more other fibrous webs and/or ultimately incorporated into a multi-ply fibrous structure-containing article, such as a multi-ply sanitary tissue product, according to the present invention.

"Multi-fibrous element fibrous structure web" as used herein means a fibrous structure web that comprises filaments and fibers, for example a co-formed fibrous structure web is a multi-fibrous element fibrous structure web.

"Mono-fibrous element fibrous structure web" as used herein means a fibrous structure web that comprises only fibers or filaments, for example a wet-laid fibrous structure web or meltblown fibrous structure web, respectively, not a mixture of fibers and filaments.

"Co-formed fibrous structure web" as used herein means that the fibrous structure web comprises a mixture of filaments, for example meltblown filaments, such as thermoplastic filaments, for example polypropylene filaments, and fibers, such as pulp fibers, for example wood pulp fibers. The filaments and fibers are commingled together to form the co-formed fibrous structure web. The co-formed fibrous structure web may be associated with one or more meltblown fibrous structure webs and/or spunbond fibrous structure webs, which form a scrim (for example at a basis weight of greater than 0.5 gsm to about 5 gsm and/or from about 1 gsm to about 4 gsm and/or from about 1 gsm to about 3 gsm and/or from about 1.5 gsm to about 2.5 gsm, such as on one or more surfaces of the co-formed fibrous structure.

The co-formed fibrous structure web of the present invention may be made via a co-forming process. A non-limiting example of a co-formed fibrous structure web and a processs for making such a co-formed fibrous structure web associated with or without a meltblown fibrous structure web and/or spunbond fibrous structure web on one or both surfaces of the co-formed fibrous structure web and process for making is shown in FIGS. 2A and 2B.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

The filaments may be made via spinning, for example via meltblowing and/or spunbonding, from a polymer, for example a thermoplastic polymer, such as polyolefin, for example polypropylene and/or polyethylene, and/or polyester. Filaments are typically considered continuous or substantially continuous in nature.

"Meltblowing" is a process for producing filaments directly from polymers or resins using high-velocity air or another appropriate force to attenuate the filaments before collecting the filaments on a collection device, such as a belt, for example a patterned belt or molding member. In a meltblowing process the attenuation force is applied in the form of high speed air as the material (polymer) exits a die or spinnerette.

"Spunbonding" is a process for producing filaments directly from polymers by allowing the polymer to exit a die or spinnerette and drop a predetermined distance under the forces of flow and gravity and then applying a force via high velocity air or another appropriate source to draw and/or attenuate the polymer into a filament.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof such as PET/coPET, rayon, lyocell, glass fibers and polyvinyl alcohol fibers.

Staple fibers, in one example, may be produced by spinning a filament tow and then cutting the tow into segments of less than 5.08 cm (2 in.) thus producing fibers; for example synthetic staple fibers.

"Pulp fibers" as used herein means fibers that have been derived from vegetative sources, such as plants and/or trees. In one example of the present invention, "pulp fiber" refers to papermaking fibers. In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: eucalyptus fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, rice straw, wheat straw, bamboo, and bagasse fibers can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristle-like outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Basis Weight" as used herein is the weight per unit area of a sample reported in lbs/3000 ft$^2$ or g/m$^2$ (gsm) and is measured according to the Basis Weight Test Method described herein.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Embossed" as used herein with respect to an article, sanitary tissue product, fibrous structure ply and/or fibrous structure web, means that an article, sanitary tissue product, fibrous structure ply and/or fibrous structure web has been subjected to a process which converts a smooth surfaced article, sanitary tissue product, fibrous structure ply and/or fibrous structure web to an out-of-plane, textured surface by replicating a pattern on one or more emboss rolls, which form a nip through which the article, sanitary tissue product, fibrous structure ply and/or fibrous structure web passes. Embossed does not include creping, microcreping, fabric creping, belt creping, printing or other processes, such as through-air-drying processes, that may also impart a texture and/or decorative pattern to an article, sanitary tissue product, fibrous structure ply and/or fibrous structure web.

"Differential density", as used herein, means a fibrous structure ply and/or fibrous structure web that comprises one or more regions of relatively low fibrous element, for example fiber, density, which are referred to as pillow regions, and one or more regions of relatively high fibrous element, for example fiber, density, which are referred to as knuckle regions.

"Densified", as used herein means a portion of a fibrous structure ply and/or fibrous structure web that is characterized by regions of relatively high fibrous element, e.g., fiber, density (knuckle regions).

"Non-densified", as used herein, means a portion of a fibrous structure ply and/or fibrous structure web that exhibits a lesser fibrous element density, e.g., fiber, density (one or more regions of relatively lower fibrous element, e.g., fiber, density) (pillow regions) than another portion (for example a knuckle region) of the fibrous structure ply and/or fibrous structure web.

"Wet textured" as used herein means that a three-dimensional (3D) patterned fibrous structure ply and/or 3D patterned fibrous structure web comprises texture (for example a three-dimensional topography) imparted to the fibrous structure ply and/or fibrous structure ply's surface and/or fibrous structure web and/or fibrous structure web's surface during a fibrous structure web making process. In one example, in a wet-laid fibrous structure web making process, wet texture may be imparted to a fibrous structure web upon fibers and/or filaments being collected on a collection device that has a three-dimensional (3D) surface which imparts a 3D surface to the fibrous structure web being formed thereon and/or being transferred to a fabric and/or belt, such as a through-air-drying fabric and/or a patterned drying belt, comprising a 3D surface that imparts a 3D surface to a fibrous structure web being formed thereon. In one example, the collection device with a 3D surface comprises a patterned, such as a patterned formed by a polymer or resin being deposited onto a base substrate, such as a fabric, in a patterned configuration. The wet texture imparted to a wet-laid fibrous structure web is formed in the fibrous structure web prior to and/or during drying of the fibrous structure web. Non-limiting examples of collection devices and/or fabric and/or belts suitable for imparting wet texture to a fibrous structure web include those fabrics and/or belts used in fabric creping and/or belt creping processes, for example as disclosed in U.S. Pat. Nos. 7,820,008 and 7,789,995, coarse through-air-drying fabrics as used in uncreped through-air-drying processes, and photo-curable resin patterned through-air-drying belts, for example as disclosed in U.S. Pat. No. 4,637,859. For purposes of the present invention, the collection devices used for imparting wet texture to the fibrous structure webs would be patterned to result in the fibrous structure webs comprising a surface pattern comprising a plurality of parallel line elements wherein at least one, two, three, or more, for example all of the parallel line elements exhibit a non-constant width along the length of the parallel line elements. This is different from non-wet texture that is imparted to a fibrous structure web after the fibrous structure web has been dried, for example after the moisture level of the fibrous structure web is less than 15% and/or less than 10% and/or less than 5%. An example of non-wet texture includes embossments imparted to a fibrous structure ply and/or fibrous structure web by embossing rolls during converting of the fibrous structure ply and/or fibrous structure web. In one example, the fibrous structure ply and/or fibrous structure web, for example a wet-laid fibrous structure ply and/or wet-laid fibrous structure web, is a wet textured fibrous structure ply and/or wet textured fibrous structure web.

"3D pattern" with respect to a fibrous structure ply and/or fibrous structure ply's surface and/or fibrous structure web and/or fibrous structure web's surface in accordance with the present invention means herein a pattern that is present on at least one surface of the fibrous structure ply and/or fibrous structure web. The 3D pattern texturizes the surface of the fibrous structure ply and/or fibrous structure web, for example by providing the surface with protrusions and/or depressions. The 3D pattern on the surface of the fibrous structure ply and/or fibrous structure web is made by making the fibrous structure web on a patterned molding member that imparts the 3D pattern to the fibrous structure web made thereon. For example, the 3D pattern may comprise a series of line elements, such as a series of line elements that are substantially oriented in the cross-machine direction of the fibrous structure web and/or fibrous structure ply and/or sanitary tissue product and/or article.

In one example, a series of line elements may be arranged in a 3D pattern selected from the group consisting of: periodic patterns, aperiodic patterns, straight line patterns, curved line patterns, wavy line patterns, snaking patterns, square line patterns, triangular line patterns, S-wave patterns, sinusoidal line patterns, and mixtures thereof. In another example, a series of line elements may be arranged in a regular periodic pattern or an irregular periodic pattern (aperiodic) or a non-periodic pattern.

"Distinct from" and/or "different from" as used herein means two things that exhibit different properties and/or levels of materials, for example different by 0.5 and/or 1 and/or 2 and/or 3 and/or 5 and/or 10 units and/or different by 1% and/or 3% and/or 5% and/or 10% and/or 20%, different materials, and/or different average fiber diameters.

"Textured pattern" as used herein means a pattern, for example a surface pattern, such as a three-dimensional (3D) surface pattern present on a surface of the fibrous structure and/or on a surface of a component making up the fibrous structure.

"Fibrous Structure Ply Basis Weight" and/or "Multi-ply Fibrous Structure-containing Article Basis Weight" and/or "Fibrous Structure Web Basis Weight" and/or "Sanitary Tissue Product Basis Weight" as used herein is the weight per unit area of a sample reported in lbs/3000 ft$^2$ or g/m$^2$.

"Ply" as used herein means an individual, integral fibrous structure ply that is suitable as a single ply fibrous structure article and/or is incorporated into a multi-ply fibrous structure-containing article.

"Plies" as used herein means two or more individual, integral fibrous structure plies disposed in a substantially contiguous, face-to-face relationship with one another, forming a multi-ply fibrous structure-containing article, for example a multi-ply sanitary tissue product. It is also contemplated that an individual, integral fibrous structure ply can effectively form a multi-ply sanitary tissue product, for example, by being folded on itself.

"Common Intensive Property" as used herein means an intensive property possessed by more than one region within a fibrous structure web and/or fibrous structure ply. Such intensive properties of the fibrous structure web and/or fibrous structure ply include, without limitation, density, basis weight, thickness, and combinations thereof. For example, if density is a common intensive property of two or more different regions, a value of the density in one region can differ from a value of the density in one or more other regions. Regions (such as, for example, a first region and a second region and/or a continuous network region and at least one of a plurality of discrete zones) are identifiable areas visually discernible and/or visually distinguishable from one another by distinct intensive properties.

"X," "Y," and "Z" designate a conventional system of Cartesian coordinates, wherein mutually perpendicular coordinates "X" and "Y" define a reference X-Y plane, and "Z" defines an orthogonal to the X-Y plane. "Z-direction" designates any direction perpendicular to the X-Y plane. Analogously, the term "Z-dimension" means a dimension, distance, or parameter measured parallel to the Z-direction. When an element, such as, for example, a molding member curves or otherwise deplanes, the X-Y plane follows the configuration of the element.

"Substantially continuous" or "continuous" region refers to an area within which one can connect any two points by an uninterrupted line running entirely within that area throughout the line's length. That is, the substantially continuous region has a substantial "continuity" in all directions parallel to the first plane and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Substantially semi-continuous" or "semi-continuous" region refers an area which has "continuity" in all, but at least one, directions parallel to the first plane, and in which area one cannot connect any two points by an uninterrupted line running entirely within that area throughout the line's length. The semi-continuous framework may have continuity only in one direction parallel to the first plane. By analogy with the continuous region, described above, while an absolute continuity in all, but at least one, directions is preferred, minor deviations from such a continuity may be tolerable as long as those deviations do not appreciably affect the performance of the fibrous structure.

"Discontinuous" or "discrete" regions or zones refer to discrete, and separated from one another areas or zones that are discontinuous in all directions parallel to the first plane.

"Molding member" is a structural element that can be used as a support for the mixture of fibrous elements that can be deposited thereon during a process of making a fibrous structure web, and as a forming unit to form (or "mold") a desired microscopical geometry of a fibrous structure web. The molding member may comprise any element that has the ability to impart a three-dimensional pattern to the fibrous structure web being produced thereon, and includes, without limitation, a stationary plate, a belt, a cylinder/roll, a woven fabric, and a band.

"Water-resistant" and/or "water-insoluble" as used herein with respect to a bond means that the bond remains, for example retains its intended/desired bonding function, after being saturated by water. In one example, a water-resistant bond may comprise a thermal bond created by heat and/or heat and pressure. In another example, a water-resistant bond may comprise a water-resistant adhesive bond created by a water-resistant adhesive.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Multi-Ply Fibrous Structure-Containing Article

A multi-ply fibrous structure-containing article of the present invention comprises two or more and/or three or more and/or four or more fibrous structure plies, which comprise one or more fibrous structure webs, wherein at least one of the fibrous structure plies is embossed with embossments, for example embossments that exhibit an embossment height such that the multi-ply fibrous structure-containing article exhibits a Core Height Value (MikroCAD Value) of greater than 0.60 mm and/or greater than 0.75 mm and/or greater than 0.90 mm and/or greater than 1.00 mm and/or greater than 1.10 mm and/or greater than 1.20 mm and/or greater than 1.30 mm and/or greater than 1.40 mm and/or greater than 1.50 mm and/or greater than 1.60 mm and/or greater than 1.70 mm as measured according to the Surface Texture Analysis Test Method described herein, wherein the embossed fibrous structure ply is bonded to at least one other fibrous structure ply via one or more and/or two or more and/or a plurality of water-resistant bonds (for example thermal bonds and/or water-resistant adhesive bonds) such that a void volume is created between the two fibrous structure plies at the embossments and such that the articles exhibit improved bulk and/or absorbent properties compared to known fibrous structure-containing articles such that the multi-ply fibrous structure-containing article exhibits improved bulk and/or absorbency properties compared to existing fibrous structures and/or multi-ply fibrous structure-containing articles, according to the present invention.

It has unexpectedly been found that the arrangement of the fibrous structure plies, wherein at least one of the fibrous structure plies is embossed and bonded via a water-resistant bond results in the multi-ply fibrous structure-containing article of the present invention exhibiting novel properties, such as bulk and/or absorbent properties without negatively impacting the softness and/or flexibility and/or stiffness of the multi-ply fibrous structure-containing articles.

In one example, the multi-ply fibrous structure-containing articles of the present invention may comprise different combinations of fibrous structure plies comprising different types and/or different mixtures of fibrous elements. For example, the two or more fibrous structure plies of the multi-ply fibrous structure-containing articles of the present invention may comprise different combinations (associations) of wet-laid fibrous structure plies and/or wet-laid fibrous structure webs, for example 100% by weight of fibers, such as pulp fibers, for example wood pulp fibers (e.g., cellulosic wood pulp fibers) and co-formed fibrous structure plies and/or co-formed fibrous structure webs, for example a mixture of filaments and fibers, such as polypropylene filaments and pulp fibers, such as wood pulp fibers (e.g., cellulosic wood pulp fibers), which allows for the creation of both wet and dry bulk, while maintaining a soft and/or flexibility and/or non-stiff sheet. This unique combination of properties is afforded, in this case, by the use of the co-formed fibrous structure ply and/or co-formed fibrous structure web, in which continuous filaments are combined with fibers in a way that the resultant bulk density of the co-formed fibrous structure ply and/or co-formed fibrous structure web is very low. This low bulk density is maintained even when wet due the lack of collapse of the fibrous structure ply and/or fibrous structure web, as the continuous filaments are not subject to water induced collapse. In contrast, such bulk in wet-laid fibrous structure plies and/or wet-laid fibrous structure webs is created via hydrogen bonding of the fibers within the wet-laid fibrous structure ply and/or wet-laid fibrous structure web, which collapse if dry forming, such as embossing and/or microselfing, is used to create a soft fibrous structure ply with dry bulk (resulting in low wet bulk), or will be stiff if wet forming, such as forming the wet-laid fibrous structure web on a molding member and/or subjecting the wet-laid fibrous structure web to wet microcontraction during forming, is used to create a dry bulk that is resilient when wet.

In another example, the multi-ply fibrous structure-containing articles of the present invention allow for the optimization of different fibrous structure plies and/or fibrous structure webs for different characteristics and/or properties. One example of this is how a very low density, high bulk co-formed fibrous structure ply and/or co-formed fibrous structure web that is strong can be placed with a wet formed, high bulk wet-laid fibrous structure ply and/or wet-laid fibrous structure web that is very absorbent. The resultant fibrous structure ply (if direct formed, which as used herein means where one fibrous structure web comprising fibrous elements, for example one fibrous structure web comprising fibers and filaments, such as a coform fibrous structure web, is deposited/spun onto another fibrous structure web, for example a wet-laid fibrous structure web, such as a paper web) and/or multi-ply fibrous structure-containing article is one which is both highly absorbent, very compressible, and able to spring back after compression. This results in a spongelike article which is resilient under compression yet highly absorbent like a paper towel. The resultant fibrous structure ply (if direct formed) and/or multi-ply fibrous structure-containing article exhibits high bulk values when dry, are compressible under load and rebound when the load is relieved. Additionally, the resultant fibrous structure ply (if direct formed) and/or multi-ply fibrous structure-containing article exhibits high bulk, compressibility, and recovery when wet, due to the wet formed nature of the wet-laid fibrous structure ply and/or wet-laid fibrous structure web and the co-formed fibrous structure ply and/or co-formed fibrous structure web, which is impervious to wet collapse.

In another example, the multi-ply fibrous structure-containing articles of the present invention exhibit very high sheet and/or roll bulk without negatively impacting softness. This high bulk can be achieved through multiple inner fibrous structure plies and/or fibrous structure webs, with the interior fibrous structure plies and/or fibrous structure webs comprised of high loft, pin-holed wet-laid fibrous structure plies and/or wet-laid fibrous structure webs. Co-formed fibrous structure plies and/or co-formed fibrous structure webs, which contain continuous, thermoplastic filaments and pulp fibers, enable the use of high loft wet-laid fibrous structure plies and/or wet-laid fibrous structure webs because the filaments of the co-formed fibrous structure plies and/or co-formed fibrous structure webs are used for strength (especially when wet). Furthermore, the commingled nature of the filaments and fibers within the co-formed fibrous structure plies and/or co-formed fibrous structure webs allows for very high bulk fibrous structure plies and/or fibrous structure webs that are both absorbent and soft, as individual fibers are commingled within a network of continuous filaments. Multi-ply fibrous structure-containing articles like these are very difficult to make via other technologies such as solely wet-laid technology due to the fact that the fibers, such as pulp fibers, must impart strength and bulk and absorbency. These different demands in the past have caused product developers to optimize for some attributes at the expense of others.

In still another example, the multi-ply fibrous structure-containing articles of the present invention exhibit very high absorbencies without compromising softness of the article. This is achieved through the heterogenous composition of the multi-ply fibrous structure article; namely, the combination of at least two different fibrous structure plies, for example at least fibrous structure ply comprising a co-formed fibrous structure web and at least one other fibrous structure ply comprising a wet-laid fibrous structure web. To allow for high absorbencies, wet-laid fibrous structure web making process choices such as fiber furnish mix, fiber refining levels, and molding member, for example belt design upon which the wet-laid fibrous structure web is formed, can be chosen to create a lofty, high absorbent capacity wet-laid fibrous structure web and/or wet-laid fibrous structure ply that is soft and low in strength. The filaments, for example polypropylene filaments, present in the co-formed fibrous structure web and/or co-formed fibrous structure ply is relied upon to deliver the strength of the multi-ply fibrous structure-containing article, while still being soft and/or flexible and/or non-stiff both wet and dry. Additionally, the interspersion of fibers, for example pulp fibers, with the filaments within the co-formed fibrous structure web and/or co-formed fibrous structure ply adds to the soft, velvet-like hand feel of the multi-ply fibrous structure-containing article.

In yet another example, the multi-ply fibrous structure-containing articles of the present invention exhibit very high absorbencies without compromising strength of the article. This is achieved through the heterogenous composition of the multi-ply fibrous structure-containing article; namely, the combination of at least two different fibrous structure plies at least one of which is embossed such that the multi-ply fibrous structure-containing article exhibits the improved bulk and absorbency properties. In one example, at least one of the fibrous structure plies comprises a co-formed fibrous structure web and/or co-formed fibrous structure ply and at least one other fibrous structure ply comprises a wet-laid fibrous structure web and/or wet-laid fibrous structure ply. The wet-laid structure web and/or wet-laid fibrous structure ply can be optimized for high absorbent capacities and/or rates without having to compromise to maintain strength. To allow for high absorbencies, wet-laid fibrous structure web making process choices such as fiber furnish mix, fiber refining levels, and molding member, for example belt design upon which the wet-laid fibrous structure web is formed, can be chosen to create a lofty, high absorbent capacity wet-laid fibrous structure web and/or wet-laid fibrous structure ply that is soft and low in strength. The filaments, for example polypropylene filaments, present in the co-formed fibrous structure web and/or co-formed fibrous structure ply is relied upon to deliver the strength of the multi-ply fibrous structure-containing article, while still being soft and/or flexible and/or non-stiff both wet and dry. Additionally, the interspersion of fibers, for example pulp fibers, with the filaments within the co-formed fibrous structure web and/or co-formed fibrous structure ply adds to the soft, velvet-like hand feel of the multi-ply fibrous structure-containing article.

In another example, the multi-ply fibrous structure-containing articles of the present invention exhibit high absorbent capacity while still maintaining hand protection. This can be achieved by tailoring the density, capillary pressure, and absorbent capacity of the different fibrous structure plies within the multi-ply fibrous structure-containing article. In one example, high density and capillary pressure wet-laid fibrous structure plies and/or wet-laid fibrous structure webs on one or both of the exterior surfaces of the multi-ply fibrous structure-containing article allow for rapid redistribution of water on a surface of the multi-ply fibrous structure-containing article, while lower density fibrous structure plies and/or fibrous structure webs, such as co-formed fibrous structure plies and/or co-formed fibrous structure webs, in the interior of the multi-ply fibrous structure-containing article creates storage capacity. In another example, thin, low density fibrous structure plies and/or fibrous structure webs, such as co-formed fibrous structure plies and/or co-formed fibrous structure webs, on one or more of the exterior surfaces of the multi-ply fibrous structure-containing article allow for rapid acquisition of water by the inner, more dense, high capillary pressure fibrous structure plies and/or fibrous structure webs, such as wet-laid fibrous structure plies and/or wet-laid fibrous structure webs, whose high capillary pressure structures will redistribute the water in the multi-ply fibrous structure-containing article and not give it back to the exterior surfaces of the multi-ply fibrous structure-containing article.

In still another example, the multi-ply fibrous structure-containing articles of the present invention exhibit high bulk/low density without impacting the overall opacity of the multi-ply fibrous structure-containing articles. This can be achieved by the combining of a differential density wet-laid fibrous structure ply and/or wet-laid fibrous structure web, which have been wet formed such that relatively low density regions and relatively high density regions are formed in the wet-laid fibrous structure ply and/or wet-laid fibrous structure web, to the extent that the low density regions of the wet-laid fibrous structure ply and/or wet-laid fibrous structure web have very low basis weight, to the point of making pinholes. This is normally undesirable in wet-laid fibrous structure plies and/or wet-laid fibrous structure webs and/or wet-laid fibrous structure making processes, as the pinholes are detrimental to strength as well as opacity. When this wet-laid fibrous structure ply and/or wet-laid fibrous structure web is combined with another fibrous structure ply and/or fibrous structure web, such as a co-formed fibrous structure ply and/or co-formed fibrous structure web, the opacity significantly increases, creating a low density and high opacity multi-ply fibrous structure-containing article.

In yet another example, the multi-ply fibrous structure-containing articles of the present invention are very reopenable while still maintaining consumer acceptable absorbent properties. This is achieved through the combination of two or more different fibrous structure plies at least one of which is embossed with one or more, such as a plurality of embossments that are bonded together, for example on two or more sides of an embossment via a water-resistant bond, such as a thermal bond and/or a water-resistant adhesive bond and/or fibrous structure webs, such as a fibrous structure ply and/or fibrous structure web comprising filaments and/or a mixture of filaments and fibers, and wet-laid fibrous structure ply and/or wet-laid fibrous structure web. In one example, low basis weight filament-containing fibrous structure plies and/or fibrous structure webs, such as scrims of filaments, for example scrims of polypropylene filaments, are arranged on one or more of the exterior surfaces of the multi-ply fibrous structure-containing articles, which in turn further comprises one or more inner fibrous structure plies and/or fibrous structure webs comprising wet-laid fibrous structure plies and/or wet-laid fibrous structure webs and co-formed fibrous structure plies and/or co-formed fibrous structure webs. This combination of materials creates a multi-ply fibrous structure-containing article exhibits very high bulk absorbency and at the same time exhibits high wet resiliency, allowing it to be easily reopened during use, especially after being wetted.

In still another example, the multi-ply fibrous structure-containing articles of the present invention exhibit both high absorbent capacity and high surface drying properties. This combination is achieved through the combination of two or more different fibrous structure plies at least one of which is embossed that exhibit different capillary pressures. One example of such a multi-ply fibrous structure-containing article that exhibits this characteristic is a multi-ply fibrous structure-containing article that has at least one fibrous structure ply comprising one or more wet-laid fibrous structure plies and/or wet-laid fibrous structure webs on one or more exterior surfaces of the multi-ply fibrous structure-containing article, along with at least one fibrous structure ply comprising a co-formed fibrous structure ply and/or co-formed fibrous structure web as one or more inner fibrous structure plies and/or fibrous structure webs within the multi-ply fibrous structure-containing article. This low density co-formed fibrous structure ply and/or co-formed fibrous structure web core of the multi-ply fibrous structure-containing article creates large absorbent capacity, while the wet-laid fibrous structure ply and/or wet-laid fibrous structure web on the outside of the multi-ply fibrous structure-containing article allows for consumer acceptable surface drying.

In even yet another example, the multi-ply fibrous structure-containing articles of the present invention exhibit both high wet bulk and high surface drying properties. This combination is achieved through the combination of two or more different fibrous structure plies at least one of which is embossed that exhibit high capillary pressure with fibrous structure plies and/or fibrous structure webs that exhibit high bulk when wet. One example of such a multi-ply fibrous structure-containing article that exhibits these characteristic is one that has at least one fibrous structure ply comprising one or more wet-laid fibrous structure plies and/or wet-laid fibrous structure webs on one or more exterior surfaces of a multi-ply fibrous structure-containing article, along with at least one fibrous structure ply comprising a co-formed fibrous structure ply and/or co-formed fibrous structure web in the center of the multi-ply fibrous structure-containing article. The co-formed fibrous structure ply and/or co-formed fibrous structure web core does not collapse when wetted, while the wet-laid fibrous structure ply and/or wet-laid fibrous structure web on the outside of the multi-ply fibrous structure-containing article allows for consumer acceptable surface drying.

Non-limiting examples of articles of the present invention are described below in more detail.

Figure 3:
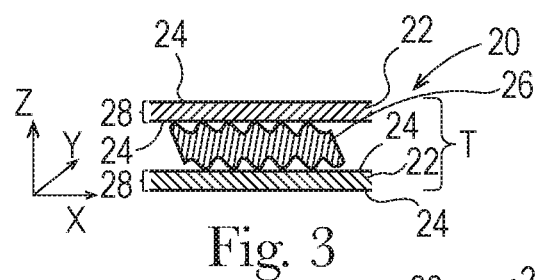
FIG. 3 is a cross-sectional representation of an example of an article according to the present invention.

In one example, as shown in FIG. 3, a multi-ply fibrous structure-containing article 20 of the present invention comprises three fibrous structure plies: 1) a first fibrous structure ply an example of which is shown in FIGS. 2A and 2B comprising a co-formed fibrous structure web 22 (a multi-fibrous element fibrous structure web) associated with two meltblown fibrous structure webs 24 (mono-fibrous element fibrous structure webs) in this case but in another example there may just be one meltblown fibrous structure web 24 on one surface of the co-formed fibrous structure web 22, which function as scrims on opposite surfaces of the co-formed fibrous structure web 22, 2) a second fibrous structure ply an example of which is shown in FIGS. 2A and 2B comprising a co-formed fibrous structure web 22 (a multi-fibrous element fibrous structure web) associated with two meltblown fibrous structure webs 24 (mono-fibrous element fibrous structure webs), which function as scrims on opposite surfaces of the co-formed fibrous structure web 22, and 3) a third fibrous structure ply comprising a wet-laid fibrous structure web 26 (a mono-fibrous element fibrous structure web), for example a textured fibrous structure web, for example a textured wet-laid fibrous structure web, such as a 3D patterned wet-laid fibrous structure web, positioned between and associated with at least one and/or both of the first and second fibrous structure plies, the co-formed fibrous structure plies. The three fibrous structure plies may be associated with each other in one operation or in multiple operations, such as by combining two of the fibrous structure plies first and then combining the remaining fibrous structure ply with the already combined fibrous structure plies. The resulting multi-ply fibrous structure-containing article exhibits a thickness (caliper) "T". In one example, the multi-ply fibrous structure-containing article 20 shown in FIG. 3 is made by combining the pre-formed fibrous structure plies.

Figure 4:
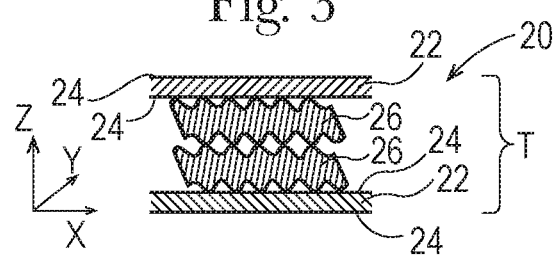
FIG. 4 is a cross-sectional representation of another example of an article according to the present invention.

In one example, as shown in FIG. 4, a multi-ply fibrous structure-containing article 20 of the present invention comprises four fibrous structure plies similar to the a multi-ply fibrous structure-containing article shown in FIG. 3 above: 1) a first fibrous structure ply an example of which is shown in FIGS. 2A and 2B comprising a co-formed fibrous structure web 22 (a multi-fibrous element fibrous structure web) associated with two meltblown fibrous structure webs 24 (mono-fibrous element fibrous structure webs) in this case but in another example there may just be one meltblown fibrous structure web 24 on one surface of the co-formed fibrous structure web 22, which function as scrims on opposite surfaces of the co-formed fibrous structure web 22, 2) a second fibrous structure ply an example of which is shown in FIGS. 2A and 2B comprising a co-formed fibrous structure web 22 (a multi-fibrous element fibrous structure web) associated with two meltblown fibrous structure webs 24 (mono-fibrous element fibrous structures) in this case but in another example there may just be one meltblown fibrous structure web 24 on one surface of the co-formed fibrous structure web 22, which function as scrims on opposite surfaces of the co-formed fibrous structure web 22, and 3) third and fourth fibrous structure plies comprising wet-laid fibrous structure webs 26, (mono-fibrous element fibrous structure webs), which may be the same or different from one another, for example a textured wet-laid fibrous structure web, such as a 3D patterned wet-laid fibrous structure web, positioned between and associated with at least one and/or both of the first and second fibrous plies. All four of the fibrous structure plies may be associated with each other in one operation or in multiple operations, such as by combining two or three of the fibrous structure plies first and then combining the remaining fibrous structure plies with the already combined fibrous structure plies. In one example, the multi-ply fibrous structure-containing article 20 shown in FIG. 4 is made by combining the pre-formed fibrous structure plies.

Figure 5:
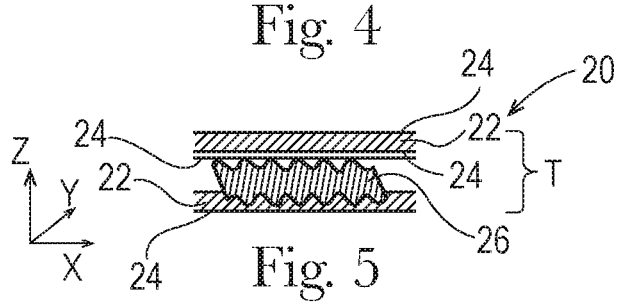
FIG. 5 is a cross-sectional representation of another example of an article according to the present invention.

In one example, as shown in FIG. 5, a multi-ply fibrous structure-containing article 20 of the present invention comprises two fibrous structure plies): 1) a first fibrous structure ply an example of which is shown in FIGS. 2A and 2B comprising a co-formed fibrous structure web 22 (multi-fibrous element fibrous structure web) associated with two meltblown fibrous structure webs 24 (mono-fibrous element fibrous structures) in this case but in another example there may just be one meltblown fibrous structure web 24 on one surface of the co-formed fibrous structure web 22, which function as scrims on opposite surfaces of the co-formed fibrous structure web 22, and 2) a second fibrous structure ply an example of which is shown in FIGS. 6A and 6B comprising a co-formed fibrous structure web 22 (multi-fibrous element fibrous structure web associated with one meltblown fibrous structure web 24 (mono-fibrous element fibrous structure web) on one surface of the co-formed fibrous structure web 22 and a wet-laid fibrous structure web 26 (a mono-fibrous element fibrous structure web), for example direct formed on the wet-laid fibrous structure web, which functions as a scrim, for example a textured wet-laid fibrous structure web, such as a 3D patterned wet-laid fibrous structure web on the opposite surface of the co-formed fibrous structure web 22. The wet-laid fibrous structure web 26 may be further associated with a meltblown fibrous structure web 24 (mono-fibrous element fibrous structure) on the wet-laid fibrous structure web's surface opposite the co-formed fibrous structure web 22. The fibrous structure plies may be associated with each other in one operation, such as by combining the two fibrous structure plies such that the wet-laid fibrous structure web 26 is positioned between the two co-formed fibrous structure webs 22 in the multi-ply fibrous structure-containing article 20. In one example, the multi-ply fibrous structure-containing article 20 shown in FIG. 5 is made by combining the pre-formed fibrous structure plies.

In one example, as shown in FIG. 7, a multi-ply fibrous structure-containing article 20 of the present invention comprises two fibrous structure plies: 1) first and second fibrous structure plies examples of which are shown in FIGS. 6A and 6B comprising a co-formed fibrous structure web 22 (multi-fibrous element fibrous structure web associated with one meltblown fibrous structure web 24 (mono-fibrous element fibrous structure web) on one surface of the co-formed fibrous structure web 22 and a wet-laid fibrous structure web 26 (a mono-fibrous element fibrous structure web), for example direct formed on the wet-laid fibrous structure web, which functions as a scrim, for example a textured wet-laid fibrous structure web, such as a 3D patterned wet-laid fibrous structure web on the opposite surface of the co-formed fibrous structure web 22. The wet-laid fibrous structure web 26 may be further associated with a meltblown fibrous structure web 24 (mono-fibrous element fibrous structure web) on the wet-laid fibrous structure web's surface opposite the co-formed fibrous structure web 22. The fibrous structure plies may be associated with each other in one operation, such as by combining the two fibrous structure plies such that the wet-laid fibrous structure webs 26 are positioned between the two co-formed fibrous structure webs 22 in the multi-ply fibrous structure-containing article 20. In one example, the multi-ply fibrous structure-containing article 20 shown in FIG. 7 is made by combining the pre-formed fibrous structure plies.

In one example, as shown in FIG. 8, an example of a fibrous structure ply an example of which is shown in FIGS. 9A and 9B comprising a wet-laid fibrous structure web 26, such as a textured wet-laid fibrous structure web, (mono-fibrous element fibrous structure web) associated with two meltblown fibrous structure webs 24 (mono-fibrous element fibrous structure webs) in this case but in another example there may just be one meltblown fibrous structure web 24 on one surface of the co-formed fibrous structure web 22, which function as scrims on opposite surfaces of the wet-laid fibrous structure web 26 may be used in the multi-ply fibrous structure-containing article 20 of the present invention.

In one example, as shown in FIG. 10, a multi-ply fibrous structure-containing article 20 of the present invention comprises two structure plies): 1) first and second fibrous structure plies examples of which are shown in FIGS. 9A and 9B comprising a wet-laid fibrous structure web 26, which may be the same or different from one another, such as a textured wet-laid fibrous structure web, (mono-fibrous element fibrous structure web) associated with two meltblown fibrous structure webs 24 (mono-fibrous element fibrous structure webs) in this case but in another example there may just be one meltblown fibrous structure web 24 on one surface of the co-formed fibrous structure web 22, which function as scrims on opposite surfaces of the wet-laid fibrous structure web 26. In one example, the multi-ply fibrous structure-containing article 20 shown in FIG. 10 is made by combining the pre-formed fibrous structure plies.

In one example, as shown in FIG. 11, a multi-ply fibrous structure-containing article 20 of the present invention comprises two fibrous structure plies: 1) a first fibrous structure ply an example of which is shown in FIGS. 9A and 9B comprising a wet-laid fibrous structure web 26, such as a textured wet-laid fibrous structure web, (mono-fibrous element fibrous structure) associated with two meltblown fibrous structure webs 24 (mono-fibrous element fibrous structure webs) in this case but in another example there may just be one meltblown fibrous structure web 24 on one surface of the co-formed fibrous structure web 22, which function as scrims on opposite surfaces of the wet-laid fibrous structure web 26, and 2) a second fibrous structure ply an example of which is shown in FIGS. 6A and 6B comprising a co-formed fibrous structure web 22 (multi-fibrous element fibrous structure web) associated with one meltblown fibrous structure web 24 (mono-fibrous element fibrous structure web) on one surface of the co-formed fibrous structure web 22 and a wet-laid fibrous structure web 26 (a mono-fibrous element fibrous structure web), for example direct formed on the wet-laid fibrous structure web, which functions as a scrim, for example a textured wet-laid fibrous structure web, such as a 3D patterned wet-laid fibrous structure web on the opposite surface of the co-formed fibrous structure web 22. The wet-laid fibrous structure web 26 may be further associated with a meltblown fibrous structure web 24 (mono-fibrous element fibrous structure web) on the wet-laid fibrous structure web's surface opposite the co-formed fibrous structure web 22. The fibrous structure plies may be associated with each other in one operation, such as by combining the two fibrous structure plies such that the wet-laid fibrous structure webs 26 are positioned as shown in FIG. 11. In one example, the multi-ply fibrous structure-containing article 20 shown in FIG. 11 is made by combining the pre-formed fibrous structure plies.

In one example, as shown in FIG. 12, a multi-ply fibrous structure-containing article 20 of the present invention comprises two fibrous structure plies: 1) a first fibrous structure ply an example of which is shown in FIGS. 9A and 9B comprising a wet-laid fibrous structure web 26, such as a textured wet-laid fibrous structure web, (mono-fibrous element fibrous structure web) associated with two meltblown fibrous structure webs 24 (mono-fibrous element fibrous structure webs) in this case but in another example there may just be one meltblown fibrous structure web 24 on one surface of the co-formed fibrous structure web 22, which function as scrims on opposite surfaces of the wet-laid fibrous structure web 26, and 2) a second fibrous structure ply an example of which is shown in FIGS. 2A and 2B comprising a co-formed fibrous structure web 22 (multi-fibrous element fibrous structure web) associated with two meltblown fibrous structure webs 24 (mono-fibrous element fibrous structures), which function as scrims on opposite surfaces of the co-formed fibrous structure web 22. The fibrous structure plies may be associated with each other in one operation, such as by combining the two fibrous structure plies as shown in FIG. 12. In one example, the multi-ply fibrous structure-containing article 20 shown in FIG. 12 is made by combining the pre-formed fibrous structure plies.

In one example, as shown in FIG. 13, an example of a fibrous structure ply an example of which is shown in FIGS. 14A and 14B comprising a co-formed fibrous structure web 22 (multi-fibrous element fibrous structure web) associated with one meltblown fibrous structure web 24 (mono-fibrous element fibrous structure web) on one surface of the co-formed fibrous structure web 22 and a wet-laid fibrous structure web 26 (a mono-fibrous element fibrous structure web), for example direct formed on the wet-laid fibrous structure web, which functions as a scrim, for example a textured wet-laid fibrous structure web, such as a 3D patterned wet-laid fibrous structure web on the opposite surface of the co-formed fibrous structure web 22. The wet-laid fibrous structure web 26 may be further associated with another co-formed fibrous structure web 22, for example direct formed on the wet-laid fibrous structure web, which functions as a scrim, which in turn may be associated with another meltblown fibrous structure web 24 (mono-fibrous element fibrous structure web) such that the wet-laid fibrous structure web 26 is positioned between the two co-formed fibrous structure webs 22 may be used in the multi-ply fibrous structure-containing article 20 of the present invention.

In one example, as shown in FIG. 15, a multi-ply fibrous structure-containing article 20 of the present invention comprises two fibrous structure plies: 1) first and second fibrous structure plies examples of which are shown in FIGS. 6A and 6B comprising a two different co-formed fibrous structure webs 22 or a variable density (in the z-direction) co-formed fibrous structure web 30 example of which is shown in FIGS. 16A and 16B (multi-fibrous element fibrous structure web) associated with one meltblown fibrous structure web 24 (mono-fibrous element fibrous structure web) on one surface of the co-formed fibrous structure web 22 and a wet-laid fibrous structure web 26 (a mono-fibrous element fibrous structure web), for example direct formed on the wet-laid fibrous structure web, which functions as a scrim, for example a textured wet-laid fibrous structure web, such as a 3D patterned wet-laid fibrous structure web on the opposite surface of the co-formed fibrous structure web 22. The wet-laid fibrous structure web 26 may be further associated with a meltblown fibrous structure web 24 (mono-fibrous element fibrous structure web) on the wet-laid fibrous structure web's surface opposite the co-formed fibrous structure web 22. The fibrous structure plies may be associated with each other in one operation, such as by combining the two fibrous plies such that the wet-laid fibrous structure webs 26 are positioned between the two co-formed fibrous structure webs 22 in the multi-ply fibrous structure-containing article 20. In one example, the article 20 shown in FIG. 15 is made by combining the pre-formed fibrous structure plies.

In one example, as shown in FIG. 17, a multi-ply fibrous structure-containing article 20 of the present invention comprises two fibrous structure plies: 1) first and second fibrous structure plies examples of which are shown in FIGS. 6A and 6B comprising a co-formed fibrous structure web 22 (multi-fibrous element fibrous structure web) associated with one meltblown fibrous structure web 24 (mono-fibrous element fibrous structure web) on one surface of the co-formed fibrous structure web 22 and a wet-laid fibrous structure web 26 (a mono-fibrous element fibrous structure web), for example direct formed on the wet-laid fibrous structure web, which functions as a scrim, for example a textured wet-laid fibrous structure web, such as a 3D patterned wet-laid fibrous structure web on the opposite surface of the co-formed fibrous structure web 22. The wet-laid fibrous structure web 26 may be further associated with a meltblown fibrous structure web 24 (mono-fibrous element fibrous structure web) on the wet-laid fibrous structure web's surface opposite the co-formed fibrous structure web 22. The fibrous structure plies may be associated with each other in one operation, such as by combining the two fibrous structure plies such that the co-formed fibrous structure webs 22 are positioned between the two wet-laid fibrous structure webs 26 in the multi-ply fibrous structure-containing article 20. In one example, the multi-ply fibrous structure-containing article 20 shown in FIG. 17 is made by combining the pre-formed fibrous structure plies. The multi-ply fibrous structure-containing article 20 shown in FIG. 17 is similar to the multi-ply fibrous structure-containing article 20 shown in FIG. 7, with a different arrangement of the fibrous structure plies and/or fibrous structure webs within the multi-ply fibrous structure-containing article 20.

In one example, as shown in FIG. 18, a multi-ply fibrous structure-containing article 20 of the present invention comprises three fibrous structure plies: 1) a first fibrous structure ply) example of which is shown in FIGS. 2A and 2B comprising a co-formed fibrous structure web 22 (a multi-fibrous element fibrous structure web) associated with two meltblown fibrous structure webs 24 (mono-fibrous element fibrous structure webs), which function as scrims on opposite surfaces of the co-formed fibrous structure web 22 forming a co-formed fibrous structure ply 28, 2) second and third fibrous structure plies comprising wet-laid fibrous structure webs 26 (mono-fibrous element fibrous structure webs), for example a textured wet-laid fibrous structure web, for example a textured wet-laid fibrous structure web, such as a 3D patterned wet-laid fibrous structure web associated with the co-formed fibrous structure ply 28. The wet-laid fibrous structure web 26 may also be associated with one or more meltblown fibrous structure webs 24 present on one or both of the wet-laid fibrous structure web's surfaces. FIG. 19 shows a similar multi-ply fibrous structure-containing article 20 to that shown in FIG. 18 except that the wet-laid fibrous structure web 26 forms at least one or both of the exterior surfaces of the multi-ply fibrous structure-containing article 20. In otherwords, the wet-laid fibrous structure web 26 is not associated with a meltblown fibrous structure web scrim that forms an exterior surface of the multi-ply fibrous structure-containing article 20. The fibrous structure plies may be associated with each other in one operation or in multiple operations, such as by combining two of the fibrous structure plies first and then combining the remaining fibrous structure ply with the already combined fibrous structure plies. In one example, the multi-ply fibrous structure-containing article 20 shown in FIG. 18 is made by combining the pre-formed fibrous structure plies.

In one example, as shown in FIG. 20, a multi-ply fibrous structure-containing article 20 of the present invention comprises two fibrous structure plies: 1) first and second fibrous structure plies examples of which are shown in FIGS. 21A and 21B comprising a co-formed fibrous structure web 22 (a multi-fibrous element fibrous structure web) associated with two meltblown fibrous structure webs 24 (mono-fibrous element fibrous structure webs), which function as scrims on opposite surfaces of the co-formed fibrous structure web 22 forming a co-formed fibrous structure ply 28, wherein the co-formed fibrous structure ply 28 is associated with a wet-laid fibrous structure web 26 (mono-fibrous element fibrous structure web), for example a textured wet-laid fibrous structure web, such as a 3D patterned wet-laid fibrous structure web. The wet-laid fibrous structure web 26 may be associated with one or more meltblown fibrous structure webs 24 present on one or both of the wet-laid fibrous structure web's surfaces. The fibrous structure plies may be associated with each other in one operation, such as by combining the fibrous structure plies such that the wet-laid fibrous structure webs 26 are positioned between the co-formed fibrous structure plies 28. In one example, the multi-ply fibrous structure-containing article 20 shown in FIG. 20 is made by combining the pre-formed fibrous structure plies).

Figure 22A:
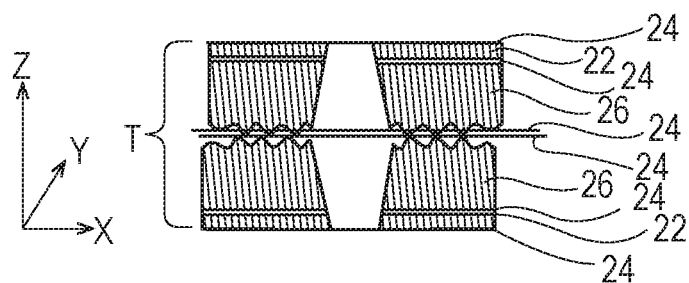
FIG. 22A is a cross-sectional representation of another example of an article according to the present invention.
Figure 22B:
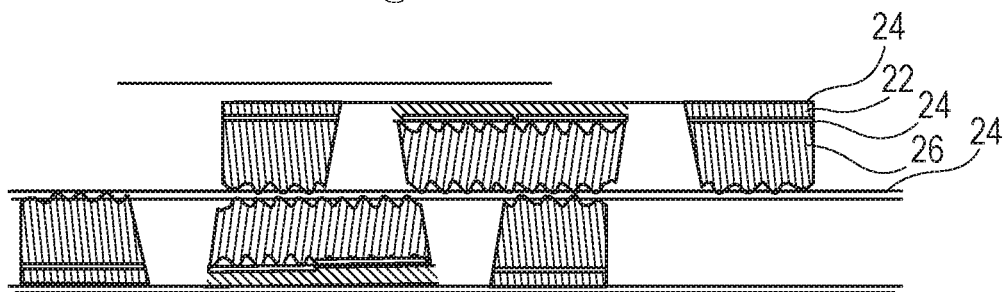
FIG. 22B is a cross-sectional representation of another example of an article according to the present invention.

In one example, as shown in FIGS. 22A and 22B, a multi-ply fibrous structure-containing article 20 of the present invention comprises two fibrous structure plies: 1) first and second fibrous structure plies examples of which are shown in FIGS. 23A and 23B comprising a co-formed fibrous structure web 22 (a multi-fibrous element fibrous structure web) associated with two meltblown fibrous structure webs 24 (mono-fibrous element fibrous structure webs), which function as scrims on opposite surfaces of the co-formed fibrous structure web 22 forming a co-formed fibrous structure ply 28, wherein the co-formed fibrous structure ply 28 is associated with a wet-laid fibrous structure web 26 (mono-fibrous element fibrous structure web), for example a textured wet-laid fibrous structure web, such as a 3D patterned wet-laid fibrous structure web. The wet-laid fibrous structure web 26 may be associated with one or more meltblown fibrous structure webs 24 present on one or both of the wet-laid fibrous structure web's surfaces. The fibrous structure plies may be associated with each other in one operation, such as by combining the fibrous structure plies such that the wet-laid fibrous structure webs 26 are positioned between the co-formed fibrous plies 28. In one example, the multi-ply fibrous structure-containing article 20 shown in FIGS. 22A and 22B is made by combining the pre-formed fibrous structure plies.

Figure 25A:
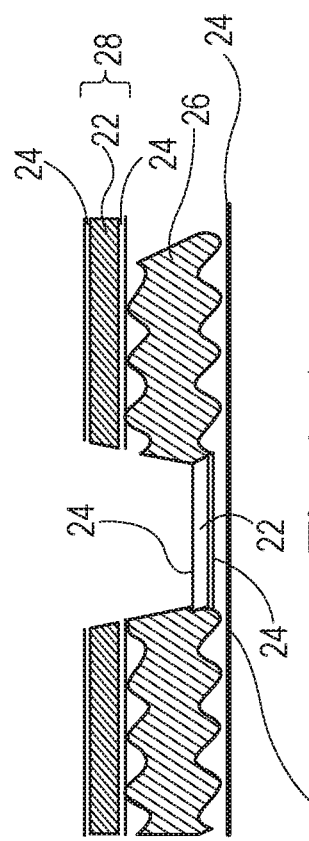
FIG. 25A is a cross-sectional representation of another example of a fibrous structure web according to the present invention suitable for use in the article of FIGS. 24A and 24B.
Figure 25B:
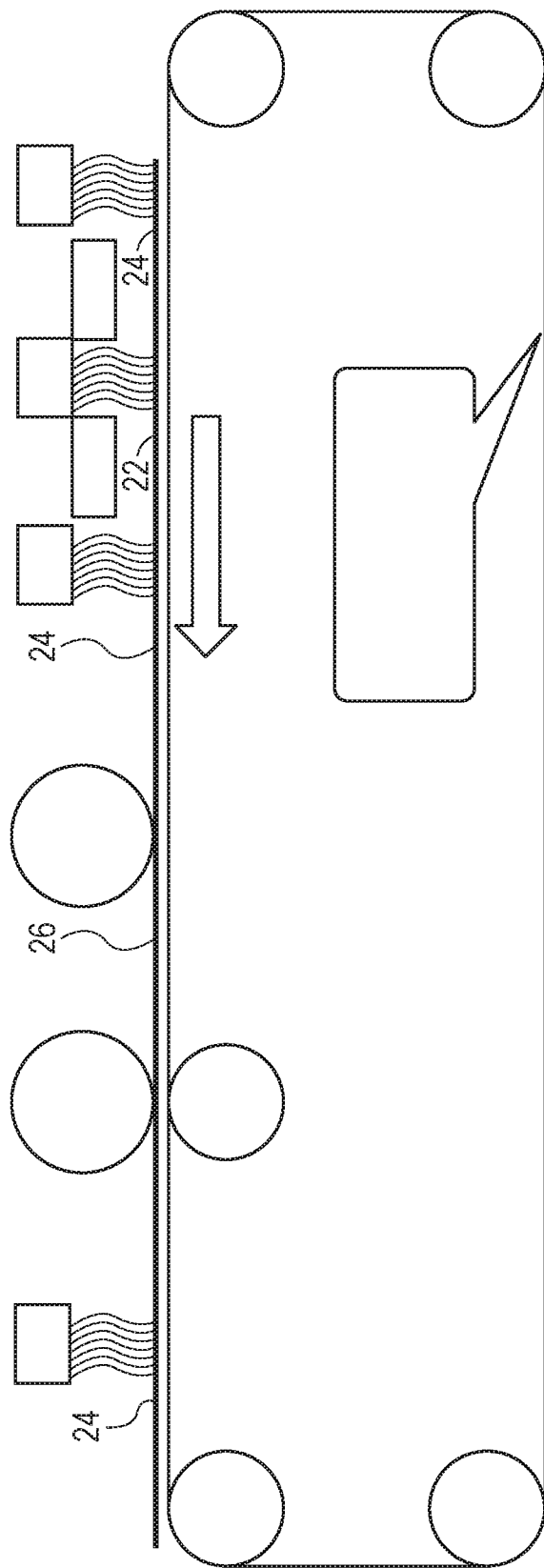
FIG. 25B is an example of a process for making the fibrous structure web of FIG. 25A.

In one example, as shown in FIGS. 24A and 24B, a multi-ply fibrous structure-containing article 20 of the present invention comprises two fibrous structure plies: 1) first and second fibrous structure plies examples of which are shown in FIGS. 25A and 25B comprising a co-formed fibrous structure web 22 (a multi-fibrous element fibrous structure web) associated with two meltblown fibrous structure webs 24 (mono-fibrous element fibrous structure webs), which function as scrims on opposite surfaces of the co-formed fibrous structure web 22 forming a co-formed fibrous structure ply 28, wherein the co-formed fibrous structure ply 28 is associated with a wet-laid fibrous structure web 26 (mono-fibrous element fibrous structure web), for example a textured wet-laid fibrous structure web, such as a 3D patterned wet-laid fibrous structure web. The wet-laid fibrous structure web 26 may be associated with one or more meltblown fibrous structure webs 24 present on one or both of the wet-laid fibrous structure web's surfaces. The fibrous structure plies may be associated with each other in one operation, such as by combining the fibrous structure plies such that the wet-laid fibrous structure webs 26 are positioned between the co-formed fibrous plies 28. In one example, the multi-ply fibrous structure-containing article 20 shown in FIGS. 24A and 24B is made by combining the pre-formed fibrous fibrous structure plies.

Figure 26A:
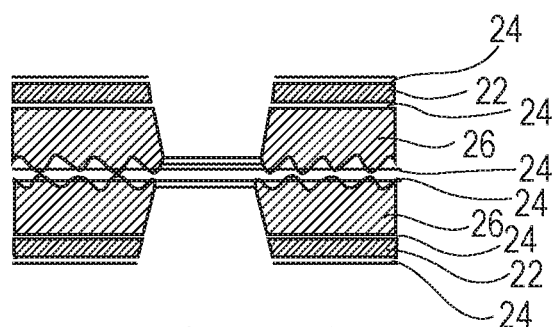
FIG. 26A is a cross-sectional representation of another example of an article according to the present invention.
Figure 26B:
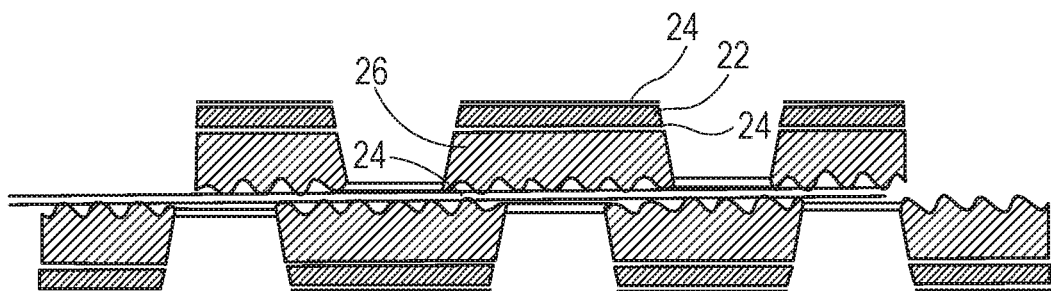
FIG. 26B is a cross-sectional representation of another example of an article according to the present invention.
Figure 27A:
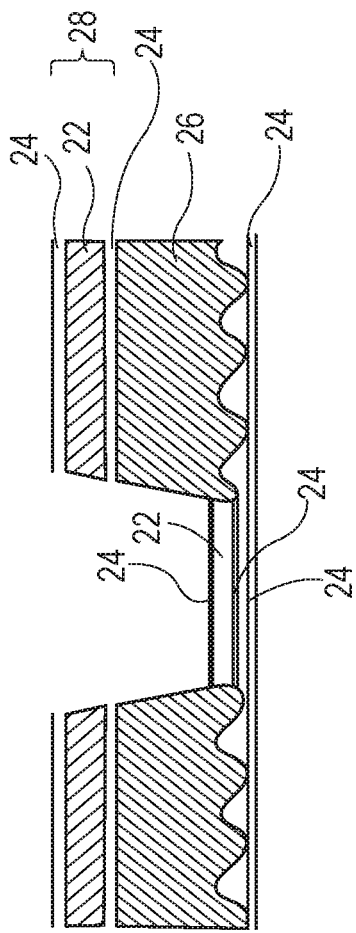
FIG. 27A is a cross-sectional representation of another example of a fibrous structure web according to the present invention suitable for use in the article of FIGS. 26A and 26B.
Figure 27B:
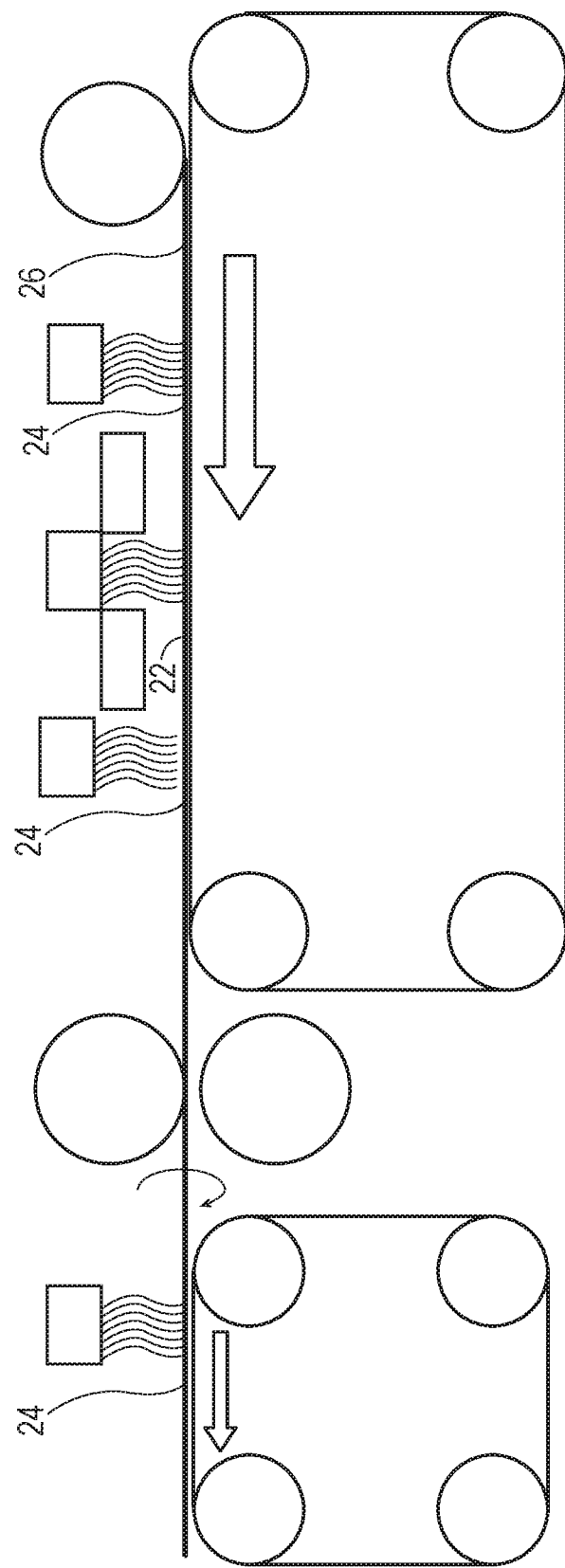
FIG. 27B is an example of a process for making the fibrous structure web of FIG. 27A.

In one example, as shown in FIGS. 26A and 26B, a multi-ply fibrous structure-containing article 20 of the present invention comprises two fibrous structure plies: 1) first and second fibrous structure plies examples of which are shown in FIGS. 27A and 27B comprising a co-formed fibrous structure web 22 (a multi-fibrous element fibrous structure web) associated with two meltblown fibrous structure webs 24 (mono-fibrous element fibrous structure webs), which function as scrims on opposite surfaces of the co-formed fibrous structure web 22 forming a co-formed fibrous structure ply 28, wherein the co-formed fibrous structure ply 28 is associated with a wet-laid fibrous structure web 26 (mono-fibrous element fibrous structure web), for example a textured wet-laid fibrous structure web, such as a 3D patterned wet-laid fibrous structure web. The wet-laid fibrous structure web 26 may be associated with one or more meltblown fibrous structure webs 24 present on one or both of the wet-laid fibrous structure web's surfaces. The fibrous structure plies may be associated with each other in one operation, such as by combining the fibrous structure plies such that the wet-laid fibrous structure webs 26 are positioned between the co-formed fibrous structure plies 28. In one example, the multi-ply fibrous structure-containing article 20 shown in FIGS. 26A and 26B is made by combining the pre-formed fibrous structure plies. Any of the fibrous structure webs and fibrous structure plies within a multi-ply fibrous structure-containing article of the present invention may be the same or different from one another (for example compositionally and/or texturally, etc). For example, two or more co-formed fibrous structure plies may be the same or different from one another. For example, two or more wet-laid fibrous structure plies may be the same or different (for example compositionally, texturally, etc.) from one another. Further any of the fibrous structure web within a fibrous structure ply may be the same or different (for example compositionally, texturally, etc.) from one another.

The articles of the present invention and/or any fibrous webs of the present invention may be subjected to any post-processing operations such as embossing operations, printing operations, tuft-generating operations, thermal bonding operations, ultrasonic bonding operations, perforating operations, surface treatment operations such as application of lotions, silicones and/or other materials and mixtures thereof.

Physical Properties of Articles of the Present Invention

The articles of the present inventions due their fibrous structures and/or the arrangement of the fibrous structures in the articles exhibit novel physical properties, for example absorbent, strength, fluid retention, surface drying, thickness, bulk, compressibility, flexibility, and resiliency, and novel combinations of two or more of these properties.

The article of the present invention may exhibit one or more of the following properties:
  a. HFS of greater than 17.0 and/or greater than 18.0 and/or greater than 19.0 and/or greater than 20.0 and/or greater than 22.0 and/or greater than 24.0 g/g as measured according to the HFS Test Method described herein;
  b. VFS of greater than 11.0 and/or greater than 11.5 and/or greater than 12.0 and/or greater than 12.5 and/or greater than 13.0 and/or greater than 13.5 and/or greater than 14.0 g/g as measured according to the VFS Test Method described herein;
  c. CRT Rate of greater than 0.35 and/or greater than 0.40 and/or greater than 0.45 and/or greater than 0.50 and/or greater than 0.55 and/or greater than 0.60 g/second as measured according to the CRT Test Method described herein;
  d. CRT Capacity of greater than 14.00 and/or greater than 15.00 and/or greater than 17.00 and/or greater than 19.00 and/or greater than 21.00 and/or greater than 24.00 g/g as measured according to the CRT Test Method described herein;
  e. CRT Area of greater than 0.60 and/or greater than 0.65 and/or greater than 0.75 and/or greater than 0.85 and/or greater than 0.95 and/or greater than 1.00 and/or greater than 1.25 g/in$^2$ as measured according to the CRT Test Method described herein;
  f. Pore Volume Distribution (Pores having radii of from 2.5-30 μm) of greater than 5% and/or greater than 6% and/or greater than 7% and/or greater than 8% as measured according to the Pore Volume Distribution Test Method described herein;
  g. Pore Volume Distribution (Pores having radii of greater than 225 μm) of greater than 15% and/or greater than 20% and/or greater than 30% and/or greater than 40% and/or greater than 45% as measured according to the Pore Volume Distribution Test Method described herein;
  h. Pore Volume Distribution (Pores having radii of from 301-600 μm) of greater than 6% and/or greater than 8% and/or greater than 10% and/or greater than 12% and/or greater than 15% and/or greater than 20% and/or greater than 25% as measured according to the Pore Volume Distribution Test Method described herein;
  i. Plate Stiffness of less than 17.0 and/or less than 15.0 and/or less than 10.0 and/or less than 8.0 N*mm as measured according to the Plate Stiffness Test Method described herein;
  j. Plate Stiffness of less than 0.190 and/or less than 0.180 and/or less than 0.170 and/or less than 0.160 and/or less than 0.150 N*mg/M as measured according to the Plate Stiffness Test Method described herein;
  k. Flexural Rigidity Overhang of less than 10.6 and/or less than 10.0 and/or less than 9.5 and/or less than 9.0 cm as measured according to the Flexural Rigidity Test Method described herein;
  l. Bending Modulus (Calculate Flexural Rigidity/Caliper$^3$) of less than 8.00 and/or less than 7.00 and/or less than 6.00 and/or less than 5.00.
  m. Dry Thick Compression of greater than 700 and/or greater than 750 and/or greater than 900 and/or greater than 1000 and/or greater than 1100 and/or greater than 1200 and/or greater than 1300 and/or greater than 1400 (mils*mils/log(gsi)) as measured according to the Dry Thick Compression and Recovery Test Method described herein;
  n. Dry Thick Compressive Recovery of greater than 500 and/or greater than 600 and/or greater than 700 and/or greater than 800 and/or greater than 900 and/or greater than 1000 (mils*mils/log(gsi)) as measured according to the Dry Thick Compression and Recovery Test Method described herein;
  o. Wet Thick Compression of greater than than 1850 and/or greater than 2000 and/or greater than 2200 and/or greater than 2500 and/or greater than 3000 and/or greater than 3200 and/or greater than 3500 (mils*mils/log(gsi)) as measured according to the Wet Thick Compression and Recovery Test Method described herein;
  p. Wet Thick Compressive Recovery of greater than 850 and/or greater than 1000 and/or greater than 1200 and/or greater than 1500 and/or greater than 1700 and/or greater than 2000 (mils*mils/log(gsi)) as measured according to the Wet Thick Compression and Recovery Test Method described herein;
q. Low Load Wet Resiliency of greater than 0.50 and/or greater than 0.55 and/or greater than 0.60 and/or greater than 0.65 and/or greater than 0.70 and/or greater than 0.75 and/or greater than 0.80 and/or greater than 0.85 and/or greater than 0.90 and/or greater than 0.95 and/or greater than 1.00 as measured according to the Dry Thick Compression and Recovery Test Method and Wet Thick Compression and Recovery Test Method described herein;
r. Mid Load Wet Resiliency of greater than 0.50 and/or greater than 0.55 and/or greater than 0.60 and/or greater than 0.65 and/or greater than 0.70 and/or greater than 0.75 as measured according to the Dry Thick Compression and Recovery Test Method and Wet Thick Compression and Recovery Test Method described herein;
s. Wet Burst of greater than 450 and/or greater than 500 and/or greater than 600 and/or greater than 700 and/or greater than 750 g as measured according to the Wet Burst Test Method described herein;
t. Wet Burst BEA of greater than 10 and/or greater than 15 and/or greater than 20 and/or greater than 25 and/or greater than 30 and/or greater than 35 g-in/in²
u. Wet Burst/Dry Burst of greater than 0.5 and/or greater than 0.6 and/or greater than 0.7 and/or 0.75 as measured according to the Wet Burst Test Method and Dry Burst Test Method described herein;
v. Wet MD Tensile of greater than 475 and/or greater than 480 and/or greater than 485 and/or greater than 490 and/or greater than 495 and/or greater than 500 and/or greater than 550 g/in as measured according to the Wet Tensile Test Method described herein;
w. Wet CD TEA/Dry CD TEA of greater than 1.3 and/or greater than 1.4 and/or greater than 1.5 and/or greater than 1.6 and/or greater than 1.7 and/or greater than 1.8 as measured according to the Wet Tensile Test Method and Dry Tensile Test Method described herein;
x. Geometric Mean (GM) Wet TEA of greater than 25 and/or greater than 30 and/or greater than 50 and/or greater than 70 and/or greater than 100 and/or greater than 125 g/cm*% as measured according to the Wet Tensile Test Method described herein;
y. Dry Bulk of greater than 14.5 and/or greater than 15.0 and/or greater than 16.0 and/or greater than 17.0 and/or greater than 18.0 and/or greater than 19.0 cc/g ("cm³/g") as measured according to the Bulk Test Method described herein.

Table 1 below shows data from inventive samples and prior art samples.

TABLE 1

| Sample | BW (gsm) | Continuous Filament containing | Commingled Filament & Fiber | Wet-Laid Fibrous Structure Ply - Pulp Fibers Only (Layer of Paper) | Wet-Laid Fibrous Structure Ply - Pulp Fibers and Synthetic Staple Fibers | Filament outward facing | Filament and commingled outward facing |
|---|---|---|---|---|---|---|---|
| Invention | 61.9 | Yes | Yes | Yes | No | Yes | Yes |
| Invention | 60.3 | Yes | Yes | Yes | No | Yes | Yes |
| Invention | 62.9 | Yes | Yes | Yes | No | Yes | Yes |
| Invention | 63.3 | Yes | Yes | Yes | No | Yes/No | Yes/No |
| Invention | 60.13 | Yes | Yes | Yes | No | Yes/No | Yes/No |
| Invention | 60.4 | Yes | Yes | Yes | No | Yes/No | Yes/No |
| Invention | 61.5 | Yes | Yes | Yes | No | Yes/No | Yes/No |
| Invention | 62.1 | Yes | Yes | Yes | No | Yes/No | Yes/No |
| Invention | 61.7 | Yes | No | Yes | No | Yes | No |
| Invention | 63 | Yes | Yes | Yes | No | Yes | Yes |
| Invention | 57.3 | No/5 mm Bico Staple Fibers | No | No | Yes | No | No |
| Invention | 57.4 | No/5 mm Bico Staple Fibers | No | No | Yes | No | No |
| Invention | 58.5 | No/5 mm Bico Staple Fibers | No | No | Yes | No | No |
| Invention | 54.3 | No/5 mm Bico Staple Fibers | No | No | Yes | No | No |
| Invention | 53.3 | No/5 mm Bico Staple Fibers | No | No | Yes | No | No |
| Invention | 54.1 | No/5 mm Bico Staple Fibers | No | No | Yes | No | No |
| Invention | 54.4 | No/5 mm Bico Staple Fibers | No | No | Yes | No | No |
| U.S. Provisional App. No. 62/409,202 filed Oct. 17, 2016 | 82 | Yes | Yes | Yes | No | Yes | Yes |

TABLE 1-continued

| Sample | | | | | | | |
|---|---|---|---|---|---|---|---|
| U.S. Provisional App. No. 62/409,202 filed Oct. 17, 2016 | 81.6 | Yes | Yes | Yes | No | Yes | No |
| U.S. Provisional App. No. 62/409,202 filed Oct. 17, 2016 | 84.6 | Yes | Yes | Yes | No | No | No |
| U.S. Provisional App. No. 62/409,202 filed Oct. 17, 2016 | 84.0 | Yes | Yes | Yes | No | Yes | Yes |
| U.S. Provisional App. No. 62/409,202 filed Oct. 17, 2016 | 58.5 | Yes | Yes | Yes | No | Yes | Yes |
| Prior Art Bounty | 53.8 | No | No | Yes | No | No | No |
| Prior Art Viva (DRC) | 59.8 | No | No | Yes | No | No | No |
| Prior Art Brawny (Fabric TAD) | 51.5 | No | No | Yes | No | No | No |
| Prior Art Sparkle (Conv.) | 49.1 | No | No | Yes | No | No | No |
| Prior Art Bounty Basic | 40.3 | No | No | Yes | No | No | No |
| Prior Art with Continuous Filament | 58.7 | Yes | Yes | No | No | Yes | Yes |
| Prior Art with Continuous Filament | 61.6 | Yes | Yes | No | No | Yes | Yes |
| Prior Art with Continuous Filament | 55.4 | Yes | Yes | No | No | Yes | Yes |

| Sample | % Synthetic Polymer (Continuous Filaments and/or Staple Fibers) | Geometric Mean Dry Tensile Modulus | Wet BEA/ Dry BEA | CRT Area $(g/in^2)$ | Wet Burst/ Dry Burst $(g/g)$ | Wet MD Tensile $(g/in)$ | Total Wet Tensile $(g/in)$ |
|---|---|---|---|---|---|---|---|
| Invention | 20 | 1292 | 1.05 | 0.77 | 0.82 | 579 | 872 |
| Invention | 20 | 1218 | 0.93 | 0.94 | 0.75 | 657 | 913 |
| Invention | 15 | 1246 | 1.04 | 0.79 | 0.76 | 536 | 744 |
| Invention | 9 | 1902 | 0.48 | 0.77 | 0.42 | 535 | 732 |
| Invention | 9 | 1833 | 0.72 | 0.78 | 0.58 | 412 | 618 |
| Invention | 9 | 2328 | 0.62 | 0.76 | 0.53 | 499 | 762 |
| Invention | 9 | 2249 | 0.57 | 0.81 | 0.50 | 433 | 669 |
| Invention | 9 | 2171 | 1.14 | 0.70 | 0.62 | 492 | 677 |
| Invention | 7 | 2925 | 0.64 | 0.74 | 0.50 | 621 | 984 |
| Invention | 20 | 1596 | 0.86 | 0.83 | 0.67 | 625 | 860 |
| Invention | 10 | 2539 | 0.40 | 0.73 | 0.36 | | 633 |
| Invention | 10 | 2456 | 0.38 | 0.78 | 0.34 | | 534 |
| Invention | 10 | 2779 | 0.49 | 0.68 | 0.44 | | 660 |
| Invention | 3 | 3129 | 0.38 | 0.63 | 0.37 | | 754 |
| Invention | 3 | 3144 | 0.40 | 0.63 | 0.38 | | 689 |
| Invention | 10 | 3075 | 0.51 | 0.56 | 0.46 | | 818 |
| Invention | 10 | 2843 | 0.44 | 0.60 | 0.43 | | 813 |
| U.S. Provisional App. No. 62/409,202 filed Oct. 17, 2016 | 15 | 1430 | 1.04 | 0.89 | 0.78 | 486 | 682 |
| U.S. Provisional App. No. 62/409,202 filed Oct. 17, 2016 | 13 | 1760 | 0.82 | 1.02 | 0.65 | 196 | 487 |
| U.S. Provisional App. No. 62/409,202 filed Oct. 17, 2016 | 8 | 1311 | 0.73 | 1.31 | 0.57 | 340 | 522 |
| U.S. Provisional App. No. 62/409,202 filed Oct. 17, 2016 | 15 | 2033 | 1.17 | 0.88 | 0.76 | 598 | 879 |
| U.S. Provisional App. No. 62/409,202 filed Oct. 17, 2016 | 21 | 1077 | 1.00 | 0.79 | 0.80 | 482 | 721 |
| Prior Art Bounty | 0 | 2550 | 0.43 | 0.68 | 0.42 | 410 | 688 |
| Prior Art Viva (DRC) | 0 | 765 | 0.39 | 0.47 | 0.44 | 332 | 517 |
| Prior Art Brawny (Fabric TAD) | 0 | 2799 | 0.41 | 0.48 | 0.38 | 269 | 521 |
| Prior Art Sparkle (Conv.) | 0 | 4214 | 0.32 | 0.3 | 0.27 | 276 | 420 |
| Prior Art Bounty Basic | 0 | 1783 | 0.45 | 0.31 | 0.48 | 367 | 549 |
| Prior Art with Continuous Filament | 21 | 772 | 0.77 | | 0.84 | 417 | 674 |
| Prior Art with Continuous Filament | 20 | 492 | 1.04 | 0.59 | 1.01 | 425.6 | 664 |
| Prior Art with Continuous Filament | 23 | 2057 | 0.90 | 0.42 | 1.05 | 523 | 813 |

TABLE 1-continued

| Sample | Wet Web-Web CoF Front-to-Front (g/g) | Wet Web-Web CoF Back-to-Back (g/g) | Wet Web-Web CoF Back-to-Front (g/g) | Dry Tensile MD Modulus | Dry Tensile CD Modulus | Dry MD Tensile TEA | Dry CD Tensile TEA |
|---|---|---|---|---|---|---|---|
| Invention | 0.85 | 0.6925 | 0.685 | 1951 | 855 | 136 | 77 |
| Invention | 0.97 | 0.9875 | 0.965 | 2557 | 580 | 128 | 63 |
| Invention | 0.87 | 0.7225 | 0.75 | 1908 | 814 | 91 | 56 |
| Invention | 0.83 | 1.54 | 1.09 | 1322 | 2736 | 130 | 34 |
| Invention | 0.983 | 1.770 | 1.275 | 1235 | 2721 | 143 | 43 |
| Invention | 0.908 | 1.750 | 1.353 | 1494 | 3628 | 137 | 47 |
| Invention | 0.925 | 1.705 | 1.365 | 1525 | 3316 | 128 | 49 |
| Invention | 0.91 | 1.625 | 1.22 | 2760 | 1707 | 93 | 33 |
| Invention | 0.87 | 0.7625 | 0.72 | 2990 | 2862 | 180 | 73 |
| Invention | 0.89 | 0.8175 | 0.85 | 2242 | 1136 | 160 | 92 |
| Invention | 1.948 | 1.903 | 1.950 | 2169 | 2972 | 93 | 66 |
| Invention | 1.975 | 1.758 | 1.790 | 1877 | 3214 | 81 | 61 |
| Invention | 1.830 | 1.758 | 1.828 | 2280 | 3395 | 94 | 66 |
| Invention | 1.778 | 1.758 | 1.768 | 2244 | 4363 | 108 | 62 |
| Invention | 1.870 | 1.925 | 1.893 | 2590 | 3818 | 92 | 56 |
| Invention | 1.825 | 1.775 | 1.825 | 2497 | 3792 | 120 | 63 |
| Invention | 1.710 | 1.763 | 1.798 | 2391 | 3382 | 107 | 60 |
| U.S. Provisional App. No. 62/409,202 filed Oct. 17, 2016 | 0.82 | 0.78 | 0.76 | 2080 | 983 | 160 | 57 |
| U.S. Provisional App. No. 62/409,202 filed Oct. 17, 2016 | 1.038 | 1.033 | 1.023 | 1755 | 1766 | 150 | 71 |
| U.S. Provisional App. No. 62/409,202 filed Oct. 17, 2016 | 2.28 | 1.89 | 1.8125 | 1255 | 1369 | 106 | 47 |
| U.S. Provisional App. No. 62/409,202 filed Oct. 17, 2016 | 0.843 | 0.770 | 0.838 | 2550 | 1621 | 155 | 61 |
| U.S. Provisional App. No. 62/409,202 filed Oct. 17, 2016 | 0.885 | 0.838 | 0.923 | 1945 | 597 | 124 | 72 |
| Prior Art Bounty | 1.92 | 1.9225 | 1.945 | 1891 | 3438 | 94 | 51 |
| Prior Art Viva (DRC) | 1.883 | 1.833 | 1.915 | 685 | 856 | 80 | 44 |
| Prior Art Brawny (Fabric TAD) | 1.843 | 1.813 | 1.813 | 2143 | 3656 | 80 | 37 |
| Prior Art Sparkle (Conv.) | 1.18 | 1.3125 | 1.2475 | 2710 | 6551 | 91 | 24 |
| Prior Art Bounty Basic | 1.765 | 1.683 | 1.725 | 1420 | 2238 | 83 | 19 |
| Prior Art with Continuous Filament | 0.835 | 0.895 | 0.878 | 1469 | 406 | 143 | 124 |
| Prior Art with Continuous Filament | 1.113 | 1.133 | 1.110 | 665.8 | 363 | 119 | 103 |
| Prior Art with Continuous Filament | 0.718 | 0.675 | 0.715 | 3479 | 1216.4 | 166 | 128 |

| Sample | MikroCAD Top-Roll Outside Facing | MikroCAD Mid-Roll Outside Facing | MikroCAD Bottom-Roll Outside Facing | MikroCAD Top-Roll Inside Facing | MikroCAD Mid-Roll Inside Facing | MikroCAD Bottom-Roll Inside Facing |
|---|---|---|---|---|---|---|
| Invention | 1.78 | 1.50 | 1.38 | 0.40 | 0.46 | 0.42 |
| Invention | 2.07 | 1.66 | 1.70 | 0.41 | 0.41 | 0.42 |
| Invention | 2.14 | 1.77 | 1.73 | 0.42 | 0.52 | 0.44 |
| Invention | 2.07 | 1.55 | 1.59 | 0.62 | 0.71 | 0.66 |
| Invention | 1.72 | 1.51 | 1.41 | 0.71 | 0.69 | 0.64 |
| Invention | 2.00 | 1.90 | 1.67 | 0.72 | 0.88 | 0.84 |
| Invention | 2.02 | 1.84 | 1.71 | 0.75 | 0.82 | 0.82 |
| Invention | 1.72 | 1.51 | 1.41 | 0.71 | 0.69 | 0.64 |
| Invention | 2.00 | 1.90 | 1.67 | 0.72 | 0.88 | 0.84 |
| Invention | 2.02 | 1.84 | 1.71 | 0.75 | 0.82 | 0.82 |
| Invention | 1.72 | 1.52 | 1.44 | 0.59 | 0.66 | 0.61 |
| Invention | 1.94 | 1.73 | 1.85 | 0.57 | 0.62 | 0.68 |
| Invention | 1.64 | 1.57 | 1.58 | 0.56 | 0.63 | 0.63 |
| Invention | 0.94 | 0.91 | 0.88 | 0.52 | 0.51 | 0.51 |
| Invention | 1.38 | 1.28 | 1.25 | 0.55 | 0.61 | 0.57 |
| Invention | 0.89 | 0.83 | 0.81 | 0.48 | 0.47 | 0.48 |
| Invention | 1.32 | 1.22 | 1.21 | 0.53 | 0.56 | 0.56 |
| U.S. Provisional App. No. 62/409,202 filed Oct. 17, 2016 | 1.12 | 0.89 | 1.16 | 0.94 | 1.00 | 0.87 |
| U.S. Provisional App. No. 62/409,202 filed Oct. 17, 2016 | | 0.97 | 0.94 | | 0.84 | 0.80 |

TABLE 1-continued

| Sample | | | | | |
|---|---|---|---|---|---|
| U.S. Provisional App. No. 62/409,202 filed Oct. 17, 2016 | | 1.04 | 1.16 | | 1.01 | 1.03 |
| U.S. Provisional App. No. 62/409,202 filed Oct. 17, 2016 | 0.85 | 0.77 | 0.83 | 0.74 | 0.67 | 0.66 |
| U.S. Provisional App. No. 62/409,202 filed Oct. 17, 2016 | | 1.07 | 1.01 | | 0.65 | 0.59 |
| Prior Art Bounty | 0.97 | 0.99 | 1.19 | 0.60 | 0.64 | 0.70 |
| Prior Art Viva (DRC) | | 0.38 | 0.49 | | 0.23 | 0.23 |
| Prior Art Brawny (Fabric TAD) | | 0.93 | 0.94 | | 0.51 | 0.55 |
| Prior Art Sparkle (Conv.) | 0.55 | 0.55 | 0.65 | 0.54 | 0.58 | 0.68 |
| Prior Art Bounty Basic | 1.15 | 1.41 | 1.32 | 1.11 | 1.42 | 1.34 |
| Prior Art with Continuous Filament | 0.55 | 0.46 | 0.47 | 0.51 | 0.43 | 0.37 |
| Prior Art with Continuous Filament | 0.60 | 0.56 | 0.62 | 0.50 | 0.47 | 0.46 |
| Prior Art with Continuous Filament | | 0.53 | 0.85 | | 0.40 | 0.52 |

| Sample | Mikrocad Top-Roll \|Outside − Inside\| Absolute Difference | Mikrocad Mid-Roll \|Outside − Inside\| Absolute Difference | Mikrocad Bottom-Roll \|Outside − Inside\| Absolute Difference |
|---|---|---|---|
| Invention | 1.38 | 1.04 | 0.96 |
| Invention | 1.66 | 1.24 | 1.27 |
| Invention | 1.72 | 1.26 | 1.30 |
| Invention | 1.45 | 0.85 | 0.93 |
| Invention | 1.01 | 0.81 | 0.77 |
| Invention | 1.28 | 1.02 | 0.82 |
| Invention | 1.28 | 1.03 | 0.89 |
| Invention | 1.72 | 1.03 | 0.99 |
| Invention | 1.14 | 0.88 | 0.89 |
| Invention | 0.59 | 0.56 | 0.65 |
| Invention | 1.13 | 0.86 | 0.83 |
| Invention | 1.38 | 1.11 | 1.17 |
| Invention | 1.09 | 0.94 | 0.95 |
| Invention | 0.42 | 0.40 | 0.37 |
| Invention | 0.83 | 0.67 | 0.69 |
| Invention | 0.40 | 0.36 | 0.33 |
| Invention | 0.78 | 0.66 | 0.65 |
| U.S. Provisional App. No. 62/409,202 filed Oct. 17, 2016 | 0.18 | 0.11 | 0.29 |
| U.S. Provisional App. No. 62/409,202 filed Oct. 17, 2016 | | 0.13 | 0.13 |
| U.S. Provisional App. No. 62/409,202 filed Oct. 17, 2016 | | 0.03 | 0.13 |
| U.S. Provisional App. No. 62/409,202 filed Oct. 17, 2016 | 0.11 | 0.10 | 0.16 |
| U.S. Provisional App. No. 62/409,202 filed Oct. 17, 2016 | | 0.42 | 0.42 |
| Prior Art Bounty | 0.37 | 0.36 | 0.49 |
| Prior Art Viva (DRC) | | 0.15 | 0.26 |
| Prior Art Brawny (Fabric TAD) | | 0.42 | 0.39 |
| Prior Art Sparkle (Conv.) | 0.01 | 0.03 | 0.03 |
| Prior Art Bounty Basic | 0.04 | 0.01 | 0.02 |
| Prior Art with Continuous Filament | 0.04 | 0.03 | 0.09 |
| Prior Art with Continuous Filament | 0.10 | 0.08 | 0.15 |
| Prior Art with Continuous Filament | | 0.14 | 0.33 |

| Sample | EMTEC TS7 Outside (dB $V^2$ rms) | EMTEC TS7 Inside (dB $V^2$ rms) | EMTEC TS7 \|Side absolute difference\| (dB $V^2$ rms) | EMTEC TS750 Outside (dB $V^2$ rms) | EMTEC TS750 Inside (dB $V^2$ rms) | EMTEC TS750 \|Side absolute difference\| (dB $V^2$ rms) |
|---|---|---|---|---|---|---|
| Invention | 9.72 | 10.01 | 0.30 | 23.24 | 16.66 | 6.59 |
| Invention | 9.829 | 11.554 | 1.73 | 22.357 | 19.440 | 2.92 |
| Invention | 10.005 | 11.122 | 1.12 | 38.658 | 23.300 | 15.36 |
| Invention | 9.121 | 27.031 | 17.91 | 36.378 | 37.201 | 0.82 |
| Invention | 9.87 | 19.52 | 9.65 | 37.67 | 55.77 | 18.09 |
| Invention | 10.01 | 23.56 | 13.55 | 45.11 | 53.21 | 8.10 |
| Invention | 10.11 | 22.74 | 12.63 | 41.35 | 55.26 | 13.91 |
| Invention | 10.543 | 13.513 | 2.97 | 43.575 | 52.464 | 8.89 |

TABLE 1-continued

| Sample | | | | | | | Pl. Stiff. (N * mm) | Pl. Stiff., corrected for BW (N * mg/M) | Flex Rigidity Overhang Avg. (cm) | Calculated Flex Rigidity (mg cm) | Bending Modulus (Calc Flex Rigidity/ Caliper$^3$) |
|---|---|---|---|---|---|---|---|---|---|---|---|
| Invention | 19.854 | 15.738 | 4.12 | 64.229 | 41.117 | 23.11 | | | 9.9 | 767 | 5.70 |
| Invention | 10.860 | 11.210 | 0.35 | 24.417 | 21.337 | 3.08 | | | 10.3 | 834 | 4.38 |
| Invention | 16.77 | 16.25 | 0.52 | 48.58 | 52.63 | 4.05 | | | 9.6 | 726 | 5.32 |
| Invention | 21.76 | 15.72 | 6.04 | 61.50 | 69.19 | 7.69 | | | 10.5 | 942 | 6.36 |
| Invention | 16.58 | 15.54 | 1.04 | 53.25 | 67.01 | 13.77 | | | 10.45 | 866 | 4.81 |
| Invention | 17.76 | 17.11 | 0.65 | 69.88 | 66.58 | 3.29 | | | 11.4 | 1097 | 4.99 |
| Invention | 18.12 | 17.74 | 0.37 | 60.54 | 74.24 | 13.70 | | | 11.4 | 1136 | 4.60 |
| Invention | 16.53 | 17.53 | 1.00 | 64.73 | 72.60 | 7.87 | | | 8.9 | 584 | 4.97 |
| Invention | 17.73 | 16.65 | 1.07 | 57.74 | 66.90 | 9.15 | | | 12.9 | 1662 | 22.68 |
| U.S. Provisional App. No. 62/409,202 filed Oct. 17, 2016 | 11.403 | 11.280 | 0.12 | 31.860 | 31.560 | 0.30 | | | 10.8 | 997 | 3.62 |
| U.S. Provisional App. No. 62/409,202 filed Oct. 17, 2016 | 16.085 | 15.180 | 0.91 | 79.655 | 81.466 | 1.81 | 12.6 | 0.220 | 11.4 | 1060 | 5.35 |
| U.S. Provisional App. No. 62/409,202 filed Oct. 17, 2016 | 17.358 | 17.307 | 0.05 | 59.980 | 55.970 | 4.01 | 11.4 | 0.198 | 11.6 | 1147 | 5.08 |
| U.S. Provisional App. No. 62/409,202 filed Oct. 17, 2016 | 10.594 | 10.125 | 0.47 | 45.814 | 52.247 | 6.43 | 12.8 | 0.219 | 12.0 | 1260 | 6.35 |
| U.S. Provisional App. No. 62/409,202 filed Oct. 17, 2016 | 11.231 | 11.496 | 0.27 | 26.901 | 24.656 | 2.25 | 16.0 | 0.295 | 11.9 | 1176 | 10.53 |
| Prior Art Bounty | 15.855 | 16.535 | 0.68 | 84.850 | 88.360 | 3.51 | 13.7 | 0.257 | 11.9 | 1121 | 9.13 |
| Prior Art Viva (DRC) | 16.144 | 17.274 | 1.13 | 34.881 | 36.259 | 1.38 | 16.6 | 0.307 | 12.1 | 1234 | 12.28 |
| Prior Art Brawny (Fabric TAD) | 24.975 | 25.158 | 0.18 | 56.030 | 60.970 | 4.94 | 14.4 | 0.265 | 12.0 | 1174 | 9.82 |
| Prior Art Sparkle (Conv.) | 24.018 | 26.046 | 2.03 | 172.271 | 201.398 | 29.13 | 14.7 | 0.180 | 10.74 | 1270 | 4.69 |
| Prior Art Bounty Basic | 26.06 | 20.01 | 6.05 | 151.8575 | 138.36575 | 13.49 | 16.3 | 0.200 | 12.7 | 2070 | 6.12 |
| Prior Art with Continuous Filament | 9.180 | 8.847 | 0.33 | 24.920 | 23.580 | 1.34 | 14.3 | 0.169 | 12.7 | 2156 | 5.56 |
| Prior Art with Continuous Filament | 9.321 | 9.673 | 0.35 | 44.440 | 47.137 | 2.70 | 13.7 | 0.163 | 10.5 | 1219 | 7.36 |
| Prior Art with Continuous Filament | 10.816 | 11.305 | 0.49 | 33.104 | 32.389 | 0.71 | 8.4 | 0.144 | 8.8 | 498 | 5.07 |
| Prior Art Bounty | | | | | | | 11.3 | 0.210 | 11.2 | 939 | 10.18 |
| Prior Art Viva (DRC) | | | | | | | 4.5 | 0.075 | 5.5 | 124 | 4.03 |
| Prior Art Brawny (Fabric TAD) | | | | | | | 13.9 | 0.270 | 10.6 | 759 | 17.28 |
| Prior Art Sparkle (Conv.) | | | | | | | 15.6 | 0.317 | 11.8 | 1011 | 26.35 |
| Prior Art Bounty Basic | | | | | | | | | 8.3 | 776 | 10.84 |
| Prior Art with Continuous Filament | | | | | | | 6.0 | 0.102 | 6.7 | 220 | 4.74 |
| Prior Art with Continuous Filament | | | | | | | 3.6 | 0.059 | 5.3 | 116 | 2.55 |
| Prior Art with Continuous Filament | | | | | | | 7.1 | 0.129 | 8.3 | 395 | 22.19 |

TABLE 1-continued

| Sample (Table 1 continued) | Dry Thick Compression (mils * mils/ log(gsi)) | Dry Thick Compressive Recovery (mils * mils/ log(gsi)) | Wet Thick Compression (mils * mils/ log(gsi)) | Wet Thick Compressive Recovery (mils * mils/ log(gsi)) | Wet Burst (g) | Wet BEA |
|---|---|---|---|---|---|---|
| Invention | 2702 | 1624 | 3087 | 1230 | 833 | 37.4 |
| Invention | 4940 | 2958 | 5063 | 1699 | 808 | 32.2 |
| Invention | 5245 | 3209 | 4081 | 1502 | 660 | 25.6 |
| Invention | 4020 | 2686 | 3497 | 1298 | 406 | 13.0 |
| Invention | 2613 | 1550 | 2803 | 1216 | 508 | 16.3 |
| Invention | 4985 | 2887 | 4386 | 1392 | 572 | 16.6 |
| Invention | 4698 | 2644 | 3381 | 1317 | 481 | 14.0 |
| Invention | 5935 | 3652 | 3148 | 1216 | 561 | 22.0 |
| Invention | 2951 | 2253 | 3534 | 1308 | 719 | 21.9 |
| Invention | 3436 | 2180 | 5277 | 2060 | 790 | 31.5 |
| Invention | 4996 | 3025 | 2382 | 1001 | 452 | 9.9 |
| Invention | 6585 | 3327 | 3067 | 1085 | 306 | 6.9 |
| Invention | 4634 | 2835 | 2515 | 1042 | 509 | 10.5 |
| Invention | 1141 | 763 | 1095 | 547 | 469 | 9.0 |
| Invention | 2777 | 1683 | 1434 | 644 | 452 | 8.4 |
| Invention | 945 | 666 | 927 | 496 | 557 | 10.9 |
| Invention | 2359 | 1499 | 1325 | 636 | 529 | 10.1 |
| U.S. Provisional App. No. 62/409,202 filed Oct. 17, 2016 | 1408 | 1022 | 3646 | 1602 | 760 | 34.6 |
| U.S. Provisional App. No. 62/409,202 filed Oct. 17, 2016 | 1007 | 812 | 3251 | 1709 | 733 | 26.1 |
| U.S. Provisional App. No. 62/409,202 filed Oct. 17, 2016 | 1271 | 989 | 4978 | 2125 | 510 | 17.9 |
| U.S. Provisional App. No. 62/409,202 filed Oct. 17, 2016 | 764 | 606 | 2399 | 1235 | 793 | 37.4 |
| U.S. Provisional App. No. 62/409,202 filed Oct. 17, 2016 | 1442 | 945 | 2740 | 1137 | 639 | 27.9 |
| Prior Art Bounty | 627 | 469 | 1792 | 798 | 437 | 8.2 |
| Prior Art Viva (DRC) | 246 | 187 | 429 | 159 | 275 | 7.03 |
| Prior Art Brawny (Fabric TAD) | 418 | 320 | 658 | 291 | 295 | 5.82 |
| Prior Art Sparkle (Conv.) | 314 | 208 | 361 | 47 | 177 | 3.41 |
| Prior Art Bounty Basic | 2416 | 1578 | 295 | 150 | 294 | 5 |
| Prior Art with Continuous Filament | | | | | 786 | 39.7 |
| Prior Art with Continuous Filament | 556 | 434 | 795 | 468 | 745 | 28.48 |
| Prior Art with Continuous Filament | 235 | 192 | 412 | 233 | 840 | 30.8 |

| Sample (Table 1 continued) | Dry Burst (g) | Dry BEA | Wet MD Tensile TEA | Wet CD Tensile (g/in) | Wet CD Tensile TEA | Wet/Dry CD Tensile TEA |
|---|---|---|---|---|---|---|
| Invention | 1019.917 | 35.7 | 180 | 293 | 194 | 2.520 |
| Invention | 1072.417 | 34.5 | 218 | 256 | 131 | 2.068 |
| Invention | 871.3333 | 24.6 | 122 | 208 | 81 | 1.449 |
| Invention | 961.9167 | 27.0 | 105 | 197 | 19 | 0.573 |
| Invention | 868.3182 | 22.6 | 82 | 206 | 22 | 0.516 |
| Invention | 1075.667 | 26.7 | 89 | 263 | 31 | 0.651 |
| Invention | 963.25 | 24.6 | 74 | 237 | 30 | 0.609 |
| Invention | 905.1667 | 19.3 | 51 | 185 | 20 | 0.593 |
| Invention | 1425.75 | 34.1 | 100 | 363 | 40 | 0.557 |
| Invention | 1176.25 | 36.9 | 169 | 235 | 24 | 0.267 |
| Invention | 1251.8 | 24.7 | | | | |
| Invention | 903.8 | 18.0 | | | | |
| Invention | 1144.8 | 21.3 | | | | |
| Invention | 1275.0 | 23.4 | | | | |
| Invention | 1177.0 | 21.4 | | | | |
| Invention | 1201.8 | 21.3 | | | | |
| Invention | 1243.5 | 23.0 | | | | |
| U.S. Provisional App. No. 62/409,202 filed Oct. 17, 2016 | 978 | 33.4 | 130 | 196 | 84.4 | 1.477 |
| U.S. Provisional App. No. 62/409,202 filed Oct. 17, 2016 | 1132 | 31.8 | 28.3 | 291 | 37.9 | 0.531 |

TABLE 1-continued

| Sample | | | | | | |
|---|---|---|---|---|---|---|
| U.S. Provisional App. No. 62/409,202 filed Oct. 17, 2016 | 897 | 24.4 | 47.8 | 182 | 17.5 | 0.376 |
| U.S. Provisional App. No. 62/409,202 filed Oct. 17, 2016 | 1047 | 31.9 | 107 | 281 | 92.8 | 1.511 |
| U.S. Provisional App. No. 62/409,202 filed Oct. 17, 2016 | 802 | 27.9 | 129 | 239 | 126 | 1.743 |
| Prior Art Bounty | 1032 | 18.9 | 23.56 | 278 | 14.82 | 0.293 |
| Prior Art Viva (DRC) | 626 | 18.2 | 35.6 | 186 | 16.6 | 0.379 |
| Prior Art Brawny (Fabric TAD) | 774 | 14.2 | 18.1 | 252 | 9.8 | 0.262 |
| Prior Art Sparkle (Conv.) | 648 | 10.8 | 12.6 | 144 | 3.5 | 0.145 |
| Prior Art Bounty Basic | 613 | 10.4 | 21 | 182 | 9 | |
| Prior Art with Continuous Filament | 938 | 51.8 | 188.0 | 257 | 158.0 | 1.274 |
| Prior Art with Continuous Filament | 736 | 27.3 | 125.1 | 238.4 | 93.8 | 0.911 |
| Prior Art with Continuous Filament | 798 | 34.2 | 188.02 | 290.4 | 137.02 | 1.072 |

| Sample | Geometric Mean Wet Tensile TEA | HFS (g/g) | VFS (g/g) | CRT Rate (g/sec) | CRT Capacity (g/g) |
|---|---|---|---|---|---|
| Invention | 187 | 24.6 | 14.5 | 0.43 | 19.91 |
| Invention | 169 | 25.4 | 14.5 | 0.38 | 23.00 |
| Invention | 99 | 22.7 | 13.7 | 0.41 | 21.12 |
| Invention | 45 | 22.2 | 11.1 | 0.39 | 19.06 |
| Invention | 43 | 25.6 | 11.2 | 0.42 | 20.05 |
| Invention | 52 | 25.3 | 10.0 | 0.43 | 19.98 |
| Invention | 47 | 25.7 | 10.8 | 0.40 | 20.57 |
| Invention | 32 | 20.8 | 11.6 | 0.33 | 18.83 |
| Invention | 64 | 20.2 | 11.7 | 0.33 | 18.44 |
| Invention | 64 | 25.8 | 20.1 | 0.40 | 20.88 |
| Invention | 30.7 | 26.3 | 10.2 | 0.58 | 19.90 |
| Invention | 26.1 | 26.3 | 9.9 | 0.57 | 20.60 |
| Invention | 31.9 | 24.5 | 9.9 | 0.47 | 18.40 |
| Invention | 31.3 | 20.5 | 8.2 | 0.63 | 18.10 |
| Invention | 28.0 | 19.8 | 8.5 | 0.62 | 18.30 |
| Invention | 34.5 | 19.5 | 8.0 | 0.56 | 16.20 |
| Invention | 34.4 | 19.5 | 8.3 | 0.57 | 17.40 |
| U.S. Provisional App. No. 62/409,202 filed Oct. 17, 2016 | 105 | 21.5 | 14.2 | 0.42 | 17.99 |
| U.S. Provisional App. No. 62/409,202 filed Oct. 17, 2016 | 33 | 23.6 | 13.0 | 0.5 | 19.36 |
| U.S. Provisional App. No. 62/409,202 filed Oct. 17, 2016 | 29 | 25.9 | 11.6 | 0.65 | 24.03 |
| U.S. Provisional App. No. 62/409,202 filed Oct. 17, 2016 | 100 | 19.4 | 14.4 | 0.44 | 17.26 |
| U.S. Provisional App. No. 62/409,202 filed Oct. 17, 2016 | 127 | 24.5 | 14.3 | 0.43 | 21.07 |
| Prior Art Bounty | 19 | 23.0 | 9.1 | 0.58 | 19.63 |
| Prior Art Viva (DRC) | 24 | 14.5 | 9.8 | 0.21 | 12.09 |
| Prior Art Brawny (Fabric TAD) | 13 | 18.0 | 8.3 | 0.25 | 14.30 |
| Prior Art Sparkle (Conv.) | 7 | 13.1 | 5.4 | 0.33 | 9.45 |
| Prior Art Bounty Basic | 14 | 15.29 | 6.65 | 0.13 | 12.14 |
| Prior Art with Continuous Filament | 172 | 16.6 | 11.8 | 0.33 | 13.30 |
| Prior Art with Continuous Filament | 108 | 16.7 | 11.6 | 0.27 | 14.03 |
| Prior Art with Continuous Filament | 161 | 13.6 | 9.5 | 0.21 | 11.21 |

| Sample | Dry Caliper (mils) | Wet Caliper (mils) | Dry Bulk (cc/g) | Wet Bulk (cc/g) | Hand Protection Time to Wet Side 1 (seconds) | Hand Protection Time to Wet Side 2 (seconds) |
|---|---|---|---|---|---|---|
| Invention | 46.19 | 34.6 | 19.0 | 14.2 | 4.11 | 3.11 |
| Invention | 51.86 | 34.7 | 21.8 | 14.6 | 4.30 | 2.43 |
| Invention | 46.38 | 31.6 | 18.7 | 12.8 | 4.21 | 4.51 |

TABLE 1-continued

| Sample | | | | | | |
|---|---|---|---|---|---|---|
| Invention | 47.70 | 34.3 | 19.1 | 13.8 | 0.78 | 19.85 |
| Invention | 50.89 | 36.2 | 21.5 | 15.3 | 0.53 | 6.10 |
| Invention | 54.39 | 35.8 | 22.9 | 15.0 | 0.73 | 9.10 |
| Invention | 56.54 | 36.8 | 23.3 | 15.2 | 0.73 | 9.63 |
| Invention | 44.14 | 30.8 | 18.1 | 12.6 | 8.00 | 12.80 |
| Invention | 37.71 | 31.5 | 15.5 | 13.0 | 20.74 | 17.84 |
| Invention | 58.63 | 37.7 | 23.6 | 15.2 | 2.92 | 2.82 |
| Invention | 52.5 | 34.3 | 23.3 | 15.2 | 0.78 | 0.75 |
| Invention | 54.9 | 34.7 | 24.3 | 15.4 | 0.72 | 1.05 |
| Invention | 52.6 | 32.8 | 22.8 | 14.2 | 0.68 | 0.65 |
| Invention | 43.4 | 32.8 | 20.3 | 15.3 | 0.73 | 0.70 |
| Invention | 44.8 | 31.8 | 21.3 | 15.1 | 0.83 | 0.77 |
| Invention | 41.9 | 29.6 | 19.7 | 13.9 | 0.70 | 0.63 |
| Invention | 44.4 | 29.2 | 20.7 | 13.6 | 0.97 | 0.73 |
| U.S. Provisional App. No. 62/409,202 filed Oct. 17, 2016 | 58.3 | 41.2 | 18.1 | 12.8 | 2.54 | 2.44 |
| U.S. Provisional App. No. 62/409,202 filed Oct. 17, 2016 | 62.8 | 50.9 | 19.5 | 15.8 | 3.92 | 4.75 |
| U.S. Provisional App. No. 62/409,202 filed Oct. 17, 2016 | 65.7 | 56.5 | 19.7 | 17.0 | 0.72 | 0.62 |
| U.S. Provisional App. No. 62/409,202 filed Oct. 17, 2016 | 49.5 | 40.9 | 15.0 | 12.4 | 4.14 | 4.24 |
| U.S. Provisional App. No. 62/409,202 filed Oct. 17, 2016 | 41.6 | 34.3 | 18.1 | 14.9 | 2.78 | 2.54 |
| Prior Art Bounty | 40.72 | 33.0 | 19.2 | 15.6 | 0.78 | 0.74 |
| Prior Art Viva (DRC) | 28.21 | 21.4 | 12.0 | 9.1 | 2.07 | 1.77 |
| Prior Art Brawny (Fabric TAD) | 31.8 | 23.9 | 15.7 | 11.8 | 0.73 | 0.83 |
| Prior Art Sparkle (Conv) | 30.4 | 14.7 | 15.7 | 7.6 | 2.88 | 2.98 |
| Prior Art Bounty Basic | 37 | 21.9 | 23.6 | 13.8 | 1.14 | 1.11 |
| Prior Art with Continuous Filament | 32.4 | 27.6 | 14.0 | 11.9 | 3.03 | 2.37 |
| Prior Art with Continuous Filament | 32.18 | 25.9 | 13.3 | 10.7 | 1.61 | 1.74 |
| Prior Art with Continuous Filament | 23.54 | 21.66 | 10.8 | 9.9 | 2.80 | 2.23 |

| Sample | SST | Total Dry Tensile (g/in) | Low Load Wet Resiliency (mils/mils) | Mid Load Wet Resiliemcy (mils/mils) |
|---|---|---|---|---|
| Invention | 1.36 | 1178 | 0.91 | 0.77 |
| Invention | 1.60 | 1211 | 0.83 | 0.61 |
| Invention | 1.37 | 1161 | 0.81 | 0.68 |
| Invention | 1.31 | 1487 | 0.83 | 0.75 |
| Invention | 1.52 | 1545 | 0.84 | 0.73 |
| Invention | | 1855 | 0.86 | 0.63 |
| Invention | | 1759 | 0.76 | 0.63 |
| Invention | 1.13 | 1673 | 0.73 | 0.66 |
| Invention | 1.22 | 2643 | 1.01 | 0.78 |
| Invention | 0.72 | 1543 | 0.90 | 0.66 |
| Invention | 2.20 | 2118 | 0.69 | 0.64 |
| Invention | 2.25 | 1864 | 0.70 | 0.56 |
| Invention | 2.18 | 2264 | 0.73 | 0.67 |
| Invention | 1.75 | 2562 | 0.78 | 0.78 |
| Invention | 1.75 | 2441 | 0.67 | 0.70 |
| Invention | 1.58 | 2665 | 0.79 | 0.77 |
| Invention | 1.65 | 2520 | 0.71 | 0.76 |
| U.S. Provisional App. No. 62/409,202 filed Oct. 17, 2016 | 1.46 | 1190 | 0.97 | 0.76 |
| U.S. Provisional App. No. 62/409,202 filed Oct. 17, 2016 | 2.30 | 1586 | 1.14 | 0.99 |
| U.S. Provisional App. No. 62/409,202 filed Oct. 17, 2016 | 2.86 | 1227 | 1.14 | 0.90 |
| U.S. Provisional App. No. 62/409,202 filed Oct. 17, 2016 | 1.51 | 1370 | 1.15 | 0.92 |
| U.S. Provisional App. No. 62/409,202 filed Oct. 17, 2016 | 1.66 | 994 | 0.96 | 0.65 |
| Prior Art Bounty | 1.80 | 2203 | 1.08 | 0.85 |
| Prior Art Viva (DRC) | 0.57 | 856 | 0.91 | 0.67 |
| Prior Art Brawny (Fabric TAD) | | 1614 | 0.87 | 0.68 |
| Prior Art Sparkle (Conv) | 0.40 | 1685 | 0.54 | 0.20 |
| Prior Art Bounty Basic | 0.20 | 1657 | 0.49 | 0.74 |
| Prior Art with Continuous Filament | 0.69 | 660 | | |
| Prior Art with Continuous Filament | 0.74 | 750 | 0.92 | 0.77 |
| Prior Art with Continuous Filament | 0.48 | 796 | 0.95 | 0.75 |

In addition to or alternatively, the articles, for example articles comprising a co-formed fibrous structure and optionally other fibrous structures, of the present invention, when in roll form, may exhibit novel roll properties. In one example, an article of the present invention, for example an article comprising a co-formed fibrous structure, may exhibit a Roll Firmness at 7.00 N of less than 11.5 and/or less 11.0 and/or less than 9.5 and/or less than 9.0 and/or less than 8.5 and/or less than 8.0 and/or less than 7.5 mm as measured according to the Roll Firmness Test Method described herein.

In one example, a co-formed fibrous structure and/or a co-formed fibrous web (co-formed fibrous web ply) in roll form may exhibit a roll firmness at 7.00 N of less than 11.5 and/or less 11.0 and/or less than 9.5 and/or less than 9.0 and/or less than 8.5 and/or less than 8.0 and/or less than 7.5 mm as measured according to the Roll Firmness Test Method described herein.

Fibrous Webs (Fibrous Web Plies)

Non-limiting examples of fibrous webs (fibrous web plies) according to the present invention comprise one or more and/or two or more and/or three or more and/or four or more and/or five or more and/or six or more and/or seven or more fibrous structures that are associated with one another, such as by compression bonding (for example by passing through a nip formed by two rollers), thermal bonding (for example by passing through a nip formed by two rollers where at least one of the rollers is heated to a temperature of at least about 120° C. (250° F.)), microselfing, needle punching, and gear rolling, to form a unitary structure.

Wet-Laid Fibrous Structure (an Example of a Mono-Fibrous Element Fibrous Structure)

The wet-laid fibrous structure comprises a plurality of fibrous elements, for example a plurality of fibers. In one example, the wet-laid fibrous structure comprises a plurality of naturally-occurring fibers, for example pulp fibers, such as wood pulp fibers (hardwood and/or softwood pulp fibers). In another example, the wet-laid fibrous structure comprises a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof.

The mono-fibrous element fibrous structure may comprise one or more filaments, such as polyolefin filaments, for example polypropylene and/or polyethylene filaments, starch filaments, starch derivative filaments, cellulose filaments, polyvinyl alcohol filaments.

The wet-laid fibrous structure of the present invention may be single-ply or multi-ply web material. In other words, the wet-laid fibrous structures of the present invention may comprise one or more wet-laid fibrous structures, the same or different from each other so long as one of them comprises a plurality of pulp fibers.

In one example, the wet-laid fibrous structure comprises a wet laid fibrous structure ply, such as a through-air-dried fibrous structure ply, for example an uncreped, through-air-dried fibrous structure ply and/or a creped, through-air-dried fibrous structure ply.

In another example, the wet-laid fibrous structure and/or wet laid fibrous structure ply may exhibit substantially uniform density.

In another example, the wet-laid fibrous structure and/or wet laid fibrous structure ply may comprise a surface pattern.

In one example, the wet laid fibrous structure ply comprises a conventional wet-pressed fibrous structure ply. The wet laid fibrous structure ply may comprise a fabric-creped fibrous structure ply. The wet laid fibrous structure ply may comprise a belt-creped fibrous structure ply.

In still another example, the wet-laid fibrous structure may comprise an air laid fibrous structure ply.

The wet-laid fibrous structures of the present invention may comprise a surface softening agent or be void of a surface softening agent, such as silicones, quaternary ammonium compounds, lotions, and mixtures thereof. In one example, the sanitary tissue product is a non-lotioned wet-laid fibrous structure.

The wet-laid fibrous structures of the present invention may comprise trichome fibers or may be void of trichome fibers.

Patterned Molding Members

The wet-laid fibrous structures of the present invention may be formed on patterned molding members that result in the wet-laid fibrous structures of the present invention. In one example, the pattern molding member comprises a non-random repeating pattern. In another example, the pattern molding member comprises a resinous pattern.

In one example, the wet-laid fibrous structure comprises a textured surface. In another example, the wet-laid fibrous structure comprises a surface comprising a three-dimensional (3D) pattern, for example a 3D pattern imparted to the wet-laid fibrous structure by a patterned molding member. Non-limiting examples of suitable patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned sanitary tissue products and/or 3D patterned fibrous structure plies employed in sanitary tissue products. Other non-limiting examples of such patterned molding members include through-air-drying fabrics and through-air-drying belts utilized in through-air-drying papermaking processes that produce through-air-dried fibrous structures, for example 3D patterned through-air dried fibrous structures, and/or through-air-dried sanitary tissue products comprising the wet-laid fibrous structure.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Non-limiting examples of patterned molding members suitable for use in the present invention comprises a through-air-drying belts. The through-air-drying belts may comprise a plurality of continuous knuckles, discrete knuckles, semi-continuous knuckles and/or continuous pillows, discrete pillows, and semi-continuous pillows formed by resin arranged in a non-random, repeating pattern supported on a support fabric comprising filaments, such as a forming fabric. The resin is patterned such that deflection conduits that contain little to know resin present in the pattern and result in the fibrous structure being formed on the patterned molding member having one or more pillow regions (low density regions) compared to the knuckle regions that are imparted to the fibrous structure by the resin ares.

Non-Limiting Examples of Making Wet-Laid Fibrous Structures

In one non-limiting example, the wet-laid fibrous structure is made on a molding member of the present invention. The method may be a wet-laid fibrous structure making process that uses a cylindrical dryer such as a Yankee (a Yankee-process) (creped) or it may be a Yankeeless process (uncreped) as is used to make substantially uniform density and/or uncreped wet-laid fibrous structures (fibrous structures).

In one example, a process for making a wet-laid fibrous structure according to the present invention comprises supplying an aqueous dispersion of fibers (a fibrous or fiber furnish or fiber slurry) to a headbox which can be of any convenient design. From the headbox the aqueous dispersion of fibers is delivered to a first foraminous member (forming wire) which is typically a Fourdrinier wire, to produce an embryonic fibrous structure.

The embryonic fibrous structure is brought into contact with a patterned molding member, such as a 3D patterned through-air-drying belt. While in contact with the patterned molding member, the embryonic fibrous structure will be deflected, rearranged, and/or further dewatered. This can be accomplished by applying differential speeds and/or pressures.

After the embryonic fibrous structure has been associated with the patterned molding member, fibers within the embryonic fibrous structure are deflected into pillows ("deflection conduits") present in the patterned molding member. In one example of this process step, there is essentially no water removal from the embryonic fibrous structure through the deflection conduits after the embryonic fibrous structure has been associated with the patterned molding member but prior to the deflecting of the fibers into the deflection conduits. Further water removal from the embryonic fibrous structure can occur during and/or after the time the fibers are being deflected into the deflection conduits. Water removal from the embryonic fibrous structure may continue until the consistency of the embryonic fibrous structure associated with patterned molding member is increased to from about 25% to about 35%. Once this consistency of the embryonic fibrous structure is achieved, then the embryonic fibrous structure can be referred to as an intermediate fibrous structure. As noted, water removal occurs both during and after deflection; this water removal may result in a decrease in fiber mobility in the embryonic web material. This decrease in fiber mobility may tend to fix and/or freeze the fibers in place after they have been deflected and rearranged. Of course, the drying of the web material in a later step in the process of this invention serves to more firmly fix and/or freeze the fibers in position.

Any convenient means conventionally known in the papermaking art can be used to dry the intermediate fibrous structure. Examples of such suitable drying process include subjecting the intermediate fibrous structure to conventional and/or flow-through dryers and/or Yankee dryers.

In one example of a drying process, the intermediate fibrous structure may first pass through an optional predryer. This predryer can be a conventional flow-through dryer (hot air dryer) well known to those skilled in the art. Optionally, the predryer can be a so-called capillary dewatering apparatus. In such an apparatus, the intermediate fibrous structure passes over a sector of a cylinder having preferential-capillary-size pores through its cylindrical-shaped porous cover. Optionally, the predryer can be a combination capillary dewatering apparatus and flow-through dryer. The quantity of water removed in the predryer may be controlled so that a predried fibrous structure exiting the predryer has a consistency of from about 30% to about 98%. The predried fibrous structure may be applied to a surface of a Yankee dryer via a nip with pressure, the pattern formed by the top surface of patterned molding member is impressed into the predried web material to form a 3D patterned fibrous structure, for example a 3D patterned wet-laid fibrous structure of the present invention. The 3D patterned wet-laid fibrous structure is then adhered to the surface of the Yankee dryer where it can be dried to a consistency of at least about 95%.

The 3D patterned wet-laid fibrous structure can then be foreshortened by creping the 3D patterned wet-laid fibrous structure with a creping blade to remove the 3D patterned wet-laid fibrous structure from the surface of the Yankee dryer resulting in the production of a 3D patterned creped wet-laid fibrous structure in accordance with the present invention. As used herein, foreshortening refers to the reduction in length of a dry (having a consistency of at least about 90% and/or at least about 95%) web material which occurs when energy is applied to the dry web material in such a way that the length of the dry web material is reduced and the fibers in the dry web material are rearranged with an accompanying disruption of fiber-fiber bonds. Foreshortening can be accomplished in any of several well-known ways. One common method of foreshortening is creping. Another method of foreshortening that is used to make the wet-laid fibrous structures of the present invention is wet microcontraction. Further, the wet-laid fibrous structure may be subjected to post processing steps such as calendaring, tuft generating operations, and/or embossing and/or converting.

Co-Formed Fibrous Structures

The co-formed fibrous structures of the present invention comprise a plurality of filaments and a plurality of solid additives. The filaments and the solid additives may be commingled together. In one example, the fibrous structure is a coform fibrous structure comprising filaments and solid additives. The filaments may be present in the fibrous structures of the present invention at a level of less than 90% and/or less than 80% and/or less than 65% and/or less than 50% and/or greater than 5% and/or greater than 10% and/or greater than 20% and/or from about 10% to about 50% and/or from about 25% to about 45% by weight of the fibrous structure on a dry basis.

The solid additives may be present in the fibrous structures of the present invention at a level of greater than 10% and/or greater than 25% and/or greater than 50% and/or less than 100% and/or less than 95% and/or less than 90% and/or less than 85% and/or from about 30% to about 95% and/or from about 50% to about 85% by weight of the fibrous structure on a dry basis.

The filaments and solid additives may be present in the fibrous structures of the present invention at a weight ratio of filaments to solid additive of greater than 10:90 and/or greater than 20:80 and/or less than 90:10 and/or less than 80:20 and/or from about 25:75 to about 50:50 and/or from about 30:70 to about 45:55. In one example, the filaments and solid additives are present in the fibrous structures of the present invention at a weight ratio of filaments to solid additives of greater than 0 but less than 1.

In one example, the fibrous structures of the present invention exhibit a basis weight of from about 10 gsm to about 1000 gsm and/or from about 10 gsm to about 500 gsm and/or from about 15 gsm to about 400 gsm and/or from about 15 gsm to about 300 gsm as measured according to the Basis Weight Test Method described herein. In another example, the fibrous structures of the present invention exhibit a basis weight of from about 10 gsm to about 200 gsm and/or from about 20 gsm to about 150 gsm and/or from about 25 gsm to about 125 gsm and/or from about 30 gsm to about 100 gsm and/or from about 30 gsm to about 80 gsm as measured according to the Basis Weight Test Method described herein. In still another example, the fibrous structures of the present invention exhibit a basis weight of from about 80 gsm to about 1000 gsm and/or from about 125 gsm to about 800 gsm and/or from about 150 gsm to about 500 gsm and/or from about 150 gsm to about 300 gsm as measured according to the Basis Weight Test Method described herein.

In one example, the fibrous structure of the present invention comprises a core component. A "core component" as used herein means a fibrous structure comprising a plurality of filaments and optionally a plurality of solid additives. In one example, the core component is a coform fibrous structure comprising a plurality of filaments and a plurality of solid additives, for example pulp fibers. In one example, the core component is the component that exhibits the greatest basis weight with the fibrous structure of the present invention. In one example, the total core components present in the fibrous structures of the present invention exhibit a basis weight that is greater than 50% and/or greater than 55% and/or greater than 60% and/or greater than 65% and/or greater than 70% and/or less than 100% and/or less than 95% and/or less than 90% of the total basis weight of the fibrous structure of the present invention as measured according to the Basis Weight Test Method described herein. In another example, the core component exhibits a basis weight of greater than 12 gsm and/or greater than 14 gsm and/or greater than 16 gsm and/or greater than 18 gsm and/or greater than 20 gsm and/or greater than 25 gsm as measured according to the Basis Weight Test Method described herein.

"Consolidated region" as used herein means a region within a fibrous structure where the filaments and optionally the solid additives have been compressed, compacted, and/or packed together with pressure and optionally heat (greater than 150° F.) to strengthen the region compared to the same region in its unconsolidated state or a separate region which did not see the compression or compacting pressure. In one example, a region is consolidated by forming unconsolidated regions within a fibrous structure on a patterned molding member and passing the unconsolidated regions within the fibrous structure while on the patterned molding member through a pressure nip, such as a heated metal anvil roll (about 275° F.) and a rubber anvil roll with pressure to compress the unconsolidated regions into one or more consolidated regions. In one example, the filaments present in the consolidated region, for example on the side of the fibrous structure that is contacted by the heated roll comprises fused filaments that create a skin on the surface of the fibrous structure, which may be visible via SEM images.

The fibrous structure of the present invention may, in addition a core component, further comprise a scrim component. "Scrim component" as used herein means a fibrous structure comprising a plurality of filaments. In one example, the total scrim components present in the fibrous structures of the present invention exhibit a basis weight that is less than 25% and/or less than 20% and/or less than 15% and/or less than 10% and/or less than 7% and/or less than 5% and/or greater than 0% and/or greater than 1% of the total basis weight of the fibrous structure of the present invention as measured according to the Basis Weight Test Method described herein. In another example, the scrim component exhibits a basis weight of 10 gsm or less and/or less than 10 gsm and/or less than 8 gsm and/or less than 6 gsm and/or greater than 5 gsm and/or less than 4 gsm and/or greater than 0 gsm and/or greater than 1 gsm as measured according to the Basis Weight Test Method described herein.

In one example, at least one of the core components of the fibrous structure comprises a plurality of solid additives, for example pulp fibers, such as comprise wood pulp fibers and/or non-wood pulp fibers.

In one example, at least one of the core components of the fibrous structure comprises a plurality of core filaments. In another example, at least one of the core components comprises a plurality of solid additives and a plurality of the core filaments. In one example, the solid additives and the core filaments are present in a layered orientation within the core component. In one example, the core filaments are present as a layer between two solid additive layers. In another example, the solid additives and the core filaments are present in a coform layer. At least one of the core filaments comprises a polymer, for example a thermoplastic polymer, such as a polyolefin. The polyolefin may be selected from the group consisting of: polypropylene, polyethylene, and mixtures thereof. In another example, the thermoplastic polymer of the core filament may comprise a polyester.

In one example, at least one of the scrim components is adjacent to at least one of the core components within the fibrous structure. In another example, at least one of the core components is positioned between two scrim components within the fibrous structure.

In one example, at least one of the scrim components of the fibrous structure of the present invention comprises a plurality of scrim filaments, for example scrim filaments, wherein the scrim filaments comprise a polymer, for example a thermoplastic and/or hydroxyl polymer as described above with reference to the core components.

In one example, at least one of the scrim filaments exhibits an average fiber diameter of less than 50 and/or less than 25 and/or less than 10 and/or at least 1 and/or greater than 1 and/or greater than 3 µm as measured according to the Average Diameter Test Method described herein.

The average fiber diameter of the core filaments is less than 250 and/or less than 200 and/or less than 150 and/or less than 100 and/or less than 50 and/or less than 30 and/or less than 25 and/or less than 10 and/or greater than 1 and/or greater than 3 µm as measured according to the Average Diameter Test Method described herein.

In one example, the fibrous structures of the present invention may comprise any suitable amount of filaments and any suitable amount of solid additives. For example, the fibrous structures may comprise from about 10% to about 70% and/or from about 20% to about 60% and/or from about 30% to about 50% by dry weight of the fibrous structure of filaments and from about 90% to about 30% and/or from about 80% to about 40% and/or from about 70% to about 50% by dry weight of the fibrous structure of solid additives, such as wood pulp fibers.

In one example, the filaments and solid additives of the present invention may be present in fibrous structures according to the present invention at weight ratios of filaments to solid additives of from at least about 1:1 and/or at least about 1:1.5 and/or at least about 1:2 and/or at least about 1:2.5 and/or at least about 1:3 and/or at least about 1:4 and/or at least about 1:5 and/or at least about 1:7 and/or at least about 1:10.

In one example, the solid additives, for example wood pulp fibers, may be selected from the group consisting of softwood kraft pulp fibers, hardwood pulp fibers, and mixtures thereof. Non-limiting examples of hardwood pulp fibers include fibers derived from a fiber source selected from the group consisting of: Acacia, Eucalyptus, Maple, Oak, Aspen, Birch, Cottonwood, Alder, Ash, Cherry, Elm, Hickory, Poplar, Gum, Walnut, Locust, Sycamore, Beech, Catalpa, Sassafras, Gmelina, Albizia, Anthocephalus, and Magnolia. Non-limiting examples of softwood pulp fibers include fibers derived from a fiber source selected from the group consisting of: Pine, Spruce, Fir, Tamarack, Hemlock, Cypress, and Cedar. In one example, the hardwood pulp fibers comprise tropical hardwood pulp fibers. Non-limiting examples of suitable tropical hardwood pulp fibers include Eucalyptus pulp fibers, Acacia pulp fibers, and mixtures thereof.

In one example, the wood pulp fibers comprise softwood pulp fibers derived from the kraft process and originating from southern climates, such as Southern Softwood Kraft (SSK) pulp fibers. In another example, the wood pulp fibers comprise softwood pulp fibers derived from the kraft process and originating from northern climates, such as Northern Softwood Kraft (NSK) pulp fibers.

The wood pulp fibers present in the fibrous structure may be present at a weight ratio of softwood pulp fibers to hardwood pulp fibers of from 100:0 and/or from 90:10 and/or from 86:14 and/or from 80:20 and/or from 75:25 and/or from 70:30 and/or from 60:40 and/or about 50:50 and/or to 0:100 and/or to 10:90 and/or to 14:86 and/or to 20:80 and/or to 25:75 and/or to 30:70 and/or to 40:60. In one example, the weight ratio of softwood pulp fibers to hardwood pulp fibers is from 86:14 to 70:30.

In one example, the fibrous structures of the present invention comprise one or more trichomes. Non-limiting examples of suitable sources for obtaining trichomes, especially trichome fibers, are plants in the *Labiatae* (*Lamiaceae*) family commonly referred to as the mint family. Examples of suitable species in the *Labiatae* family include *Stachys byzantina*, also known as *Stachys lanata* commonly referred to as lamb's ear, woolly betony, or woundwort. The term *Stachys byzantina* as used herein also includes cultivars *Stachys byzantina* 'Primrose Heron', *Stachys byzantina* 'Helene von Stein' (sometimes referred to as *Stachys byzantina* 'Big Ears'), *Stachys byzantina* 'Cotton Boll', *Stachys byzantina* 'Variegated' (sometimes referred to as *Stachys byzantina* 'Striped Phantom'), and *Stachys byzantina* 'Silver Carpet'.

Non-limiting examples of suitable polypropylenes for making the filaments of the present invention are commercially available from Lyondell-Basell and Exxon-Mobil.

Any hydrophobic or non-hydrophilic materials within the fibrous structure, such as polypropylene filaments, may be surface treated and/or melt treated with a hydrophilic modifier. Non-limiting examples of surface treating hydrophilic modifiers include surfactants, such as Triton X-100. Non-limiting examples of melt treating hydrophilic modifiers that are added to the melt, such as the polypropylene melt, prior to spinning filaments, include hydrophilic modifying melt additives such as VW351 and/or S-1416 commercially available from Polyvel, Inc. and Irgasurf commercially available from Ciba. The hydrophilic modifier may be associated with the hydrophobic or non-hydrophilic material at any suitable level known in the art. In one example, the hydrophilic modifier is associated with the hydrophobic or non-hydrophilic material at a level of less than about 20% and/or less than about 15% and/or less than about 10% and/or less than about 5% and/or less than about 3% to about 0% by dry weight of the hydrophobic or non-hydrophilic material.

The fibrous structures of the present invention may include optional additives, each, when present, at individual levels of from about 0% and/or from about 0.01% and/or from about 0.1% and/or from about 1% and/or from about 2% to about 95% and/or to about 80% and/or to about 50% and/or to about 30% and/or to about 20% by dry weight of the fibrous structure. Non-limiting examples of optional additives include permanent wet strength agents, temporary wet strength agents, dry strength agents such as carboxymethylcellulose and/or starch, softening agents, lint reducing agents, opacity increasing agents, wetting agents, odor absorbing agents, perfumes, temperature indicating agents, color agents, dyes, osmotic materials, microbial growth detection agents, antibacterial agents, liquid compositions, surfactants, and mixtures thereof.

The fibrous structure of the present invention may itself be a sanitary tissue product. It may be convolutedly wound about a core to form a roll. It may be combined with one or more other fibrous structures as a ply to form a multi-ply sanitary tissue product. In one example, a co-formed fibrous structure of the present invention may be convolutedly wound about a core to form a roll of co-formed sanitary tissue product. The rolls of sanitary tissue products may also be coreless.

Method For Making a Co-Formed Fibrous Structure

A non-limiting example of a method for making a fibrous structure according to the present invention comprises the steps of: 1) collecting a mixture of filaments and solid additives, such as fibers, for example pulp fibers, onto a collection device, for example a through-air-drying fabric or other fabric or a patterned molding member of the present invention. This step of collecting the filaments and solid additives on the collection device may comprise subjecting the co-formed fibrous structure while on the collection device to a consolidation step whereby the co-formed fibrous structure, while present on the collection device, is pressed between a nip, for example a nip formed by a flat or even surface rubber roll and a flat or even surface or patterned, heated (with oil) or unheated metal roll.

In another example, the co-forming method may comprise the steps of a) collecting a plurality of filaments onto a collection device, for example a belt or fabric, such as a patterned molding member, to form a scrim component (a meltblown fibrous structure. The collection of the plurality of filaments onto the collection device to form the scrim component may be vacuum assisted by a vacuum box.

Once the scrim component (meltblown fibrous structure) is formed on the collection device, the next step is to mix, such as commingle, a plurality of solid additives, such as fibers, for example pulp fibers, such as wood pulp fibers, with a plurality of filaments, such as in a coform box, and collecting the mixture on the scrim component carried on the collection device to form a core component. Optionally, an additional scrim component (meltblown fibrous structure) comprising filaments may be added to the core component to sandwich the core component between two scrim components.

The meltblown die used to make the meltblown fibrous structures and/or filaments herein may be a multi-row capillary die and/or a knife-edge die. In one example, the meltblown die is a multi-row capillary die.

Method for Making Multi-Ply Fibrous Structure-Containing Article

The multi-ply fibrous structure-containing articles of the present invention are made by combining two or more and/or three or more and/or four or more fibrous structure plies as described herein, wherein at least one of the fibrous structure plies is embossed, for example comprises embossments such that the fibrous structure ply exhibits a Core Height Value (MikroCAD Value)s of greater than 0.60 mm and/or greater than 0.75 mm and/or greater than 0.90 mm and/or greater than 1.00 mm and/or greater than 1.10 mm and/or greater than 1.20 mm and/or greater than 1.30 mm and/or greater than 1.40 mm and/or greater than 1.50 mm and/or greater than 1.60 mm and/or greater than 1.70 mm as measured according to the Surface Texture Analysis Test Method described herein and/or a Core Height Difference Value (MikroCAD Difference Value) of greater than 0.50 mm and/or greater than 0.55 mm and/or greater than 0.60 mm and/or greater than 0.64 mm and/or greater than 0.75 mm and/or greater than 0.84 mm and/or greater than 0.95 mm and/or greater than 1.00 mm and/or greater than 1.05 mm and/or greater than 1.10 mm and/or greater than 1.15 mm and/or greater than 1.20 mm and/or greater than 1.25 mm and/or at least 1.30 mm as measured according to the Surface Texture Analysis Test Method described herein.

An exemplary process for embossing a fibrous structure ply and/or multi-ply fibrous structure-containing article in accordance with the present invention incorporates the use of a deep-nested embossment technology. By way of a non-limiting example, a fibrous structure ply is embossed in a gap between two embossing rolls. The embossing rolls may be made from any material known for making such rolls, including, without limitation, steel, rubber, elastomeric materials, and combinations thereof. As known to those of skill in the art, each embossing roll may be provided with a combination of emboss protrusions and gaps. Each emboss protrusion comprises a base, a face, and one or more sidewalls. Each emboss protrusion also has a height. The height of the emboss protrusions may range from about 1.8 mm. (0.070 in.) to about 3.8 mm. (0.150 in.), in one embodiment from about 2.0 mm. (0.080 in.) to about 3.3 mm. (0.130 in.). Each embossing roll may be heated to help facilitate thermal bonding of the fibrous structure plies together resulting in one or more water-resistant bonds, for example one or more thermal bonds 74.

Figure 28A:
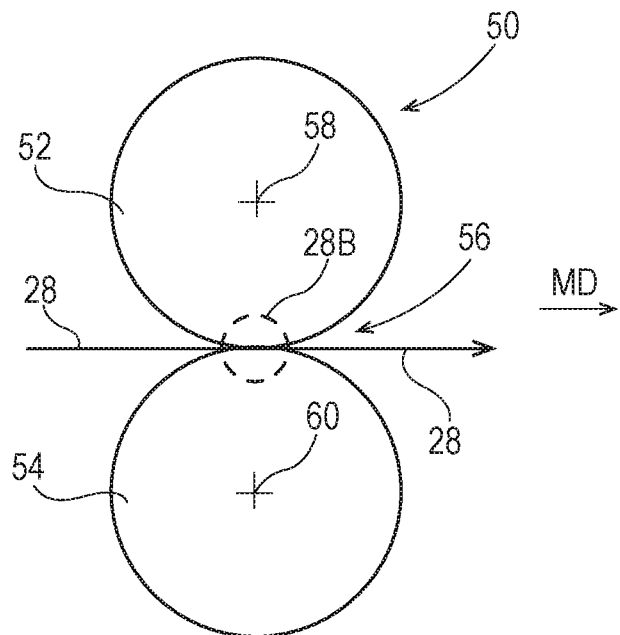
FIG. 28A is an example of a suitable embossing apparatus for use in the present invention.
Figure 28B:
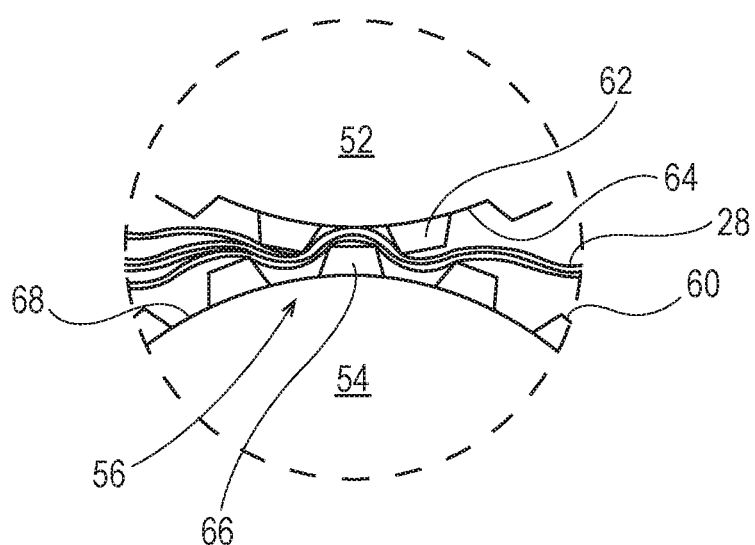
FIG. 28B is an exploded view of a portion of FIG. 28A.

FIGS. 28A and 28B show an example of an embossing apparatus 50 in accordance with the present invention. The embossing apparatus 50 includes a pair of embossing rolls 52 and 54 (a first embossing roll 52 and a second embossing roll 54). (It should be noted that the embodiments shown in the figures are just exemplary embodiments and other embodiments are certainly contemplated. For example, the embossing rolls 52 and 54 of the embodiment shown in FIGS. 28A and 28B could be replaced with any other embossing members such as, for example, plates, cylinders or other equipment suitable for embossing fibrous structure plies and/or fibrous structure webs. Further, additional equipment and steps that are not specifically described herein may be added to the embossing apparatus 50 and/or process of the present invention.) The embossing rolls 52 and 54 are disposed adjacent each other to provide a nip 56. The embossing rolls 52 and 54 are generally configured so as to be rotatable on an axis, the axes 58 and 60, respectively, of the embossing rolls 52 and 54 are typically generally parallel to one another. The embossing apparatus 50 may be contained within a typical embossing device housing. As shown in FIGS. 28A and 28B, the embossing rolls 52 and 54 provide a nip 56 through which a fibrous structure ply, for example a co-formed fibrous structure ply 28, and/or a fibrous structure web, for example a wet-laid fibrous structure web, can pass.

FIG. 28B is an enlarged view of the portion of the embossing apparatus 50 labeled 28B in FIG. 28A. FIG. 28B shows a more detailed view of the fibrous structure ply, for example a co-formed fibrous structure ply 28, and/or a fibrous structure web, for example a wet-laid fibrous structure web passing through the nip 56 between the embossing rolls 52 and 54. As can be seen in FIG. 28B, the first embossing roll 52 includes a plurality of first embossing protrusions 62 extending from the outer surface 64 of the first embossing roll 52. The second embossing roll 54 includes a plurality of second embossing protrusions 66 extending outwardly from the outer surface 68 of the second embossing roll 54. The first embossing protrusions 62 and the second embossing protrusions 66 are generally arranged in a non-random pattern. (It should be noted that when the embossing protrusions 62 and/or 66 are described as extending from an outer surface of an embossing roll, the embossing protrusions may be integral with the surface of the embossing roll and/or may be separate protrusions that are joined to the surface of the embossing roll.) As the fibrous structure ply, for example a co-formed fibrous structure ply 28, and/or a fibrous structure web, for example a wet-laid fibrous structure web is passed through the nip 56, it is nested and macroscopically deformed by the intermeshing of the first embossing protrusions 62 and the second embossing protrusions 66. The embossing shown is deep-nested embossing, as described herein, because the first embossing protrusions 62 and the second embossing protrusions 66 intermesh with each other, for example like the teeth of gears. Thus, the resulting fibrous structure ply, for example a co-formed fibrous structure ply 28, and/or a fibrous structure web, for example a wet-laid fibrous structure web is deeply embossed and nested, for example to create the Core Height Values (MikroCAD Values) and Core Height Difference Values (MikroCAD Difference Values) as described herein, and includes plurality of undulations that can add bulk and caliper to the fibrous structure ply, for example a co-formed fibrous structure ply 28, and/or a fibrous structure web, for example a wet-laid fibrous structure web.

The embossing rolls 52 and 54, including the outer surfaces of the rolls 64 and 68 as well as the embossing protrusions 62 and 66, may be made out of any material suitable for the desired embossing process. Such materials include, without limitation, steel and other metals, ebonite, and hard rubber or a combination thereof. In addition any of the components of the embossing rolls 52 and 54 (embossing protrusions 62 and 66 and outer surfaces 64 and 68) can be heated to facilitate softening of the fibrous structure ply and/or fibrous structure web and/or thermal bonding between fibrous structure plies resulting in bonds 74, in this case water-resistant bonds, for example thermal bonds and/or water-resistant adhesive bonds.

Figure 29A:
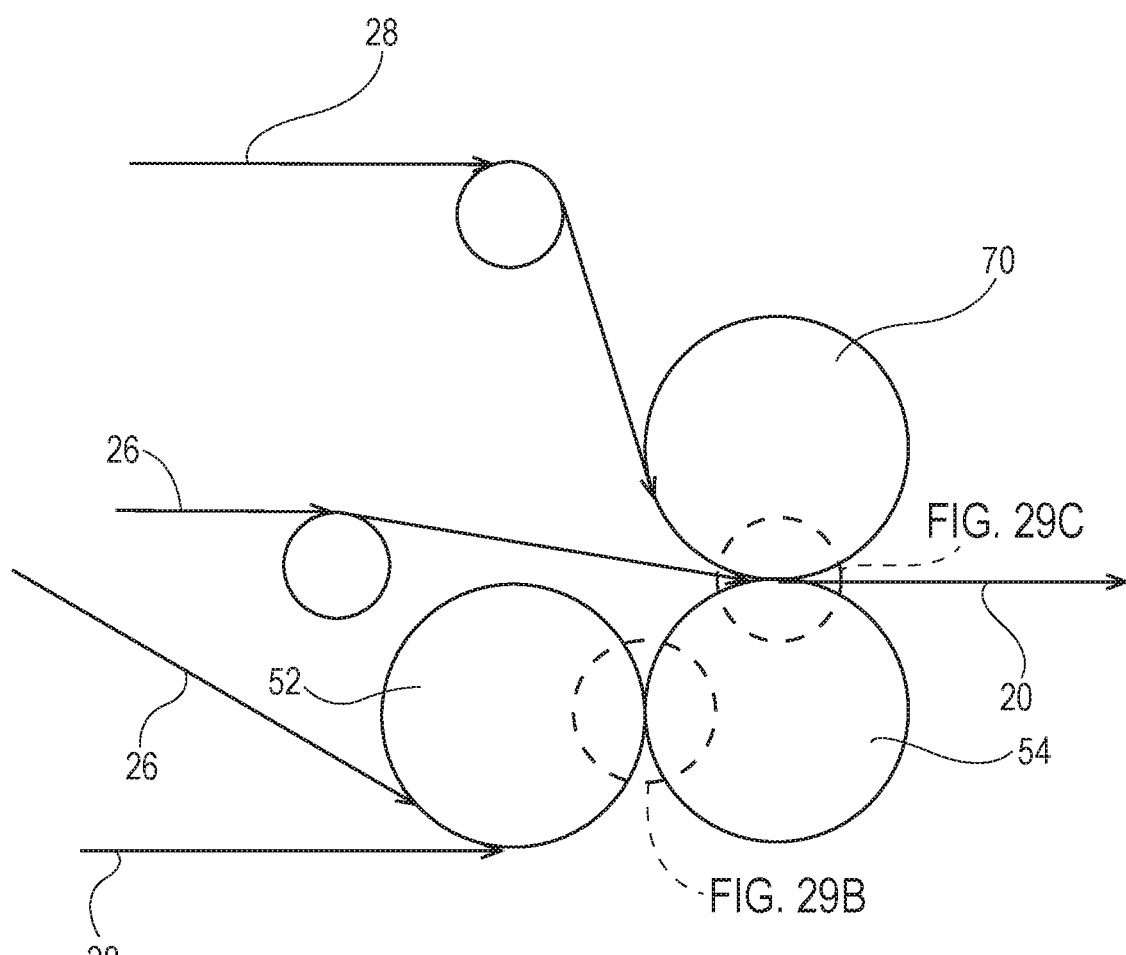
FIG. 29A is an example of a suitable embossing process for use in the present invention.
Figures 29B, 29C:
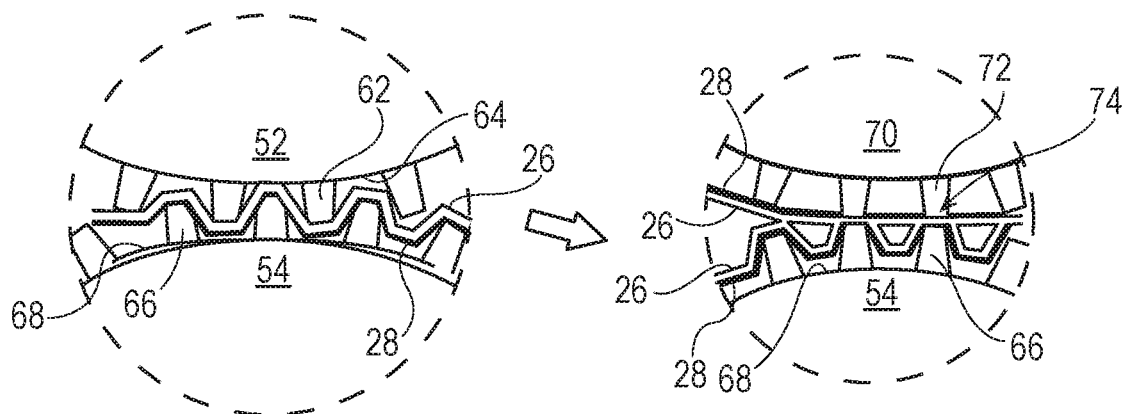
FIG. 29B is an exploded view of a portion of FIG. 29A.
FIG. 29C is an exploded view of a portion of FIG. 29A.
Figure 29D:
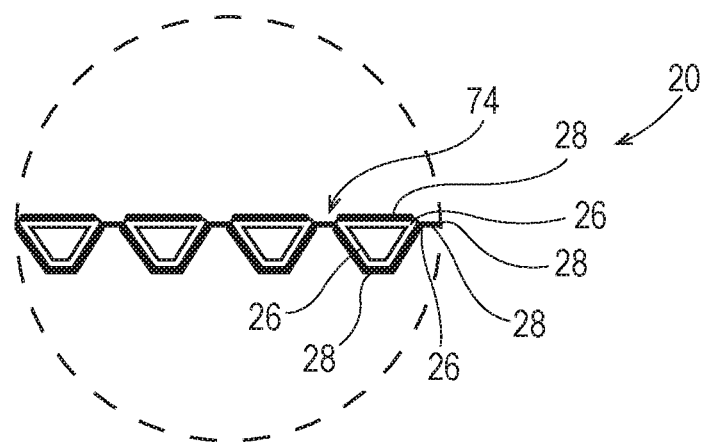
FIG. 29D is a schematic of a multi-ply fibrous structure-containing article produced from the embossing process of FIG. 29A.

In one example, as shown in FIGS. 29A-29C, two or more plies of the same or different fibrous structures. In one example, a first fibrous structure ply, for example a co-formed fibrous structure ply 28, a wet-laid fibrous structure ply 26, or a direct formed fibrous structure ply 78 is subjected to a high definition emboss (HDE) process to create embossments as shown in more detail in FIG. 29B that exhibit an embossment height of greater than 0.60 mm as measured according to the Surface Texture Analysis Test Method, which is combined with at least one other fibrous structure ply, for example a wet-laid fibrous structure ply 26, a co-formed fibrous structure ply 28, or a direct formed fibrous structure ply 78. Any of the fibrous structure plies may be the same or different from any other of the fibrous structure plies. For example, two co-formed fibrous structure plies may be the same or different from each other. For example, two wet-laid fibrous structure plies may be the same or different from each other. For example, two direct formed fibrous structures plies may be the same or different from each other. The resulting multi-ply fibrous structure-containing article 20 of the present invention is shown in FIG. 29D where a first embossed fibrous structure ply comprising a co-formed fibrous structure web and a wet-laid fibrous structure web that exhibits a Core Height Value (MikroCAD Value) of greater than 0.60 mm as measured according to the Surface Texture Analysis Test Method is bonded via a water-resistant bond 74, for example a thermal bond in this case, to a second fibrous structure ply comprising a co-formed fibrous structure web and a wet-laid fibrous structure web such that void volumes between the two plies exists.

High definition thermal bonding (HDTB) is the combination of High Definition Embossing (HDE) combined with Thermal Bonding. HDE generates additional product thickness by straining the fibrous structure ply beyond its elastic yield point. The HDE emboss roll surfaces have specially designed protuberances. When loaded together, the protuberances on each roll mesh together. Passing a fibrous structure ply through this meshed surface imparts a strain on the fibrous structure ply thereby altering its properties.

The exact geometry of the HDE emboss elements (protuberances), and the extent to which the emboss rolls are loaded together (engaged with one another at a depth of engagement), change the amount of strain which is imparted to the fibrous structure ply, and therefore the amount of modification to the material properties. Thermal bonding multiple plies of product together also impact the properties of the resulting multi-ply fibrous structure-containing articles.

The amount of strain imparted to fibrous structure plies that pass through the loaded emboss roll bodies with raised design protuberances can be roughly calculated. The protuberances have a tooth height (protuberance height) and tooth width (protuberance width). There exists a gap between adjacent protuberances on the opposite emboss roll. The emboss roll bodies have an interference when loaded. The fibrous structure plies get significantly strained when the emboss rolls are loaded together.

The amount of localized strain imparted to a fibrous structure ply is a function of the exact position of the fibrous structure ply relative to the protuberances on the emboss rolls. However, the average strain can be calcualted using the geometry while asssuming both slip and non-slip between the fibrous structure ply and the surface of the protuberances. These assumptions bound the true amount of strain imparted to the fibrous structure ply.

The amount of strain imparted to a fibrous structure ply is a function of the amount of interference, the amount of spacing between adjacent elements (protuberances), and the size of the elements (protruberances).

HDE most significantly alters the material properties of the fibrous structure plies when the geometry associated with the interference between emboss rolls, the spacing between adjacent elements (protuberances) and the size the elements (protuberances) of the meshed protuberances generate localized strains in the fibrous structure ply that cause permanent deformation up to and including localized failure. Localized failure occurs when the fibrous structure ply is strained locally at a value higher than the failure point of the modulus of the fibrous structure ply. Experimentation has shown that localized failures roughly occur when the calculated strain associated with the HDE process using interference between emboss rolls, the spacing between adjacent elements (protuberances) and the size the elements (protuberances) of the meshed protuberances exceeds the failure strain on the modulus curve while assuming slip between the fibrous structure ply and the protuberances within the HDE nip.

The amount of calculated strain assuming slippage between the sheet and the emboss roll protuberance while running the HDTB process has been run as high as about 44% but more normally run at about 33%.

The design of the emboss roll elements/protuberances can take many shapes to accomplish the desired imparted strain intent. Circular or discrete dot protuberances when clustered together in a repeating pattern, generate a repeatable strain profile in the fibrous structure ply when the emboss rolls are run to a proper interference.

Line elements (protruberances) can also be used in the HDTB process. Line elements combined with circular or non-line elements can also be used. A pattern of elements may use both line elements and circular elements. This combination of line elements and circular elements yields more variation in localized stress to the fibrous structure ply since the geometry is more variable.

The thermal bond pattern in the resulting multi-ply fibrous structure-containing article is the result of which HDE rolls is used in the thermal bond process.

The use of continuous line elements can significantly alter the material properties of the resulting multi-ply fibrous structure-containing articles after exposure to the HDTB process. Thermally bonded multi-ply fibrous structure-containing articles exhibit a very different Vertical Full Sheet (VFS) absorbency because water meets resistance as it attempts to flow out of the multi-ply fibrous structure-containing article when compared to the non-thermally bonded/non-water-resistant bonded multi-ply fibrous structure-containing articles which contain areas of low resistance to the flow of water out of the multi-ply fibrous structure-containing article. Thermal bonds resist water flow since the thermal bonded portion of the multi-ply fibrous structure-containing article has very low pore volume.

NON-LIMITING EXAMPLES OF FIBROUS STRUCTURES OF THE PRESENT INVENTION

Example 1

Direct Formed—2-Ply Fibrous Structure-Containing Article

A 2-ply multi-ply fibrous structure-containing article is formed by combining two direct formed fibrous structure plies 78, 80, which may be the same or different from one another, as described below. Two rolls of direct formed fibrous structure plies 78, 80 are made as shown in FIG. 6B where a co-formed fibrous structure ply 28 (co-formed fibrous structure web associated with one meltblown fibrous structure web on one surface of the co-formed fibrous structure web and a wet-laid fibrous structure web 26 (a mono-fibrous element fibrous structure web)), for example a textured wet-laid fibrous structure web, such as a 3D patterned wet-laid fibrous structure web on the opposite surface of the co-formed fibrous structure web. The wet-laid fibrous structure web 26 may be further associated with a meltblown fibrous structure web on the wet-laid fibrous structure web's surface opposite the co-formed fibrous structure ply 28. Each direct formed fibrous structure ply is consolidated on a ElectroTech F541-281 forming fabric (commercially available from Albany International, Rochester, N.H.) and has 1.6 gsm polypropylene filaments on a surface of a 10.8 gsm (3.5 gsm polypropylene filaments and 7.3 gsm wood pulp fibers) co-formed fibrous structure web, which is formed on a 16.6 gsm wet-laid, wet-textured fibrous structure web 26, and 1.0 gsm polypropylene filaments on the other surface of the wet-laid, wet-textured fibrous structure web 26. The meltblown filaments of the meltblown fibrous structure web are comprised of 48% LynondellBasell MF650x, 28% LynondellBasell MF650w, 17% LyondellBasell PH835, 5% Polyvel S1416, and 2% Ampacet 412951 and are spun from a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, 440 grams per minute of Koch Industries 4725 semi-treated SSK are fed into a hammer mill and individualized into cellulose pulp fibers, which are pneumatically conveyed into a coforming box, example of which is described in U.S. patent application Ser. No. 14/970,586 filed Dec. 16, 2015, which is incorporated herein by reference. In the coforming box, the pulp fibers are commingled with meltblown filaments. The meltblown filaments are comprised of a blend of 48% LynondellBasell MF650x, 28% LynondellBasell MF650w, 17% LyondellBasell PH835, 5% Polyvel S1416, and 2% Ampacet 412951. The meltblown filaments are extruded/spun from a multi-row capillary Biax-Fiberfilm die at a ghm of 0.19 and a total mass flow of 93.48 g/min. The meltblown filaments are attenuated with 14 kg/min of about 204° C. (400° F.) air. The mixture (commingled) cellulose pulp fibers and synthetic meltblown filaments are then laid on top of the already formed 1.0 gsm of meltblown fibrous structure. An example of this process is shown in FIG. 2B. Next, a 1.6 gsm meltblown fibrous structure of the same composition as the meltblown fibrous structure at 0.22 ghm and is attenuated with 16.4 kg/min of 204° C. (400° F.) air is laid down on top of the co-formed fibrous structure such that the co-formed fibrous structure is positioned between the first meltblown fibrous structure and the second meltblown fibrous structure forming a multi-fibrous structure.

Figure 30:
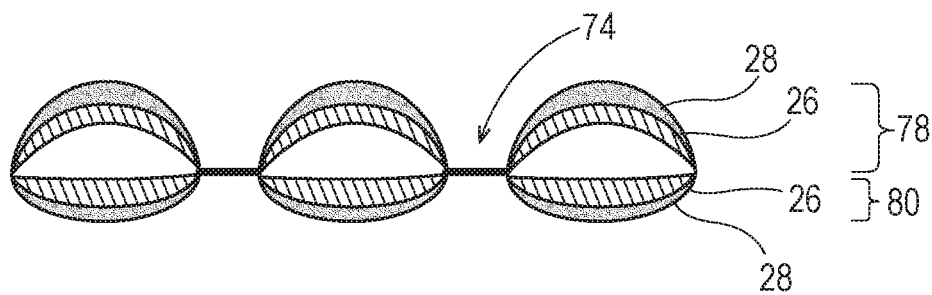
FIG. 30 is an example of a multi-ply fibrous structure-containing article made according to Example 1.

Two "parent" rolls of each direct formed fibrous structure ply are placed on unwind stands and unwound while tensioning in such a manner that the fibrous structure plies are neither overly strained to cause excessive fibrous structure ply neckdown nor under strained to cause wrinkles or edge defects. This tension is maintained throughout the process by using a series of driven rolls and idlers. One unwound fibrous structure ply (first fibrous structure ply) is metered to an emboss unit as described herein, for example a high definition emboss (HDE) unit, and drawn through the HDE unit's HDE nip, which is comprised of two mated steel rolls that have 0.120" tall metal protrusions. The design of these protrusions is such that the surface of the rolls can interfere without the protrusions touching each other until they bottom out with a 0.120" interference. The first fibrous structure ply, when passed through the HDE nip, is sufficiently strained due to the interference, spacing and number of the protrusions, to impart a significant increase in caliper to the thickness of the first fibrous structure ply and retains the general shape of the protrusions. The first fibrous structure ply exits the HDE nip while adhering to the protrusions on one of the two steel rolls that formed the HDE nip. The first fibrous structure ply is then combined on the same steel roll while adhered to the protrusions with a second fibrous structure ply that does not pass through an HDE nip and that is unwound and tensioned as previously described with regard to the first fibrous structure ply. The second fibrous structure ply bypasses the HDE nip and is then combined with the first fibrous structure ply with the use of a third roll that creates a thermal bond nip with the steel roll the first fibrous structure ply is adhered to, when pressed with sufficient force and heated to a certain temperature, causes the first and second fibrous structure plies to bond sufficiently together, while the first fibrous structure ply is adhered to the steel roll. The third roll is a smooth metal roll, which is heated to result in a water-resistant bond 74, for example a thermal bond, being formed between the first and second fibrous structure plies at numerous areas, which creates void volumes between the fibrous structure plies. The interference between the mated steel rolls forming the HDE nip is about 0.110". All three of the rolls are run with a target surface temperature of about 240° F.-250° F. The pressure run between in the thermal bond nip is about 150 pli. Without wishing to be bound by theory, it is believed that the combination of temperature and pressure softens the polymer filaments and allows the polymer to flow around the wet-laid fibrous web and forms a bond as it cools and sets. After exiting the thermal bond nip, the 2-ply fibrous structure is now a consolidated 2-ply fibrous structure, which is tensioned using driven rolls and idlers, that neither over strain the 2-ply fibrous structure to cause excessive neckdown, nor under strain the 2-ply fibrous structure to cause web handling control issues. The 2-ply fibrous structure is then perforated to a 5.9" sheet length using rotating anvil and blade rolls and finally wound to a 5.8" target diameter at 87 sheets using a rotating mandrel. FIG. 30 is an example of a multi-ply fibrous structure-containing article made according to this Example 1.

Example 2

Non-Direct Formed—4-Ply Fibrous Structure-Containing Article

A 4-ply multi-ply fibrous structure-containing article comprising 2 fibrous structure plies comprising co-formed fibrous structure plies 28 and 2 fibrous structure plies comprising wet-laid fibrous structure webs 26, any of which may be the same or different from one another, is made as follows. Each co-formed fibrous structure ply 28 is consolidated on a Velostat170pc740 belt (commercially available from Albany International, Rochester, N.H.) traveling at 240 ft/min. and has 1.6 gsm polypropylene filaments on a surface of a 10.8 gsm (3.5 gsm polypropylene filaments and 7.3 gsm wood pulp fibers) co-formed fibrous structure web, and 1.0 gsm polypropylene filaments on the other surface of the co-formed fibrous structure web to make the co-formed fibrous structure ply 28. Each wet-laid fibrous structure ply and/or web 26 is wet-textured and is 16.6 gsm. The meltblown filaments of the meltblown fibrous structure are comprised of 48% LynondellBasell MF650x, 28% LynondellBasell MF650w, 17% LyondellBasell PH835, 5% Polyvel S1416, and 2% Ampacet 412951 and are spun from a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, 440 grams per minute of Koch Industries 4725 semi-treated SSK are fed into a hammer mill and individualized into cellulose pulp fibers, which are pneumatically conveyed into a coforming box, example of which is described in U.S. patent application Ser. No. 14/970,586 filed Dec. 16, 2015, which is incorporated herein by reference. In the coforming box, the pulp fibers are commingled with meltblown filaments. The meltblown filaments are comprised of a blend of 48% LynondellBasell MF650x, 28% LynondellBasell MF650w, 17% LyodellBasell PH835, 5% Polyvel S1416, and 2% Ampacet 412951. The meltblown filaments are extruded/spun from a multi-row capillary Biax-Fiberfilm die at a ghm of 0.19 and a total mass flow of 93.48 g/min. The meltblown filaments are attenuated with 14 kg/min of about 204° C. (400° F.) air. The mixture (commingled) cellulose pulp fibers and synthetic meltblown filaments are then laid on top of the already formed 1.0 gsm of meltblown fibrous structure. An example of this process is shown in FIG. 2B. Next, a 1.6 gsm meltblown fibrous structure of the same composition as the meltblown fibrous structure at 0.22 ghm and is attenuated with 16.4 kg/min of 204° C. (400° F.) air is laid down on top of the co-formed fibrous structure such that the co-formed fibrous structure is positioned between the first meltblown fibrous structure and the second meltblown fibrous structure forming a multi-fibrous structure.

Figure 31:
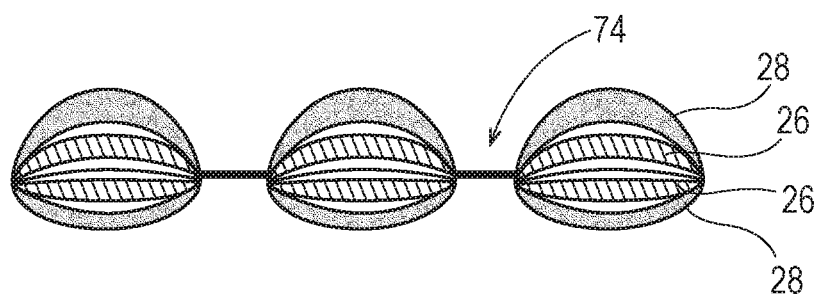
FIG. 31 is an example of a multi-ply fibrous structure-containing article made according to Example 2.

One wet-laid fibrous structure ply is combined with one co-formed fibrous structure ply forming a first 2-ply fibrous structure and passed through an HDE unit's HDE nip, which is comprised of two mated steel rolls that have 0.120" tall metal protrusions. The design of these protrusions is such that the surface of the rolls can interfere without the protrusions touching each other until they bottom out with a 0.120" interference. The first 2-ply fibrous structure, when passed through the HDE nip, is sufficiently strained due to the interference, spacing and number of the protrusions, to impart a significant increase in caliper to the thickness of the first 2-ply fibrous structure and retains the general shape of the protrusions. The first 2-ply fibrous structure exits the HDE nip while adhering to the protrusions on one of the two steel rolls that formed the HDE nip. The first 2-ply fibrous structure is then combined on the same steel roll while adhered to the protrusions with a second 2-ply fibrous structure (a co-formed fibrous structure ply combined with a wet-laid fibrous structure ply) that does not pass through an HDE nip and that is unwound and tensioned as previously described with regard to the first 2-ply fibrous structure. The second 2-ply fibrous structure bypasses the HDE nip and is then combined with the first 2-ply fibrous structure with the use of a third roll that creates a thermal bond nip with the steel roll the first 2-ply fibrous structure is adhered to, when pressed with sufficient force and heated to a certain temperature, causes the first and second 2-ply fibrous structures to bond sufficiently together, while the first 2-ply fibrous structure is adhered to the steel roll. The third roll is a smooth metal roll, which is heated to result in a water-resistant bond 74, for example a thermal bond, being formed between the first and second 2-ply fibrous structures at numerous areas, which creates void volumes between the fibrous structure plies. The interference between the mated steel rolls forming the HDE nip is about 0.110". All three of the rolls are run with a target surface temperature of about 240° F.-250° F. The pressure run between in the thermal bond nip is about 150 pli. Without wishing to be bound by theory, it is believed that the combination of temperature and pressure softens the polymer filaments and allows the polymer to flow around the wet-laid fibrous web and forms a bond as it cools and sets. After exiting the thermal bond nip, the 4-ply fibrous structure is now a consolidated 4-ply fibrous structure, which is tensioned using driven rolls and idlers, that neither over strain the 4-ply fibrous structure to cause excessive neckdown, nor under strain the 4-ply fibrous structure to cause web handling control issues. The 4-ply fibrous structure is then perforated to a 5.9" sheet length using rotating anvil and blade rolls and finally wound to a 5.8" target diameter at 87 sheets using a rotating mandrel. FIG. 31 is an example of a multi-ply fibrous structure-containing article made according to this Example 2.

Example 3

Direct Formed—2-Ply Fibrous Structure-Containing Article

A 2-ply multi-ply fibrous structure-containing article is formed by combining two direct formed fibrous structure plies as described below. Two rolls of direct formed fibrous structure plies are made as shown in FIG. 6B where a co-formed fibrous structure ply 28 (a co-formed fibrous structure web associated with one meltblown fibrous structure web on one surface of the co-formed fibrous structure web and a wet-laid fibrous structure web 26 (a mono-fibrous element fibrous structure web)), for example a textured wet-laid fibrous structure web, such as a 3D patterned wet-laid fibrous structure web on the opposite surface of the co-formed fibrous structure web. The wet-laid fibrous structure web 26 may be further associated with a meltblown fibrous structure web (mono-fibrous element fibrous structure web) on the wet-laid fibrous structure web's surface opposite the co-formed fibrous structure web. Each direct formed fibrous structure ply is consolidated on a textured forming fabric and has 1.6 gsm polypropylene filaments on a surface of a 8.0 gsm (2.0 gsm polypropylene filaments and 6.0 gsm wood pulp fibers) co-formed fibrous structure web, which is formed on a 21.0 gsm wet-laid, wet-textured fibrous structure web 26, and then after consolidation, 2.0 gsm polypropylene filaments is applied to the other surface of the wet-laid, wet-textured fibrous structure web 26. The meltblown filaments of the meltblown fibrous structure web are comprised of 48% LynondellBasell MF650x, 28% LynondellBasell MF650w, 17% LyondellBasell PH835, 5% Polyvel S1416, and 2% Ampacet 412951 and are spun from a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, 440 grams per minute of Koch Industries 4725 semi-treated SSK are fed into a hammer mill and individualized into cellulose pulp fibers, which are pneumatically conveyed into a coforming box, example of which is described in U.S. patent application Ser. No. 14/970,586 filed Dec. 16, 2015, which is incorporated herein by reference. In the coforming box, the pulp fibers are commingled with meltblown filaments. The meltblown filaments are comprised of a blend of 48% LynondellBasell MF650x, 28% LynondellBasell MF650w, 17% LyondellBasell PH835, 5% Polyvel S1416, and 2% Ampacet 412951. The meltblown filaments are extruded/spun from a multi-row capillary Biax-Fiberfilm die at a ghm of 0.19 and a total mass flow of 93.48 g/min. The meltblown filaments are attenuated with 14 kg/min of about 204° C. (400° F.) air. The mixture (commingled) cellulose pulp fibers and synthetic meltblown filaments are then laid on top of the already formed 1.0 gsm of meltblown fibrous structure. An example of this process is shown in FIG. 2B. Next, a 1.6 gsm meltblown fibrous structure of the same composition as the meltblown fibrous structure at 0.22 ghm and is attenuated with 16.4 kg/min of 204° C. (400° F.) air is laid down on top of the co-formed fibrous structure such that the co-formed fibrous structure is positioned between the first meltblown fibrous structure and the second meltblown fibrous structure forming a multi-fibrous structure.

Figure 32:
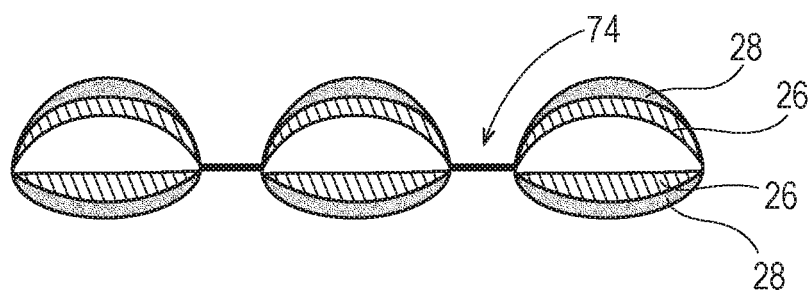
FIG. 32 is an example of a multi-ply fibrous structure-containing article made according to Example 3.

Two "parent" rolls of each direct formed fibrous structure ply are placed on unwind stands and unwound while tensioning in such a manner that the fibrous structure plies are neither overly strained to cause excessive fibrous structure ply neckdown nor under strained to cause wrinkles or edge defects. This tension is maintained throughout the process by using a series of driven rolls and idlers. One unwound fibrous structure ply (first fibrous structure ply) is metered to a high definition emboss (HDE) unit and drawn through the HDE unit's HDE nip, which is comprised of two mated steel rolls that have 0.120" tall metal protrusions. The design of these protrusions is such that the surface of the rolls can interfere without the protrusions touching each other until they bottom out with a 0.120" interference. The first fibrous structure ply, when passed through the HDE nip, is sufficiently strained due to the interference, spacing and number of the protrusions, to impart a significant increase in caliper to the thickness of the first fibrous structure ply and retains the general shape of the protrusions. The first fibrous structure ply exits the HDE nip while adhering to the protrusions on one of the two steel rolls that formed the HDE nip. The first fibrous structure ply is then combined on the same steel roll while adhered to the protrusions with a second fibrous structure ply that does not pass through an HDE nip and that is unwound and tensioned as previously described with regard to the first fibrous structure ply. The second fibrous structure ply bypasses the HDE nip and is then combined with the first fibrous structure ply with the use of a third roll that creates a thermal bond nip with the steel roll the first fibrous structure ply is adhered to, when pressed with sufficient force and heated to a certain temperature, causes the first and second fibrous structure plies to bond sufficiently together, while the first fibrous structure ply is adhered to the steel roll. The third roll is a smooth metal roll, which is heated to result in a water-resistant bond 74, for example a thermal bond, being formed between the first and second fibrous structure plies at numerous areas, which creates void volumes between the fibrous structure plies. The interference between the mated steel rolls forming the HDE nip is about 0.110". All three of the rolls are run with a target surface temperature of about 240° F.-250° F. The pressure run between in the thermal bond nip is about 150 pli. Without wishing to be bound by theory, it is believed that the combination of temperature and pressure softens the polymer filaments and allows the polymer to flow around the wet-laid fibrous web and forms a bond as it cools and sets. After exiting the thermal bond nip, the 2-ply fibrous structure is now a consolidated 2-ply fibrous structure, which is tensioned using driven rolls and idlers, that neither over strain the 2-ply fibrous structure to cause excessive neckdown, nor under strain the 2-ply fibrous structure to cause web handling control issues. The 2-ply fibrous structure is then perforated to a 5.9" sheet length using rotating anvil and blade rolls and finally wound to a 5.8" target diameter at 87 sheets using a rotating mandrel. FIG. 32 is an example of a multi-ply fibrous structure-containing article made according to this Example 3.

Example 4

Direct Formed—2-Ply Fibrous Structure-Containing Article

A 2-ply multi-ply fibrous structure-containing article is formed by combining one direct formed fibrous structure ply (combination of co-formed fibrous structure web and wet-laid fibrous structure web 26) as generally described above in Example 1 and one wet-laid fibrous structure ply and/or web 26, wherein the wet-laid fibrous structure web 26 of the direct formed fibrous structure ply may be the same or different from the other wet-laid fibrous structure ply and/or web 26. A roll of direct formed fibrous structure ply is made as shown in FIG. 6B where a co-formed fibrous structure ply 28 comprising a co-formed fibrous structure web associated with one meltblown fibrous structure web on one surface of the co-formed fibrous structure web and a wet-laid fibrous structure web 26 (a mono-fibrous element fibrous structure), for example a textured wet-laid fibrous structure web, such as a 3D patterned wet-laid fibrous structure web on the opposite surface of the co-formed fibrous structure web. The wet-laid fibrous structure web 26 may be further associated with a meltblown fibrous structure web on the wet-laid fibrous structure web's surface opposite the co-formed fibrous structure web. The direct formed fibrous structure ply is consolidated on a textured forming fabric and has 1.6 gsm polypropylene filaments on a surface of a 8.0 gsm (2.0 gsm polypropylene filaments and 6.0 gsm wood pulp fibers) co-formed fibrous structure web, which is formed on a 21.0 gsm wet-laid, wet-textured fibrous structure web 26, and then after consolidation, 2.0 gsm polypropylene filaments is applied to the other surface of the wet-laid, wet-textured fibrous structure web 26. The wet-laid fibrous structure web 26 is wet-textured and is 28.0 gsm. The meltblown filaments of the meltblown fibrous structure web are comprised of 48% LynondellBasell MF650x, 28% LynondellBasell MF650w, 17% LyondellBasell PH835, 5% Polyvel S1416, and 2% Ampacet 412951 and are spun from a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Then, 440 grams per minute of Koch Industries 4725 semi-treated SSK are fed into a hammer mill and individualized into cellulose pulp fibers, which are pneumatically conveyed into a coforming box, example of which is described in U.S. patent application Ser. No. 14/970,586 filed Dec. 16, 2015, which is incorporated herein by reference. In the coforming box, the pulp fibers are commingled with meltblown filaments. The meltblown filaments are comprised of a blend of 48% LynondellBasell MF650x, 28% LynondellBasell MF650w, 17% LyondellBasell PH835, 5% Polyvel S1416, and 2% Ampacet 412951. The meltblown filaments are extruded/spun from a multi-row capillary Biax-Fiberfilm die at a ghm of 0.19 and a total mass flow of 93.48 g/min. The meltblown filaments are attenuated with 14 kg/min of about 204° C. (400° F.) air. The mixture (commingled) cellulose pulp fibers and synthetic meltblown filaments are then laid on top of the already formed 1.0 gsm of meltblown fibrous structure. An example of this process is shown in FIG. 2B. Next, a 1.6 gsm meltblown fibrous structure of the same composition as the meltblown fibrous structure at 0.22 ghm and is attenuated with 16.4 kg/min of 204° C. (400° F.) air is laid down on top of the co-formed fibrous structure such that the co-formed fibrous structure is positioned between the first meltblown fibrous structure and the second meltblown fibrous structure forming a multi-fibrous structure.

Figure 33:
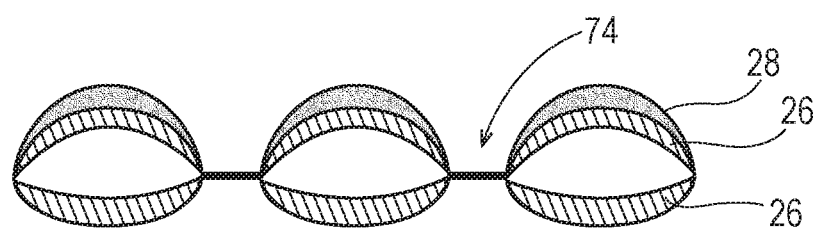
FIG. 33 is an example of a multi-ply fibrous structure-containing article made according to Example 4.

A roll of direct formed fibrous structure ply and a roll of wet-laid fibrous structure ply and/or web 26 are placed on unwind stands and unwound while tensioning in such a manner that the fibrous structure plies are neither overly strained to cause excessive fibrous structure ply neckdown nor under strained to cause wrinkles or edge defects. This tension is maintained throughout the process by using a series of driven rolls and idlers. A first fibrous structure ply (direct formed fibrous structure ply) is metered to a high definition emboss (HDE) unit and drawn through the HDE unit's HDE nip, which is comprised of two mated steel rolls that have 0.120" tall metal protrusions. The design of these protrusions is such that the surface of the rolls can interfere without the protrusions touching each other until they bottom out with a 0.120" interference. The first fibrous structure ply, when passed through the HDE nip, is sufficiently strained due to the interference, spacing and number of the protrusions, to impart a significant increase in caliper to the thickness of the first fibrous structure ply and retains the general shape of the protrusions. The first fibrous structure ply exits the HDE nip while adhering to the protrusions on one of the two steel rolls that formed the HDE nip. The first fibrous structure ply is then combined on the same steel roll while adhered to the protrusions with a second fibrous structure ply (the wet-laid fibrous structure ply) that does not pass through an HDE nip and that is unwound and tensioned as previously described with regard to the first fibrous structure ply. The second fibrous structure ply bypasses the HDE nip and is then combined with the first fibrous structure ply with the use of a third roll that creates a thermal bond nip with the steel roll the first fibrous structure ply is adhered to, when pressed with sufficient force and heated to a certain temperature, causes the first and second fibrous structure plies to bond sufficiently together, while the first fibrous structure ply is adhered to the steel roll. The third roll is a smooth metal roll, which is heated to result in a water-resistant bond 74, for example a thermal bond, being formed between the first and second fibrous structure plies at numerous areas, which creates void volumes between the fibrous structure plies. The interference between the mated steel rolls forming the HDE nip is about 0.110". All three of the rolls are run with a target surface temperature of about 240° F.-250° F. The pressure run between in the thermal bond nip is about 150 pli. Without wishing to be bound by theory, it is believed that the combination of temperature and pressure softens the polymer filaments and allows the polymer to flow around the wet-laid fibrous web and forms a bond as it cools and sets. After exiting the thermal bond nip, the 2-ply fibrous structure is now a consolidated 2-ply fibrous structure, which is tensioned using driven rolls and idlers, that neither over strain the 2-ply fibrous structure to cause excessive neckdown, nor under strain the 2-ply fibrous structure to cause web handling control issues. The 2-ply fibrous structure is then perforated to a 5.9" sheet length using rotating anvil and blade rolls and finally wound to a 5.8" target diameter at 87 sheets using a rotating mandrel. FIG. 33 is an example of a multi-ply fibrous structure-containing article made according to this Example 4.

Example 5

Non-Co-Formed—2-Ply Fibrous Structure-Containing Article

A 28.0 gsm wet-laid fibrous structure ply or wet-laid fibrous web which is made on a continuous knuckle/discrete pillow molding member with a 25% knuckle area is unwound onto a patterned molding member, knuckles facing away from the patterned molding member, traveling at 220 ft/minute.

Next, a 2.0 gsm meltblown fibrous structure web (meltblown filaments) is laid down upon the wet-laid fibrous web

26. The meltblown filaments of the meltblown fibrous structure web are comprised of 48% LynondellBasell MF650x, 28% LynondellBasell MF650w, 17% LyondellBasell PH835, 5% Polyvel S1416, and 2% Ampacet 412951 and are spun from a multi-row capillary Biax-Fiberfilm die (Biax-Fiberfilm Corporation, Greenville, Wis.) at a mass flow of 28 g/min and a ghm of 0.22 and is attenuated with 16.4 kg/min of 204° C. (400° F.) air. An example of this process is shown in FIG. 2B.

Next, a 2.0 gsm meltblown fibrous structure web of the same composition as above at a ghm of 0.22 and attenuated with 16.4 kg/min of 204° C. (400° F.) air is laid down on the other side of the wet-laid fibrous web. This multi-layer fibrous structure is then consolidated on a Velostat170pc740 belt (commercially available from Albany International, Rochester, N.H.) to form a non-co-formed fibrous structure.

Figure 34:
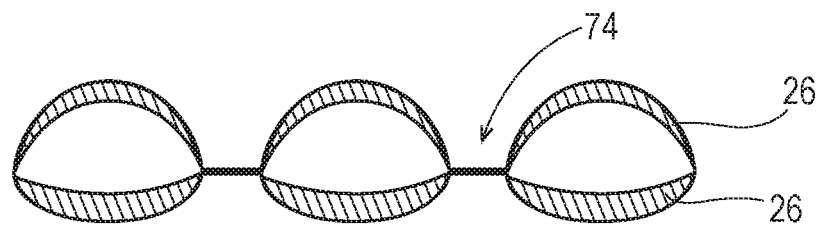
FIG. 34 is an example of a multi-ply fibrous structure-containing article according to Example 5.

Two rolls of this non-co-formed fibrous structure, which may be the same or different from one another, are placed on unwind stands and unwound while tensioning in such a manner that the non-co-formed fibrous structure plies are neither overly strained to cause excessive fibrous structure ply neckdown nor under strained to cause wrinkles or edge defects. This tension is maintained throughout the process by using a series of driven rolls and idlers. A first non-co-formed fibrous structure ply is metered to a high definition emboss (HDE) unit and drawn through the HDE unit's HDE nip, which is comprised of two mated steel rolls that have 0.120" tall metal protrusions. The design of these protrusions is such that the surface of the rolls can interfere without the protrusions touching each other until they bottom out with a 0.120" interference. The first fibrous structure ply, when passed through the HDE nip, is sufficiently strained due to the interference, spacing and number of the protrusions, to impart a significant increase in caliper to the thickness of the first fibrous structure ply and retains the general shape of the protrusions. The first fibrous structure ply exits the HDE nip while adhering to the protrusions on one of the two steel rolls that formed the HDE nip. The first fibrous structure ply is then combined on the same steel roll while adhered to the protrusions with a second non-co-formed fibrous structure ply that does not pass through an HDE nip and that is unwound and tensioned as previously described with regard to the first fibrous structure ply. The second fibrous structure ply bypasses the HDE nip and is then combined with the first fibrous structure ply with the use of a third roll that creates a thermal bond nip with the steel roll the first fibrous structure ply is adhered to, when pressed with sufficient force and heated to a certain temperature, causes the first and second fibrous structure plies to bond sufficiently together, while the first fibrous structure ply is adhered to the steel roll. The third roll is a smooth metal roll, which is heated to result in a water-resistant bond 74, for example a thermal bond, being formed between the first and second fibrous structure plies at numerous areas, which creates void volumes between the fibrous structure plies. The interference between the mated steel rolls forming the HDE nip is about 0.110". All three of the rolls are run with a target surface temperature of about 240° F.-250° F. The pressure run between in the thermal bond nip is about 150 pli. Without wishing to be bound by theory, it is believed that the combination of temperature and pressure softens the polymer filaments and allows the polymer to flow around the wet-laid fibrous web and forms a bond as it cools and sets. After exiting the thermal bond nip, the 2-ply fibrous structure is now a consolidated 2-ply fibrous structure, which is tensioned using driven rolls and idlers, that neither over strain the 2-ply fibrous structure to cause excessive neckdown, nor under strain the 2-ply fibrous structure to cause web handling control issues. The 2-ply fibrous structure is then perforated to a 5.9" sheet length using rotating anvil and blade rolls and finally wound to a 5.8" target diameter at 87 sheets using a rotating mandrel. FIG. 34 is an example of a multi-ply fibrous structure-containing article made according to this Example 5.

Example 6

2-Ply Fibrous Structure-Containing Article

A 24.0 gsm wet-laid fibrous structure ply/web 26 is produced as follows. A cellulosic pulp fiber furnish consisting of about 63% refined softwood furnish consisting of about 76% Northern Bleached Softwood Kraft (Resolute), and 24% Southern Bleached Softwood Kraft (Alabama River Softwood); 12% unrefined softwood furnish consisting of about 85% Northern Bleached Softwood Kraft (Resolute), and 15% Southern Bleached Softwood Kraft (Alabama River Softwood); about 27% of unrefined hardwood Eucalyptus Bleached Kraft (Fibria); and 10% Co-PET/PET (2 Denier, 5 mm length, Toray Chemical Korea). 0.9 ml Texcare SRN 240 (Clariant) is added per pound of Co-PET/PET during re-pulping to enhance wettability of the synthetic fiber is made. Any further furnish preparation and refining methodology common to the papermaking industry can be utilized.

A 3% active solution Kymene 5221 is added to the refined softwood line prior to an in-line static mixer and 1% active solution of Wickit 1285, an ethoxylated fatty alcohol available from Ashland Inc. is added to the unrefined Eucalyptus Bleached Kraft (Fibria) hardwood furnish. The addition levels are 21 and 1 lbs active/ton of paper, respectively.

The refined softwood and unrefined hardwood and unrefined NBSK/SSK/Eucalyptus bleached kraft/NDHK thick stocks are then blended into a single thick stock line followed by addition of 1% active carboxymethylcellulose (CMC-CALEXIS) solution at 7 lbs active/ton of paper towel, and optionally, a softening agent may be added.

The thick stock is then diluted with white water at the inlet of a fan pump to a consistency of about 0.15% based on total weight of softwood, hardwood and simulated broke fiber. The diluted fiber slurry is directed to anon layered configuration headbox such that the wet web formed onto a Fourdrinier wire (foraminous wire). Optionally, a fines retention/drainage aid may be added to the outlet of the fan pump.

Dewatering occurs through the Fourdrinier wire and is assisted by deflector and vacuum boxes. The Fourdrinier wire is of a 5-shed, satin weave configuration having 87 machine-direction and 76 cross-direction monofilaments per inch, respectively. The speed of the Fourdrinier wire is about 750 fpm (feet per minute).

The embryonic wet web is transferred from the Fourdrinier wire at a fiber consistency of about 24% at the point of transfer, to a belt, such as a patterned belt through-air-drying resin carrying fabric. In the present case, the speed of the patterned through-air-drying fabric is approximately the same as the speed of the Fourdrinier wire. In another case, the embryonic wet web may be transferred to a patterned belt and/or fabric that is traveling slower, for example about 20% slower than the speed of the Fourdrinier wire (for example a wet molding process).

Further de-watering is accomplished by vacuum assisted drainage until the web has a fiber consistency of about 30%.

While remaining in contact with the patterned belt, the web is pre-dried by air blow-through pre-dryers to a fiber consistency of about 65% by weight.

After the pre-dryers, the semi-dry web is transferred to a Yankee dryer and adhered to the surface of the Yankee dryer with a sprayed creping adhesive. The creping adhesive is an aqueous dispersion with the actives consisting of about 75% polyvinyl alcohol, and about 25% CREPETROL® R6390. Optionally a crepe aid consisting of CREPETROL® A3025 may be applied. CREPETROL® R6390 and CREPETROL® A3025 are commercially available from Ashland Inc. (formerly Hercules Inc.). The creping adhesive diluted to about 0.15% adhesive solids and delivered to the Yankee surface at a rate of about 2# adhesive solids based on the dry weight of the web. The fiber consistency is increased to about 97% before the web is dry creped from the Yankee with a doctor blade.

In the present case, the doctor blade has a bevel angle of about 45° and is positioned with respect to the Yankee dryer to provide an impact angle of about 101° and the reel is run at a speed that is about 15% faster than the speed of the Yankee. In another case, the doctor blade may have a bevel angle of about 25° and be positioned with respect to the Yankee dryer to provide an impact angle of about 81° and the reel is run at a speed that is about 7% faster than the speed of the Yankee. The Yankee dryer hood is operated at a temperature of about 450° F. and a speed of about 700 fpm. In the pre-dryer and on the yankee the co-pet sheath softens and forms thermoplastic bonds with cellulosic fiber in the sheet The fibrous structure is wound in a roll using a surface driven reel drum having a surface speed of about 750 feet per minute.

One parent roll of the wet-laid fibrous structure ply/web 26 (first fibrous structure ply) is unwound and metered to an emboss unit as described herein, for example a high definition emboss (HDE) unit, and drawn through the HDE unit's HDE nip, which is comprised of two mated steel rolls that have 0.120" tall metal protrusions. The design of these protrusions is such that the surface of the rolls can interfere without the protrusions touching each other until they bottom out with a 0.120" interference. The first wet laid fibrous structure ply, when passed through the HDE nip, is sufficiently strained due to the interference, spacing and number of the protrusions, to impart a significant increase in caliper to the thickness of the first fibrous structure ply and retains the general shape of the protrusions. The first wet laid fibrous structure ply exits the HDE nip while adhering to the protrusions on one of the two steel rolls that formed the HDE nip. The first wet laid fibrous structure ply is then combined on the same steel roll while adhered to the protrusions with a second wet laid fibrous structure ply that does not pass through an HDE nip and that is unwound and tensioned as previously described with regard to the first fibrous structure ply. The second wet laid fibrous structure ply bypasses the HDE nip and is then combined with the first fibrous structure ply with the use of a third roll that creates a thermal bond nip with the steel roll the first fibrous structure ply is adhered to, when pressed with sufficient force and heated to a certain temperature, causes the first and second wet laid fibrous structure plies to bond sufficiently together, while the first wet laid fibrous structure ply is adhered to the steel roll. The third roll is a smooth metal roll, which is heated to result in a thermal bond 74, in this case a water-resistant bond, being formed between the first and second wet laid fibrous structure plies are numerous areas. The interference between the mated steel rolls forming the HDE nip is about 0.110". All three of the rolls are run with a target surface temperature of about 240° F.-250° F. The pressure run between in the thermal bond nip is about 150 pli. Without wishing to be bound by theory, it is believed that the combination of temperature and pressure softens the co-PET sheath and allows the polymer to flow around the wet-laid fibrous web and forms a water-resistant bond 74, for example a thermal bond, as it cools and sets. After exiting the thermal bond nip, the 2-ply fibrous structure is now a consolidated 2-ply fibrous structure, which is tensioned using driven rolls and idlers, that neither over strain the 2-ply fibrous structure to cause excessive neckdown, nor under strain the 2-ply fibrous structure to cause web handling control issues. The 2-ply fibrous structure is then perforated to a 5.9" sheet length using rotating anvil and blade rolls and finally wound to a 5.8" target diameter at 87 sheets using a rotating mandrel. FIG. 34 is an example of a multi-ply fibrous structure-containing article made according to this Example 6.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Emtec Test Method

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2° C. and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref.2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref.2 samples").

Mount the test sample into the instrument, and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

Caliper Test Methods

Dry caliper of a fibrous structure and/or sanitary tissue product is measured using a ProGage Thickness Tester (Thwing-Albert Instrument Company, West Berlin, N.J.) with a pressure foot diameter of 5.08 cm (area of 6.45 $cm^2$) at a pressure of 14.73 $g/cm^2$. Four (4) samples are prepared by cutting of a usable unit such that each cut sample is at least 16.13 cm per side, avoiding creases, folds, and obvious defects. An individual specimen is placed on the anvil with the specimen centered underneath the pressure foot. The foot is lowered at 0.076 cm/sec to an applied pressure of 14.73 $g/cm^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Wet caliper is tested in the same manner, using 2 replicates. An individual replicate is placed on the anvil and wetted from the center, one drop at a time, with distilled or deionized water at the temperature of the conditioned room. Saturate the sample, adding enough water such that the sample is thoroughly wetted (from a visual perspective), with no observed dry areas anywhere on the sample. Continue with the measurement as described above.

Density Test Method

The density of a fibrous structure and/or sanitary tissue product is calculated as the quotient of the Basis Weight of a fibrous structure or sanitary tissue product expressed in lbs/3000 $ft^2$ divided by the Caliper (at 95 g/$in^2$) of the fibrous structure or sanitary tissue product expressed in mils. The final Density value is calculated in lbs/$ft^3$ and/or g/$cm^3$, by using the appropriate converting factors.

Bulk Test Method

The Bulk of a fibrous structure and/or sanitary tissue product is calculated as the quotient of the Caliper and the Basis Weight (as described in the methods above) of a fibrous structure or sanitary tissue product. Values are expressed in cm³/g, by using the appropriate unit conversions. Dry Bulk is calculated using the Dry Caliper of the fibrous structure and/or sanitary tissue product; Wet Bulk is calculated using the Wet Caliper of the fibrous structure and/or sanitary tissue product.

Wet Tensile Test Method

The Wet Tensile Strength Test Method is performed using a constant rate of extension tensile tester with computer interface (example: Thwing-Albert EJA Vantage tensile tester with Motion Analysis and Presentation software 3.0). The instrument is fitted with a set of grips (example: Thwing-Albert TAPPI Air Grips 733GC) and may be fitted with a Wet Tensile Device (example: Finch Wet Strength Device, Cat. No. 731D). If used, the device is clamped in the lower grip so that the horizontal rod is parallel to the grip faces and is otherwise symmetrically located with respect to the grips. During testing, the grips or the grip and device are pulled in opposite directions until the wetted sample fails (tears).

Substrates are conditioned by exposing them on a horizontal, flat surface and in a configuration of no more than 2 layers high in a room under standard conditioning temperature and humidity for a minimum of ten minutes.

For sheets with a length greater than 15.24 cm, samples are cut 2.54 cm×at least 15.2 cm each, four replicates in the machine direction and four replicates in the cross direction. The distance between the axis of the horizontal bar of the Wet strength device and the upper grip of the tensile tester is set to 10.16 cm. The liquid container of the Wet Strength Device is moved to its lowest position and filled with distilled water to within 3.2 mm of the top of the container. The horizontal rod and its supports are dried and the sample is threaded under the rod of the Wet Strength Device. The ends of the sample are placed together, removing any slack, centered with respect to the horizontal rod and the upper grip, and clamped in the upper grip of the tensile tester. The liquid container is raised so that it locks in its upper most position, immersing the looped end of the specimen to a depth of at least 1.91 cm. Exactly five seconds after the liquid container is raised in place and with the liquid container remaining in place, the tensile tester is engaged. The instrument is programmed to pull the grips in opposite directions at a speed of 10.16 cm/min. while recording the forces encountered during the test. The test is repeated on each of the remaining replicates.

Tensile strength is calculated by:

$$\text{avg. wet tensile strength} = \frac{\Sigma \text{ peak loads for each test}}{2*n}$$

For samples less than 15.24 cm in length, four strips are cut 2.54 cm×6.35 cm (at a minimum, preferably 10.16 cm long), two in the MD and tow in the CD. The Wet Tensile Device is replaced with another set of grips. In such cases, the grips are set to a distance of 5.08 cm apart and one end of the sample is placed in each grip. The sample should be nearly straight between the grips with no more than 5.0 g of force on the load cell. The sample is squirted with distilled or deionized water from a spray bottle to the point of saturation (until no dry area is observed) at which point the instrument is engaged. The grips are separated at a speed of 5.08 cm/min. and the force at tearing is recorded. The test is repeated on each of the remaining replicates.

Tensile strength is calculated by:

$$\text{avg. wet tensile strength} = \frac{\Sigma(\text{peak loads for each test})}{\text{\# reps}}$$

The test stops when the measured force drops to 50% of peak. The test outputs:

Peak Tensile (g/in): The measured value is divided by 2 for the full sheet because the sample curves around the Finch cup and returns.

Elongation at Peak Tensile (% elongation)

TEA (g*in/in²): Tensile Energy Absorbed: area under the tensile strength vs. tensile strain curve.

Tensile Modulus at 38 g/in (g/cm*%)

Linear regression of the 5 points before, 5 points after and at the force of 38.1 g/in. The tensile modulus is the slope of this regression.

Total Wet Tensile:

Total Wet Tensile=Average MD Wet Tensile+Average CD Wet Tensile

Geometric Mean Wet TEA:

Geometric Mean Wet TEA= $\sqrt{\text{AverageMDWetTEA}*\text{AverageCDWetTEA}}$

For each test, the stated value is the numerical average of the strips tested separately for the Machine Direction (MD) and Cross Direction (CD).

Dry Tensile Test Methods

Remove five (5) strips of four (4) usable units (also referred to as sheets) of fibrous structures and stack one on top of the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stacks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide sample strips for cross direction tensile testing.

For the actual measurement of the elongation, tensile strength, TEA and modulus, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity is set to 20.0 grams and the sample width is set to 1.00 inch (2.54 cm) and the sample thickness is set to 0.3937 inch (1 cm). The energy units are set to TEA and the tangent modulus (Modulus) trap setting is set to 38.1 g.

Take one of the fibrous structure sample strips and place one end of it in one clamp of the tensile tester. Place the other end of the fibrous structure sample strip in the other clamp. Make sure the long dimension of the fibrous structure sample strip is running parallel to the sides of the tensile tester. Also make sure the fibrous structure sample strips are not overhanging to the either side of the two clamps. In addition, the pressure of each of the clamps must be in full contact with the fibrous structure sample strip.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. The test is complete after the crosshead automatically returns to its initial starting position. When the test is complete, read and record the following with units of measure:

Peak Load Tensile (Tensile Strength) (g/in)
Peak Elongation (Elongation) (%)
Peak TEA (TEA) (in-g/in$^2$)
Tangent Modulus (Modulus) (at 15 g/cm)
Test each of the samples in the same manner, recording the above measured values from each test.
Calculations:
Geometric Mean (GM) Elongation=Square Root of [MD Elongation (%)×CD Elongation (%)]
Total Dry Tensile (TDT)=Peak Load MD Tensile (g/in)+ Peak Load CD Tensile (g/in)
Tensile Ratio=Peak Load MD Tensile (g/in)/Peak Load CD Tensile (g/in)
Geometric Mean (GM) Tensile=[Square Root of (Peak Load MD Tensile (g/in)×Peak Load CD Tensile (g/in))]×3
TEA=MD TEA (in-g/in$^2$)+CD TEA (in-g/in$^2$)
Geometric Mean (GM) TEA=Square Root of [MD TEA (in-g/in$^2$)×CD TEA (in-g/in$^2$)]
Modulus=MD Modulus (at 15 g/cm)+CD Modulus (at 15 g/cm)
Geometric Mean (GM) Modulus=Square Root of [MD Modulus (at 15 g/cm)×CD Modulus (at 15 g/cm)]
Flexural Rigidity Method The Flexural Rigidity Method determines the overhang length of the present invention based on the cantilever beam principal. The distance a strip of sample can be extended beyond a flat platform before it bends through a specific angle is measured. The inter-action between sheet weight and sheet stiffness measured as the sheet bends or drapes under its own weight through the given angle under specified test conditions is used to calculate the sample Bend Length and Flexural Rigidity.

The method is performed by cutting rectangular strips of samples of the fibrous structure to be tested, in both the cross direction and the machine direction. The weight of the sample is determined on a weight per area basis (Basis Weight, BW) and the caliper of the samples is measured. The sample is placed on a test apparatus that is leveled so as to be perfectly horizontal and the short edge of the sample is aligned with the test edge of the apparatus. The sample is gently moved over the edge of the apparatus until it falls under its own weight to a specified angle. At that point, the length of sample overhanging the edge of the instrument is measured.

The apparatus for determining the Flexural Rigidity of fibrous structures is comprised of a rectangular sample support with a micrometer and fixed angle monitor. The sample support is comprised of a horizontal plane upon which the sample rectangle can comfortably be supported without any interference at the start of the test. As it is slowly pushed over the edge of the apparatus, it will bend until it breaks the plane of the fixed angle monitor, at which point the micrometer measures the length of overhang.

Eight samples of 25.4×152.0 mm are cut in the machine direction (MD), carefully excluding any creases, bends, folds, perforations or otherwise weakened areas. Eight more samples of the same size are cut in the cross direction (CD), also excluding weakened areas. Adjacent cuts are made exactly perpendicular to each other. Samples are arranged such that the same surface is facing up. Four of the MD samples are overturned and four of the CD samples are overturned and marks are made at the extreme end of each, such that four MD samples will be tested with one side facing up and the other four MD samples will be tested with the other side facing up. The same is true for the CD samples with four being tested with one side up and four with the other side facing up.

A sample is then centered in a channel on the horizontal plane of the apparatus with one short edge exactly aligned with the edge of the apparatus. The channel is slightly oversized for the sample that was cut and aligns with the orientation of the rectangular support, such that the sample does not contact the sides of the channel. A lightweight slide bar is lowered over the sample resting in the groove such that the bar can make good contact with the sample and push it forward over the edge of the apparatus. The leading edge of the slide bar is also aligned with the edge of the apparatus and completely covers the sample. The micrometer is aligned with the slide bar and measures the distance the slide bar, thus the sample, advances.

From the back edge of the slide bar, the bar and sample are pushed forward at a rate of approximately 8-13 mm per second until the leading edge of the sample strip bends down and breaks the plane of the fixed angle measurement, set to 45°. At this point, the measurement for overhang is made by reading the micrometer to the nearest 0.5 mm.

The procedure is repeated for each of the 15 remaining samples of the fibrous structure. Flexural Rigidity is calculated from the overhang length as follows:

Bend Length=Overhang length/2

Where overhang length is the average of the 16 results collected.

The calculation for Flexural Rigidity (G) is:

$G=W*C^3$

Where W is the sample basis weight in grams/meter$^2$ and C is the bend length in cm.

Plate Stiffness Test Method

As used herein, the "Plate Stiffness" test is a measure of stiffness of a flat sample as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material the deflection can be predicted by:

$$w = \frac{3F}{4\pi E t^3}(1-v)(3+v)R^2$$

where "E" is the effective linear elastic modulus, "v" is the Poisson's ratio, "R" is the radius of the hole, and "t" is the thickness of the tissue, taken as the caliper in millimeters measured on a stack of 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3} \frac{F}{w} \qquad 5$$

The test results are carried out using an MTS Alliance RT/1, Insight Renew, or similar model testing machine (MTS Systems Corp., Eden Prairie, Minn.), with a 50 newton load cell, and data acquisition rate of at least 25 force points per second. As a stack of five tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. For typical perforated rolled bath tissue, sample preparation consists of removing five (5) connected usable units, and carefully forming a 5 sheet stack, accordion style, by bending only at the perforation lines. When the probe tip descends to 1 mm below the plane of the support plate, the test is terminated. The maximum slope (using least squares regression) in grams of force/mm over any 0.5 mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with different sample stacks). Thus, eight S values are calculated from four 5-sheet stacks of the same sample. The numerical average of these eight S values is reported as Plate Stiffness for the sample.

Basis Weight Test Method

Basis weight of an article and/or fibrous web and/or fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in $g/m^2$ as follows:

Basis Weight=(Mass of stack)/[(Area of 1 square in stack)×(No. of squares in stack)]

Basis Weight $(g/m^2)$=Mass of stack (g)/[79.032 $(cm^2)$/10,000 $(cm^2/m^2)$×12]

Report result to the nearest 0.1 $g/m^2$. Sample dimensions can be changed or varied using a similar precision cutter as mentioned above, so as at least 645 square centimeters of sample area is in the stack.

Individual fibrous structures and/or fibrous webs that are ultimately combined to form and article may be collected during their respective making operation prior to combining with other fibrous web and/or fibrous structures and then the basis weight of the respective fibrous web and/or fibrous structure is measured as outlined above.

Average Diameter Test Method

An article and/or fibrous web and/or fibrous structure comprising filaments is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Hand Protection Test Method

Figure 35:
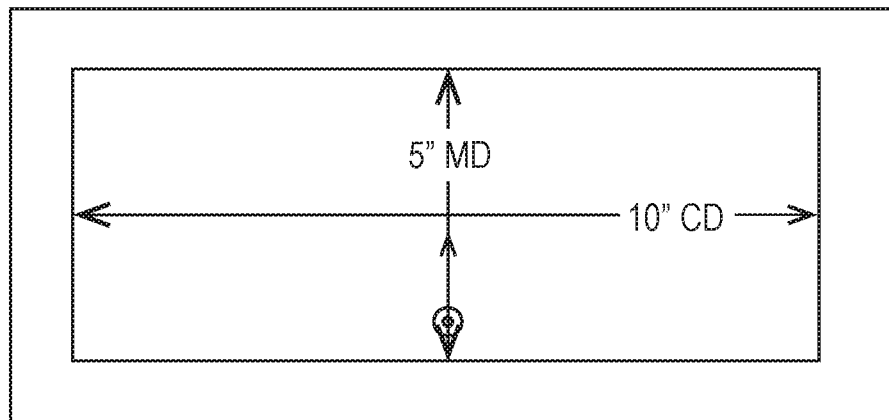
FIG. 35 is a sample setup used in the Hand Protection Test Method.

A single useable unit, for example from a roll of multi-ply fibrous structure-containing articles (for example a paper towel roll) is placed between two pieces of impermeable material that have a rectangular 10"×5" hole and clamped into place. The towel is oriented so the 10" dimension is in the CD and the 5" dimension is in the MD as shown in FIG. 35. The holder with the multi-ply fibrous structure-containing article in it is then placed with the side of the multi-ply fibrous structure-containing article towards the outside of the roll facing upwards and normal to the force of gravity. Optionally, the side of the towel facing the inside of the roll could be facing up. The towel is placed a holder and is held on a frame that is situated approximately 6" above the top surface of the scale. A bucket (catch basin) is placed on the scale to catch the water as it passes through the multi-ply fibrous structure article (towel in this example).

Figure 36:
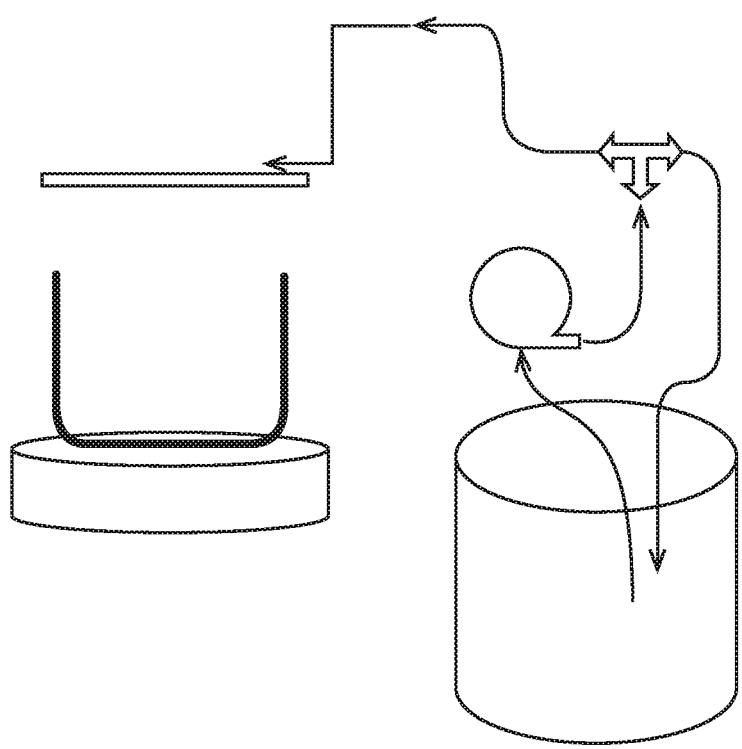
FIG. 36 is a test setup used in the Hand Protection Test Method.

As shown in FIG. 36, a 3/16" ID tube is placed such that the discharge of the tube is horizontal and located just above the top surface of the towel, approximately 1" from one MD edge and in the center of the CD dimension. The tube is oriented so that the discharge of the water is in the MD direction. At the beginning of the test, water is pumped at 5 mL/sec 0.25 mL/sec onto the top of the towel. A timer starts when water hits the top of the sheet and the scale begins outputting weight every 0.1 seconds. Data is collected in a text file for analysis.

At the beginning of the test a blank with no sample in the holder is run. Time is started when water leaves the 3/16" ID tube and stopped when 0.15 g of water is collected in the bucket. This "blank time" will then be subtracted from the total time collected for the towel sample experiments, as this is a function of the experimental geometry and not the towel.

The value that is reported is the time, reported to the nearest 0.01 seconds, that takes 0.15 grams of water to pass through the towel and into the bucket, minus the blank time, keeping track of which side of the towel was facing up. Both sides should be tested, with the time to 0.15 grams of water reported for each side separately. Three replicates are ran per side, averaged, and reported as one instance, or "N".

Dry Thick Compression and Recovery Test Method

Dry Thick Compression and Dry Thick Compressive Recovery are measured using a constant rate of extension tensile tester (a suitable instrument is the EJA Vantage, Thwing-Albert, West Berlin N.J., or equivalent) fitted with compression fixtures, a circular compression foot having an area of 1.0 in$^2$ and a circular anvil having an area of at least 4.9 in$^2$. The thickness (caliper in mils) is measured at varying pressure values ranging from 10-1500 g/in$^2$ in both the compression and relaxation directions.

Four (4) samples are prepared by the cutting of a usable unit obtained from the outermost sheets of a finished product roll, such that each cut sample is 2.0×2.0 inches, avoiding creases, folds, and obvious defects.

The compression foot and anvil surfaces are aligned parallel to each other, and the crosshead zeroed at the point where they are in contact with each other. The tensile tester is programmed to perform a compression cycle, immediately followed by an extension (recovery) cycle. Force and extension data are collected at a rate of 50 Hz, with a crosshead speed of 0.10 in/min. Force data is converted to pressure (g/in$^2$, or gsi). The compression cycle continues until a pressure of 1500 gsi is reached, at which point the crosshead stops and immediately begins the extension (recovery) cycle with the data collection and crosshead speed remaining the same.

The sample is placed flat on the anvil fixture, ensuring the sample is centered beneath the foot so that when contact is made the edges of the sample will be avoided. Start the tensile tester and data collection. Testing is repeated in like fashion for all four samples.

The thickness (mils) vs. pressure (g/in$^2$, or gsi) data is used to calculate the sample's compressibility, near-zero load caliper, and compressive modulus. A least-squares linear regressions is performed on the thickness vs. the logarithm (base 10) of the applied pressure data using nine discrete data points at pressures of 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Dry Thick Compression is defined as:

Dry Thick Compression (mils·mils/log (gsi)=−1× Near Zero Load Caliper (b)×Compressibility (m)

Multiplication by −1 turns formula into a positive. Larger results represent thick products that compress when a pressure is applied. Calculate the arithmetic mean of the four replicate values and report Dry Thick Compression to the nearest integer value mils*mils/log (gsi).

Dry Thick Compressive Recovery is defined as:

$$\text{Dry Thick Compressive Recovery(mils·mils/log (gsi))} = -1 \times$$
$$\text{Near Zero Load Caliper } (b) \times \text{Compressibility } (m) \times$$
$$\frac{\text{Recovered Thickness at 10 gsi}}{\text{Compressed Thickness at 10 gsi}}$$

Multiplication by −1 turns formula into a positive. Larger results represent thick products that compress when a pressure is applied and maintain fraction recovery at 10 g/in$^2$. Compressed thickness at 10 g/in$^2$ is the thickness of the material at 10 g/in$^2$ pressure during the compressive portion of the test. Recovered thickness at 10 g/in$^2$ is the thickness of the material at 10 g/in$^2$ pressure during the recovery portion of the test. Calculate the arithmetic mean of the four replicate values and report Dry Thick Compressive Recovery to the nearest integer value mils*mils/log (gsi).

Measuring samples with the Dry Thick Compression and Recovery Test Method and the Wet Thick Compression and Recovery Test Method allows for calculating wet relative to dry properties.

Low Load Wet Resiliency is defined as:

$$\text{Low Load Wet Resilency (mils/mils)} = \frac{\text{Wet Compressed Thickness at 10 gsi}}{\text{Dry Compressed Thickness at 10 gsi}}$$

Calculate using the arithmetic mean of the four replicate values of compressed thickness at 10 gsi with Wet Thick Compression to nearest 0.1 and the arithmetic mean of the four replicate values of compressed thickness at 10 gsi with Dry Thick Compression to nearest 0.1.

Mid Load Wet Resiliency is defined as:

$$\text{Mid Load Wet Resilency (mils/mils)} = \frac{\text{Wet Compressed Thickness at 100 gsi}}{\text{Dry Compressed Thickness at 100 gsi}}$$

Calculate using the arithmetic mean of the four replicate values of compressed thickness at 100 gsi with Wet Thick Compression to nearest 0.1 and the arithmetic mean of the four replicate values of compressed thickness at 100 gsi with Dry Thick Compression to nearest 0.1.

Wet Thick Compression and Recovery Test Method

Wet Thick Compression and Wet Thick Compressive Recovery are measured using a constant rate of extension tensile tester (a suitable instrument is the EJA Vantage, Thwing-Albert, West Berlin N.J., or equivalent) fitted with compression fixtures, a circular compression foot having an area of 1.0 in$^2$ and a circular anvil having an area of at least 4.9 in$^2$. The thickness (caliper in mils) is measured at varying pressure values ranging from 10-1500 g/in$^2$ in both the compression and relaxation directions.

Four (4) samples are prepared by the cutting of a usable unit obtained from the outermost sheets of a finished product roll, such that each cut sample is 2.0×2.0 inches, avoiding creases, folds, and obvious defects.

The compression foot and anvil surfaces are aligned parallel to each other, and the crosshead zeroed at the point where they are in contact with each other. The tensile tester is programmed to perform a compression cycle, immediately followed by an extension (recovery) cycle. Force and extension data are collected at a rate of 50 Hz, with a crosshead speed of 0.10 in/min. Force data is converted to pressure (g/in$^2$, or gsi). The compression cycle continues until a pressure of 1500 gsi is reached, at which point the crosshead stops and immediately begins the extension (recovery) cycle with the data collection and crosshead speed remaining the same.

The sample is placed flat on the anvil fixture, ensuring the sample is centered beneath the foot so that when contact is made the edges of the sample will be avoided. Saturate the sample with distilled or deionized water until there is no observable dry area remaining. Sample should be saturated but not so wet as to run off the sample. Start the tensile tester and data collection. Testing is repeated in like fashion for all four samples.

The thickness (mils) vs. pressure (g/in$^2$, or gsi) data is used to calculate the sample's compressibility, "near-zero load caliper", and compressive modulus. A least-squares linear regressions is performed on the thickness vs. the logarithm (base 10) of the applied pressure data using nine discrete data points at pressures of 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Wet Thick Compression is defined as:

Wet Thick Compression (mils·mils/log (gsi))=−1× Near Zero Load Caliper (b)× Compressibility (m)

Multiplication by −1 turns formula into a positive. Larger results represent thick products that compress when a pressure is applied. Calculate the arithmetic mean of the four replicate values and report Wet Thick Compression to the nearest integer value mils*mils/log (gsi).

Wet Thick Compressive Recovery is defined as:

Wet Thick Compressive Recovery (mils·mils/log (gsi))=−1×Near Zero Load Caliper (b)×Compressibility (m)×Recovered Thickness at 10 gsi/ Compressed Thickness at 10 gsi Multiplication by −1 turns formula into a positive. Larger results represent thick products that compress when a pressure is applied and maintain fraction recovery at 10 g/in$^2$. Compressed thickness at 10 g/in$^2$ is the thickness of the material at 10 g/in$^2$ pressure during the compressive portion of the test. Recovered thickness at 10 g/in$^2$ is the thickness of the material at 10 g/in$^2$ pressure during the recovery portion of the test. Calculate the arithmetic mean of the four replicate values and report Wet Thick Compressive Recovery to the nearest integer value mils*mils/log (gsi).

Measuring samples with the Dry Thick Compression and Recovery Test Method and the Wet Thick Compression and Recovery Test Method allows for calculating wet relative to dry properties.

Low Load Wet Resiliency is defined as:

$$\text{Low Load Wet Resiliency (mils/mils)} = \frac{\text{Wet Compressed Thickness at 10 gsi}}{\text{Dry Compressed Thickness at 10 gsi}}$$

Calculate using the arithmetic mean of the four replicate values of compressed thickness at 10 gsi with Wet Thick Compression to nearest 0.1 and the arithmetic mean of the four replicate values of compressed thickness at 10 gsi with Dry Thick Compression to nearest 0.1.

Mid Load Wet Resiliency is defined as:

$$\text{Mid Load Wet Resiliency (mils/mils)} = \frac{\text{Wet Compressed Thickness at 100 gsi}}{\text{Dry Compressed Thickness at 100 gsi}}$$

Calculate using the arithmetic mean of the four replicate values of compressed thickness at 100 gsi with Wet Thick Compression to nearest 0.1 and the arithmetic mean of the four replicate values of compressed thickness at 100 gsi with Dry Thick Compression to nearest 0.1.

Surface Texture Analysis Test Method

In the Surface Texture Analysis Test Method, sheets of a fibrous structure are removed from an article, such as a paper towel roll, and the areal surface topology of both sides are measured using optical profilometry. The 3D surface data are then processed and analyzed to extract the Core Height Value, Core Height Difference Value, Core Void Volume, and Core Material Volume. All sample preparation and testing is performed in a conditioned room maintained at about 23±2° C. and about 50±2% relative humidity, and samples are equilibrated in this environment for at least 24 hours prior to testing.

Sample Preparation

Test samples are usable unit sheets removed from three different locations within the article, such as the outside, middle, and inside of a paper towel roll. Two replicate usable unit samples are removed at each of the three locations, maximizing the amount of distance between the three locations within the article, while avoiding sheets with noticeable defects. Each sample's location and side, outward or inward facing within the roll, should be identified and noted.

3D Surface Image Acquisition

Three-dimensional (3D) surface topography images are obtained on corresponding outer facing and inner facing sides of a sample using an optical 3D surface topography measurement system (a suitable optical 3D surface topography measurement system is the MikroCAD Premium instrument commercially available from LMI Technologies Inc., Vancouver, Canada, or equivalent). The system includes the following main components: a) a Digital Light Processing (DLP) projector with direct digital controlled micro-mirrors; b) a CCD camera with at least a 1600×1200 pixel resolution; c) projection optics adapted to a measuring area of at least 140 mm×105 mm; d) recording optics adapted to a measuring area of 140 mm×105 mm; e) a table tripod based on a small hard stone plate; f) a blue LED light source; g) a measuring, control, and evaluation computer running surface texture analysis software (a suitable software is MikroCAD software with MountainsMap technology, or equivalent); and h) calibration plates for lateral (xy) and vertical (z) calibration available from the vendor.

The optical 3D surface topography measurement system measures the surface height of a sample using the digital micro-mirror pattern fringe projection technique. The result of the measurement is a 3D image of surface height (defined as the or z axis) versus displacement in the horizontal (xy) plane. The system has a field of view of 140×105 mm with an xy pixel resolution of approximately 85 microns. The height resolution is set at 0.5 micron/count, with a height range of +/−16 mm.

The instrument is calibrated according to manufacturer's specifications using the calibration plates for lateral (xy plane) and vertical (z axis) available from the vendor.

The sample placed flat on the table beneath the camera. A 3D surface topology image of the specimen is collected by following the instrument manufacturer's recommended measurement procedures, which may include focusing the measurement system and performing a brightness adjustment. No pre-filtering options are used. The collected height image file is saved to the evaluation computer running the surface texture analysis software.

3D Surface Image Analysis

The 3D surface topography image is opened in the surface texture analysis software. The following filtering procedure is then performed on each image: 1) removal of invalid, or non-measured, points; 2) a 3×3 pixel median filter to remove noise; 3) remove by subtraction the least square plane to level the surface; and 4) a Gaussian filter (according to ISO 16610-61) with a nesting index (cut-off wavelength) of 25 mm to flatten the surface. End effect correction is not utilized such that the image size is reduced by half of the cut-off wavelength around the perimeter.

This filtering procedure produces the S-L surface from which the areal surface texture parameters will be calculated. For each of the 3D surface topography images of both sides of the two replicate samples from the three locations, the following analysis is then performed.

The Core Height Value and Core Height Difference Value measurements are based on the core height, Sk, parameter described in ISO 13565-2:1996 standard extrapolated to surfaces and ISO 25178-2:2012. The parameter Sk is derived from the Areal Material Ratio (Abbott-Firestone) curve, which is the cumulative curve of the surface height distribution histogram versus the range of surface heights. The Core Height Value is the height difference between the material ratios Mr1 and Mr2 as read off of the Areal Material Ratio curve. Mr1, set to 2%, is the material ratio which separates the protruding peaks from the core roughness region. Mr2, set to 98%, is the material ratio which separates the deep valleys from the core roughness region. Record the Core Height Value to the nearest 0.01 mm. The Core Height Difference Value is the absolute value difference between the Core Height Values measured on the outward and inward facing surfaces of a usable unit sample. Record the Core Height Difference value to the nearest 0.01 mm.

The Core Void Volume (Vvc) and Core Material Volume (Vmc) measurements are described in ISO 25178-2:2012. The Vvc and Vmc parameters are derived from the Areal Material Ratio (Abbott-Firestone) curve described in the ISO 13565-2:1996 standard extrapolated to surfaces, which is the cumulative curve of the surface height distribution histogram versus the range of surface heights. A material ratio is the ratio, given as a %, of the intersecting area of a plane passing through the surface at a given height to the cross sectional area of the evaluation region. Vvc is the difference in void volume between p and q material ratios, and Vmc is the difference in material volume between p and q material ratios. The Core Void Volume is the volume of void space above the surface of the sample between the height corresponding to a material ratio value of 2% to the material ratio of 98%, which is the Vvc parameter calculated with a p value of 2% and q value of 98%. The Core Material Volume is the volume of material below the surface of the sample between the height corresponding to a material ratio value of 2% to the material ratio of 98%, which is the Vmc parameter calculated with a p value of 2% and q value of 98%. The volumes are normalized to the area (volume/area) of the image and are recorded to the nearest 0.001 $mm^3/mm^2$.

Reporting of Method Parameters

After the analysis described above in the 3D surface image analysis section is performed on 3D surface topology images of all five specimen replicates, the following output parameters are defined and reported.

The arithmetic mean of the two replicate Core Height Values measured on each side of a sample at the three different roll locations is calculated and is reported to the nearest 0.01 mm. The arithmetic mean of the two replicate Core Height Difference Values measured at the three different roll locations is calculated and is reported to the nearest 0.01 mm. The arithmetic mean of the two replicate Core Void Volume (Vvc) values measured on each side of a sample at the three different roll locations is calculated and is reported to the nearest 0.001 $mm^3/mm^2$. The arithmetic mean of the two replicate Core Material Volume (Vmc) values measured on each side of a sample at the three different roll locations is calculated and is reported to the nearest 0.001 $mm^3/mm^2$.

CRT Test Method

The absorption (wicking) of water by a fibrous structure, such as a multi-ply fibrous structure-containing article is measured over time by a CRT device manufactured by Integrated Technologies Engineering, Loveland, Ohio. The CRT device consists of a balance (sensitive to 0.001 g) on which rests a sample platform made of a woven grid (using nylon monofilament line having a 0.356 mm diameter) placed over a small reservoir with a delivery tube (8 mm I.D.) in the center. This reservoir is filled with distilled water by the action of solenoid valves, which connect the sample supply reservoir to an intermediate reservoir, the water level of which is monitored by an optical sensor. The CRT device is connected to software that records the weight of the water absorbed over 2 seconds time by the fibrous structure. Final weight is also recorded at saturation. The CRT device is run with a −2 mm water column, controlled by adjusting the height of water in the supply reservoir and in a Conditioned Room—Temperature is controlled from 73° F.±2° F. (23° C.±1° C.). Relative Humidity is controlled from 50%±2%

Sample Preparation—For this method, a usable unit is described as one finished product unit regardless of the number of plies. Condition all samples with packaging materials removed for a minimum of 2 hours prior to testing. Discard at least the first ten usable units from the roll. Remove two usable units and cut for CRT values one 3-inch circular sample and for SST values one 3.375-inch circular sample from the center of each usable unit for a total of 2 replicates for each test result. Product samples are cut using hydraulic/pneumatic precision cutter. Do not test samples with defects such as wrinkles, tears, holes, etc. Replace with another usable unit which is free of such defects.

Software—LabView based custom software specific to CRT Version 4.2 or later.

Water—Distilled water with conductivity<10 µS/cm (target<5 µS/cm)@ 25° C.

Sample Testing

Pre-Test Set-Up

1. The water height in the reservoir tank is set −2.0 mm below the top of the support rack (where the towel sample will be placed).
2. The supply tube (8 mm I.D.) is centered with respect to the support net.
3. Test samples are cut into circles of 3⅜" diameter and equilibrated at Tappi environment conditions for a minimum of 2 hours.

Test Description

1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.
2. The software prompts you to "load a sample". A sample is placed on the support net, centering it over the supply tube, and with the side facing the outside of the roll placed downward.
3. Close the balance windows, and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".
5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz, and is started about 0.4 seconds before water contacts the sample.
6. The test runs for at least 20 seconds. After this, the supply tube pulls away from the sample to break the hydraulic connection.
7. The wet sample is removed from the support net. Residual water on the support net and cover are dried with a paper towel.
8. Repeat until all samples are tested.
9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.

Calculation of Rate of Uptake

Take the raw data file that includes time and weight data.

The CRT Rate and CRT Capacity (amount of water/weight of sample) values are generated by the CRT device. To obtain CRT Area, divide the amount of water by area of sample tested.

First, create a new time column that subtracts 0.4 seconds from the raw time data to adjust the raw time data to correspond to when initiation actually occurs (about 0.4 seconds after data collection begins).

Second, create a column of data that converts the adjusted time data to square root of time data (e.g., using a formula such as SQRT( ) within Excel).

Third, calculate the slope of the weight data vs the square root of time data (e.g., using the SLOPE( ) function within Excel, using the weight data as the y-data and the sqrt(time) data as the x-data, etc.). The slope should be calculated for the data points from 2 to 15 seconds, inclusive (or 1.41 to 3.87 in the sqrt(time) data column).

Calculation of Slope of the Square Root of Time (SST)

The start time of water contact with the sample is estimated to be 0.4 seconds after the start of hydraulic connection is established between the supply tube and the sample (CRT Time). This is because data acquisition begins while the tube is still moving towards the sample, and incorporates the small delay in scale response. Thus, "time zero" is actually at 0.4 seconds in CRT Time as recorded in the *.txt file.

The slope of the square root of time (SST) from 2-15 seconds is calculated from the slope of a linear regression line from the square root of time between (and including) 2 to 15 seconds (x-axis) versus the cumulative grams of water absorbed. The units are $g/sec^{0.5}$.

Reporting Results

Report the average slope to the nearest 0.01 $g/sec^{0.5}$.

Pore Volume Distribution Test Method

Pore Volume Distribution measurements are made on a TRI/Autoporosimeter (TRI/Princeton Inc. of Princeton, N.J.).

First Filter Pore Volume Distribution Methodology

The TRI/Autoporosimeter is an automated computer-controlled instrument for measuring pore volume distributions in porous materials (e.g., the volumes of different size pores within the range from 1 to 1000 µm effective pore radii). Complimentary Automated Instrument Software, Release 2000.1, and Data Treatment Software, Release 2000.1 is used to capture, analyze and output the data. More information on the TRI/Autoporosimeter, its operation and data treatments can be found in The Journal of Colloid and Interface Science 162 (1994), pgs 163-170, incorporated here by reference.

As used in this application, determining Pore Volume Distribution involves recording the increment of liquid that enters a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship.

$$\text{Pressure differential} = [(2)\gamma \cos \Theta]/\text{effective radius}$$

where $\gamma$=liquid surface tension, and $\Theta$=contact angle.

Typically pores are thought of in terms such as voids, holes or conduits in a porous material. It is important to note that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide an accepted means to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed at each pressure increment is the cumulative volume for the group of all pores between the preceding pressure setting and the current setting.

In this application of the TRI/Autoporosimeter, the liquid is a 0.2 weight % solution of octylphenoxy polyethoxy ethanol (Triton X-100 from Union Carbide Chemical and Plastics Co. of Danbury, Conn.) in distilled water. The instrument calculation constants are as follows: $\rho$ (density)=1 g/cm$^3$; $\gamma$ (surface tension)=31 dynes/cm; cos $\Theta$=1. A 1.2 µm Millipore Glass Filter (Millipore Corporation of Bedford, Mass.; Catalog #GSWP09025) is employed on the test chamber's porous plate. A plexiglass plate weighing about 24 g (supplied with the instrument) is placed on the sample to ensure the sample rests flat on the Millipore Filter. No additional weight is placed on the sample.

The remaining user specified inputs are described below. The sequence of pore sizes (pressures) for this application is as follows (effective pore radius in µm): 1, 2.5, 5, 10, 15, 20, 30, 40, 50, 60, 70, 80, 90, 100, 120, 140, 160, 180, 200, 225, 250, 275, 300, 350, 400, 500, 600, 800, 1000. This sequence starts with the sample dry, saturates it as the pore settings increase (typically referred to with respect to the procedure and instrument as the 1$^{st}$ absorption).

In addition to the test materials, a blank condition (no sample between plexiglass plate and Millipore Filter) is run to account for any surface and/or edge effects within the chamber. Any pore volume measured for this blank run is subtracted from the applicable pore grouping of the test sample. This data treatment can be accomplished manually or with the available TRI/Autoporosimeter Data Treatment Software, Release 2000.1.

Percent (%) Total Pore Volume is a percentage calculated by taking the volume of fluid in the specific pore radii range divided by the Total Pore Volume. The TRI/Autoporosimeter outputs the volume of fluid within a range of pore radii. The first data obtained is for the "2.5 micron" pore radii which includes fluid absorbed between the pore sizes of 1 to 2.5 micron radius. The next data obtained is for "5 micron" pore radii, which includes fluid absorbed between the 2.5 micron and 5 micron radii, and so on. Following this logic, to obtain the volume held within the range of 91-140 micron radii, one would sum the volumes obtained in the range titled "100 micron", "110 micron", "120 micron", "130 micron", and finally the "140 micron" pore radii ranges. For example, % Total Pore Volume 91-140 micron pore radii=(volume of fluid between 91-140 micron pore radii)/Total Pore Volume.

Horizontal Full Sheet (HFS) Test Method

The Horizontal Full Sheet (HFS) test method determines the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a horizontal position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the HFS capacity of fibrous structures comprises the following:

1) An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the sample tested (i.e.; a fibrous structure sample of about 11 in. (27.9 cm) by 11 in. (27.9 cm)). The balance pan can be made out of a variety of materials. Plexiglass is a common material used.

Figure 37:
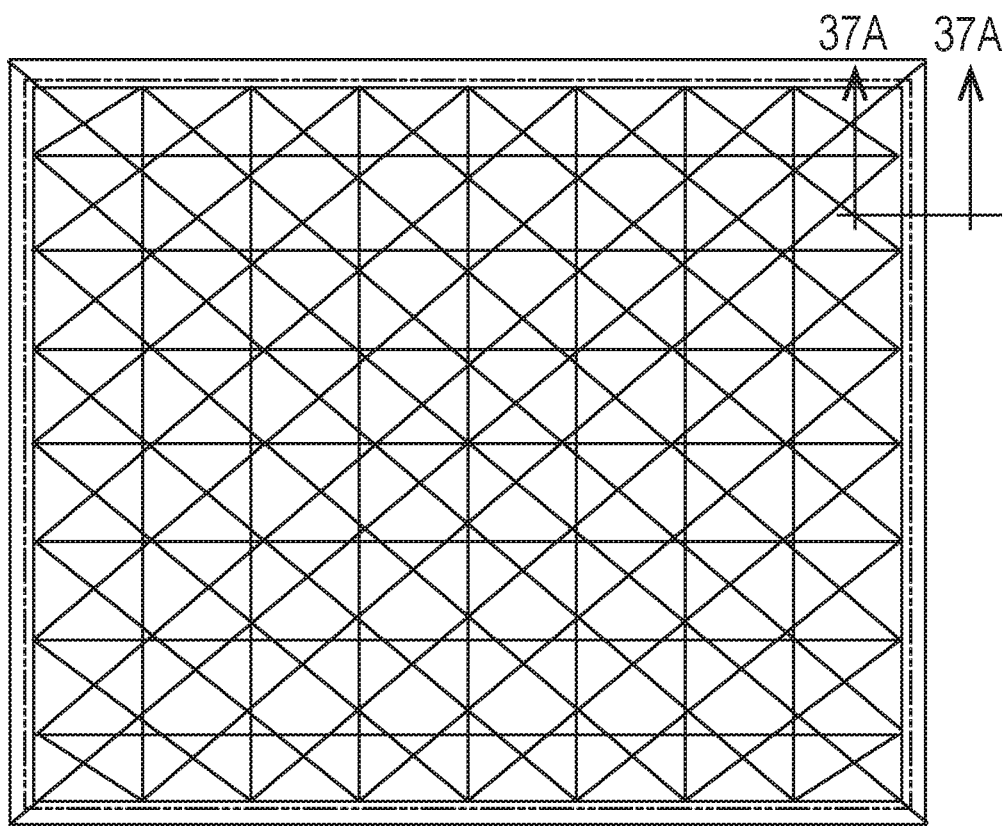
FIG. 37 is an example of a sample support rack used in the HFS and VFS Test Methods.
Figure 37A:
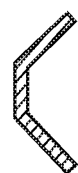
FIG. 37A is a cross-sectional view of the sample support rack of FIG. 37.
Figure 38:
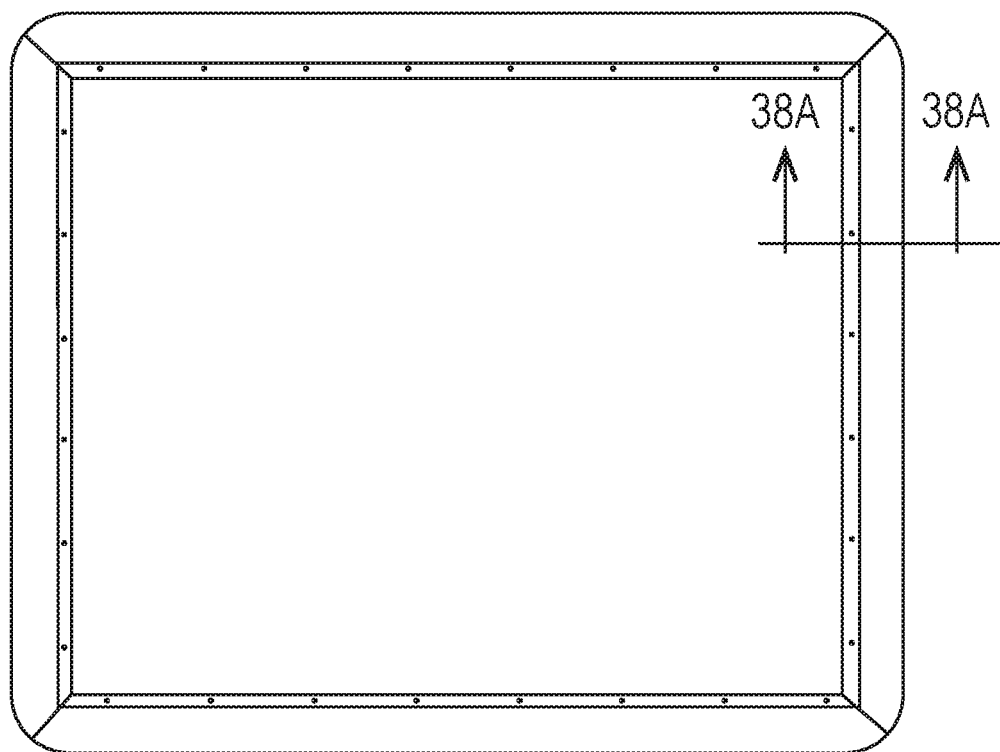
FIG. 38 is an example of a sample support rack cover used in the HFS and VFS Test Methods.
Figure 38A:
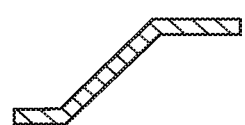
FIG. 38A is a cross-sectional view of the sample support rack cover of FIG. 38.

2) A sample support rack (FIGS. 37, 37A) and sample support rack cover (FIGS. 38, 38A) is also required. Both the rack and cover are comprised of a lightweight metal frame, strung with 0.012 in. (0.305 cm) diameter monofilament so as to form a grid as shown in FIGS. 37, 37A. The size of the support rack and cover is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

Eight samples of a fibrous structure to be tested are carefully weighed on the balance to the nearest 0.01 grams. The dry weight of each sample is reported to the nearest 0.01 grams. The empty sample support rack is placed on the balance with the special balance pan described above. The balance is then zeroed (tared). One sample is carefully placed on the sample support rack. The support rack cover is placed on top of the support rack. The sample (now sandwiched between the rack and cover) is submerged in the water reservoir. After the sample is submerged for 60 seconds, the sample support rack and cover are gently raised out of the reservoir.

The sample, support rack and cover are allowed to drain horizontally for 120±5 seconds, taking care not to excessively shake or vibrate the sample. While the sample is draining, the rack cover is carefully removed and all excess water is wiped from the support rack. The wet sample and the support rack are weighed on the previously tared balance. The weight is recorded to the nearest 0.01 g. This is the wet weight of the sample.

The gram per fibrous structure sample absorptive capacity of the sample is defined as (wet weight of the sample−dry weight of the sample). The horizontal absorbent capacity (HAC) is defined as: absorbent capacity=(wet weight of the sample−dry weight of the sample)/(dry weight of the sample) and has a unit of gram/gram.

Vertical Full Sheet (VFS) Test Method

The Vertical Full Sheet (VFS) test method determines the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a vertical position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the VFS capacity of fibrous structures comprises the following:

1) An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the sample tested (i.e.; a fibrous structure sample of about 11 in. (27.9 cm) by 11 in. (27.9 cm)). The balance pan can be made out of a variety of materials. Plexiglass is a common material used.

2) A sample support rack (FIGS. 37, 37A) and sample support rack cover (FIGS. 38, 38A) is also required. Both the rack and cover are comprised of a lightweight metal frame, strung with 0.012 in. (0.305 cm) diameter monofilament so as to form a grid as shown in FIGS. 37, 37A. The size of the support rack and cover is such that the sample size can be conveniently placed between the two.

The VFS test is performed in an environment maintained at 23±1° C. and 50±2% relative humidity. A water reservoir or tub is filled with distilled water at 23±1° C. to a depth of 3 inches (7.6 cm).

Eight 19.05 cm (7.5 inch)×19.05 cm (7.5 inch) to 27.94 cm (11 inch)×27.94 cm (11 inch) samples of a fibrous structure to be tested are carefully weighed on the balance to the nearest 0.01 grams. The dry weight of each sample is reported to the nearest 0.01 grams. The empty sample support rack is placed on the balance with the special balance pan described above. The balance is then zeroed (tared). One sample is carefully placed on the sample support rack. The support rack cover is placed on top of the support rack. The sample (now sandwiched between the rack and cover) is submerged in the water reservoir. After the sample is submerged for 60 seconds, the sample support rack and cover are gently raised out of the reservoir.

The sample, support rack and cover are allowed to drain vertically for 60±5 seconds, taking care not to excessively shake or vibrate the sample. While the sample is draining, the rack cover is carefully removed and all excess water is wiped from the support rack. The wet sample and the support rack are weighed on the previously tared balance. The weight is recorded to the nearest 0.01 g. This is the wet weight of the sample.

The procedure is repeated for with another sample of the fibrous structure, however, the sample is positioned on the support rack such that the sample is rotated 90° compared to the position of the first sample on the support rack.

The gram per fibrous structure sample absorptive capacity of the sample is defined as (wet weight of the sample−dry weight of the sample). The calculated VFS is the average of the absorptive capacities of the two samples of the fibrous structure.

Wet Burst Test Method

This Wet Burst Test Method measures the push through force required to burst wetted fibrous structures using a tensile tester with the appropriate attachments (ex: Thwing-Albert EJA Vantage Burst Tester) and run at a speed of 12.7 cm/second. A useable unit here is one finished product unit, regardless of the number of plies. Cut samples into squares or rectangles not less than 28 cm per side, in replicates of 4 per sample.

Fill a sample pan with distilled or deionized water to a depth of 2.54 cm. Holding a sample by the outermost edges, dip the center of the sample into the pan, leaving the sample in the water for 4±0.5 seconds. Remove the sample and drain in a vertical position for 3±0.5 seconds. Immediately center the wet sample on the lower ring of the sample holding device, with the outside surface positioned away from the burst device. The sample must be large enough to allow clamping without slippage. Lower the upper ring of the pneumatic holding device to secure the sample. The test measurement starts at a pre-tension of 4.45 g. Start the plunger and record the maximum force when the plunger ruptures the sample. The test is over when the load falls 20 g from the peak force.

Some Burst testers use an upward force measurement and some a downward force measurement. For the former, take care to deduct the sample weight that adds to the upward force used to burst.

In some cases, it is desirable to measure an aged sample to better predict product performance after aging in a warehouse, during shipping or in the marketplace. One way to rapidly age a sample is attach a paperclip to an outer edge of the 4 replicate stack, fan out the unclipped end of the sample stack and suspend them in a forced draft oven set to 105±1° C. for 5 minutes±10 seconds. Remove the sample stack from the oven and cool for a minimum of 3 minutes before testing.

Calculations:

$$\text{Wet Burst} = \frac{\Sigma \text{ peak load readings}}{\text{\# replicates}}$$

The Wet Burst Energy Absorption (BEA) is the area of the wet stress/strain curve between pre-tension and peak load.

Dry Burst Test Method

The Dry Burst Test Method is similar to the Wet Burst Test Method previously described. Samples are cut as in the Wet Burst method and tested dry, in replicates of 4.

Calculations:

$$\text{Dry Burst} = \frac{\Sigma \text{ peak load readings}}{\text{\# replicates}}$$

The Dry Burst Energy Absorption (BEA) is the area of the dry stress/strain curve between pre-tension and peak load.

Burst Area Test Method

To determine the Burst Area of a sample, for example a fibrous structure, such as a sanitary tissue product, the Wet Burst of the sample is measured according to the Wet Burst Test Method described herein and the Basis Weight of the sample is measured according to the Basis Weight Test Method described herein.

Burst Area of a sample is calculated as follows:

$$\text{Burst Area} = \frac{\text{Wet Burst of Sample}}{\text{Basis Weight of Sample}}$$

Roll Firmness Test Method

Roll Firmness is measured on a constant rate of extension tensile tester with computer interface (a suitable instrument is the MTS Alliance using Testworks 4.0 Software, as available from MTS Systems Corp., Eden Prairie, Minn.) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2° C. and 50%±2% relative humidity.

Figure 39:
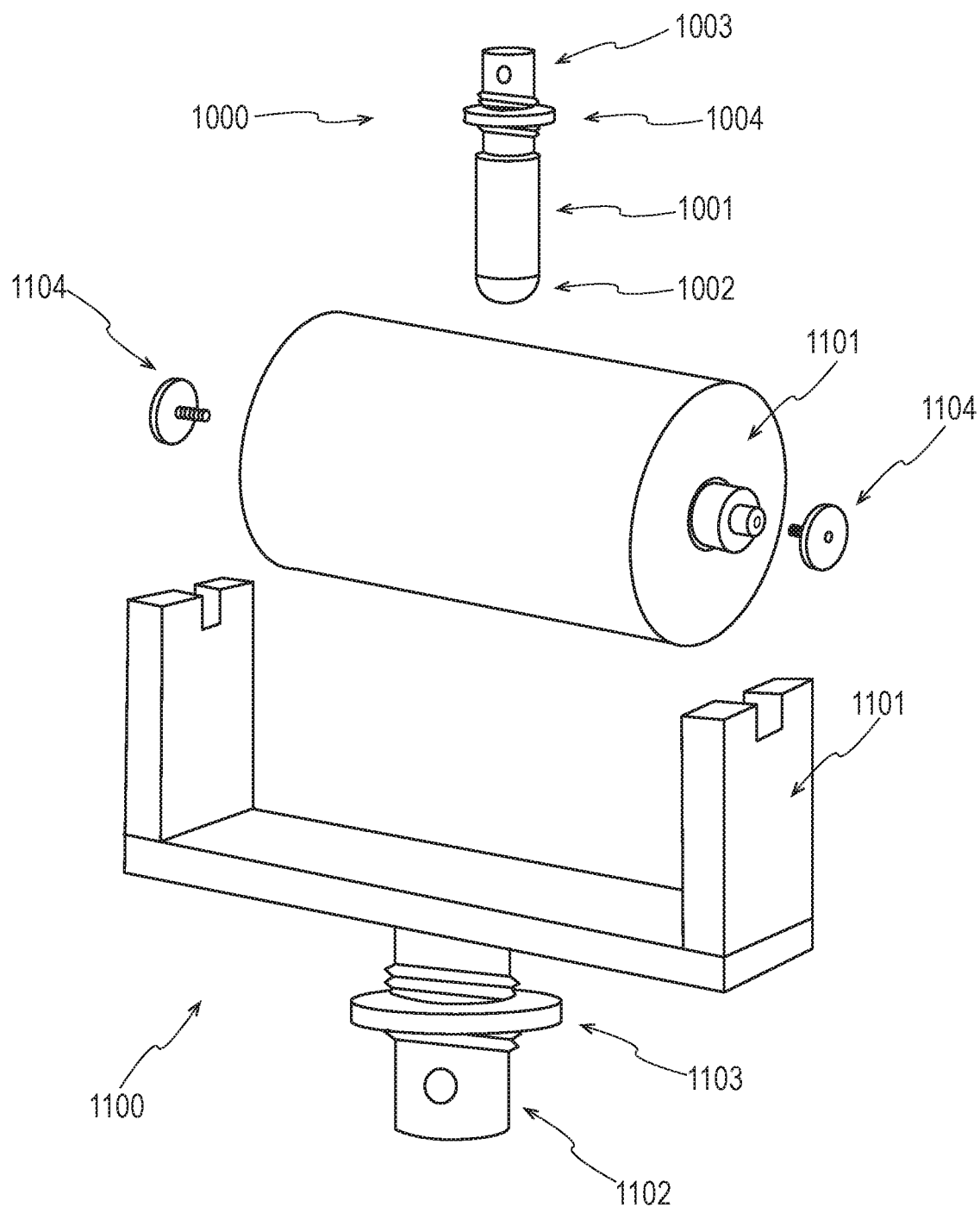
FIG. 39 is setup used in the Roll Firmness Test Method.

Referring to FIG. 39 below, the upper movable fixture 1000 consist of a cylindrical probe 1001 made of machined aluminum with a 19.00±0.05 mm diameter and a length of 38 mm. The end of the cylindrical probe 1002 is hemispheric (radius of 9.50±0.05 mm) with the opposing end 1003 machined to fit the crosshead of the tensile tester. The fixture includes a locking collar 1004 to stabilize the probe and maintain alignment orthogonal to the lower fixture. The lower stationary fixture 1100 is an aluminum fork with vertical prongs 1101 that supports a smooth aluminum sample shaft 1101 in a horizontal position perpendicular to the probe. The lower fixture has a vertical post 1102 machined to fit its base of the tensile tester and also uses a locking collar 1103 to stabilize the fixture orthogonal to the upper fixture.

The sample shaft 1101 has a diameter that is 85% to 95% of the inner diameter of the roll and longer than the width of the roll. The ends of sample shaft are secured on the vertical prongs with a screw cap 1104 to prevent rotation of the shaft during testing. The height of the vertical prongs 1101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Return the crosshead to the original gage length.

Remove all of the test rolls from their packaging and allow them to condition at about 23° C.±2° C. and about 50%±2% relative humidity for 2 hours prior to testing. Rolls with cores that are crushed, bent or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read at the data point closest to 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm.

Wet Web-Web CoF Test Method

This method measures wet coefficient of friction ("CoF") of a fibrous structure, for example a multi-ply fibrous structure-containing article, using a Thwing-Albert Vantage Materials Tester with a 5N load cell, along with a horizontal platform, pulley, and connecting wire (Thwing-Albert item #769-3000). The platform is horizontally level, 50.8 cm long, by 15.24 cm wide. The pulley is secured to the platform directly below the load cell in a position such that the connecting wire is vertically straight from its load cell connection point to its contact with the pulley, and horizontally level from the pulley to a Plexiglas sled. A sheet of abrasive cloth (utility cloth sheet, aluminum oxide P120) 7.62 cm wide by 15.24 cm long is adhered to the central region of testing platform (long side parallel to long dimension of platform).

The Plexiglas sled (2.9 cm in length, 2.54 cm in width, 1.0 cm in height, with a leading edge round curve (0.3 cm radius) extending from the bottom of the front of the sled with the radius extending from the center of a 0.08 cm diameter hole cut through the width of the sled at a point 0.3 cm from bottom of sled and 0.3 cm from leading edge of sled. The sled handle is connected through the 0.08 cm diameter hole drilled though the sled. A 0.08 cm diameter stainless steel wire is bent in a triangular shape for attaching the o-ring of the connecting wire to the sled. A 2.54 cm wide strip of abrasive cloth (utility cloth sheet, aluminum oxide P120) is adhered to the sled from the trailing edge of the bottom face, around the leading edge, to the trailing edge on the top face. The edges of the sled and the abrasive cloth should be flush. The complete sled apparatus (minus the extra weights, described below) should weigh 9.25 (+/−2) grams.

Other equipment and supplies include a weight: 200 g cylindrical shaped, 2.86 cm diameter and 3.81 cm tall; a calibrated adjustable pipette, capable of delivering between 0 to 1 milliliters of volume, accurate to 0.005 ml; deionized (DI) water; and a top loading balance with a minimum resolution of 0.001 g.

The wet web-to-web CoF, as described here, is measured by rubbing one stack of wet usable unit (uu) material against another stack of wet uu material, at a speed of 15.24 cm/min, over two intervals of distance of 1.27 cm each. The average of the two peak forces (one from each 1.27 cm interval) is divided by the normal force applied to obtain a wet web-to-web CoF reading.

Cut two or more strips from a usable unit (uu) of sample to be tested, 5.0-6.5 cm long in the MD, and 2.54 (+/−0.05) cm wide in the CD (all cut strips should be the exact same dimensions). Stack the strips on top one another, with the sample sides of interest facing outwards. The number of strips used in the stack depends on the uu basis weight, according to the following calculation (INT function rounds down to the nearest integer):

$$N_{strips} = \text{INT}(70/BW_{uu}) + 1$$

where: Nstrips=Number of uu strips in stack
BW$_{uu}$=basis weight of usable unit in grams per square meter (gsm).

This stack is henceforth referred to as the "sled-stack". Cut another equal number of strips from one or more uus of test material, 7.5-10 cm long in the MD, and 4.5-6.5 cm wide in the CD (all cut strips should be the exact same dimensions). Stack these strips on top one another, with the sample sides of interest facing outward, and all edges aligned on top one another. This stack is referred to henceforth as the "base-stack".

Using the calibrated balance, measure the weight (to the nearest 0.001 g) of the sled-stack ($W_{sled-stack1}$), then the base-stack ($W_{base-stack}$). Place the "sled-stack" on the bottom (rounded) side of sled (i.e., the side with the abrasive surface), with one short-side end aligned with the trailing end of the sled. Place the "base stack" on the abrasive fabric adhered to the testing platform, with its long side parallel to the long-side of the abrasive fabric.

Add DI water in the amount of 4.0 times the dry mass of each stack. Use a calibrated pipette, and adjust to nearest 0.005 ml. Deliver the liquid one drop at a time, in such a way that the exposed stack surface receives an equal distribution of the total volume.

Gently wrap the wetted "sled stack" around the sled (through the wire sled handle), ensuring that the back edge of the stack is flush with the trailing edge of the sled, wrinkle-free, and not overly strained.

Next, gently place the sled (with stack attached) down on top of the wetted "base web" in a position such that the sled's trailing edge is between 1-1.5 cm from the back edge of the "base stack" (i.e., edge furthest from pulley).

After ensuring that the connecting wire is aligned properly in the pulley groove, attach the connecting-wire loop to the sled hook. The force reading on the instrument may show a little tension –20 grams or less.

Place 200 g weight on top of the sled, positioned such that the back edge of the weight is even with the back (trailing) edge of the sled.

Set the program to move the cross-head at a speed of 15.24 cm/min for a distance of 1.27 cm (Pull #1), collecting data at a rate of 25 data points/sec. After Pull #1, the cross-head pauses for 10 seconds, then restarts again at 1.27 cm/min for another 0.5 inches (Pull #2). The script captures the peak force from pull #1 and #2, calculates an average of the 2 peaks, and divides this value by the normal force applied (e.g., 200 g weight plus the ≈9 g sled weight). Repeat the measurement three more times. Reported value is the average of the four. The Wet Web-Web COF Values are reported in g/g to the nearest 0.01 g/g.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply fibrous structure-containing article comprising a plurality of fibrous elements, wherein the article comprises two or more fibrous structure plies, wherein at least one of the two or more fibrous structure plies comprises paper, wherein a surface of the paper comprises a plurality of filaments, wherein at least one of the two or more fibrous structure plies is embossed, and wherein the two or more fibrous structure plies are bonded together such that the article exhibits one or more of the following bulk characteristics selected from the group consisting of:
   a. a Dry Thick Compression of greater than 2450 µm as measured according to the Surface Texture Analysis Test Method;
   b. a Dry Thick Compressive Recovery of greater than 1600 µm as measured according to the Surface Texture Analysis Test Method;
   c. a Wet Thick Compression of greater than 1800 µm as measured according to the Surface Texture Analysis Test Method;
   d. a Wet Thick Compressive Recovery of greater than 850 µm as measured according to the Surface Texture Analysis Test Method; and
   e. combinations thereof.

2. The article according to claim 1 wherein the article further exhibits
   a. one or more absorbent characteristics selected from the group consisting of:
      i. HFS of greater than 17 g/g as measured according to the HFS Test Method;
      ii. CRT Rate of greater than 0.35 g/second as measured according to the CRT Test Method;
      iii. CRT Capacity of greater than 14 g/g as measured according to the CRT Test Method;
      iv. CRT Area of greater than 0.59 g/in$^2$ as measured according to the CRT Test Method; and
      v. a Pore Volume Distribution such that greater than 15% of the total pore volume present in the article exists in pores of radii of greater than 225 µm as measured according to the Pore Volume Distribution Test Method; and
      vi. a Pore Volume Distribution such that greater than 6% of the total pore volume present in the article exists in pores of radii of from 301 to 600 µm as measured according to the Pore Volume Distribution Test Method.

3. The article according to claim 1 wherein the article further exhibits
   a. one or more of the following article properties:
      i. one or more wet strength properties selected from the group consisting of:
         (1). Geometric Mean Wet TEA of greater than 30 g/cm*% as measured according to the Wet Tensile Test Method;
         (2). Wet Burst:Dry Burst Ratio of greater than 0.5 as measured according to the Wet Burst Test Method and the Dry Burst Test Method;
         (3). Wet BEA of greater than 10 g-in/in$^2$ as measured according to the Wet Burst Test Method;
         (4). Wet MD Tensile of greater than 420 g/in as measured according to the Wet Tensile Test Method; and
         (5). Wet Burst of greater than 450 g as measured according to the Wet Burst Test Method;
      ii. a VFS of greater than 11 g/g as measured according to the VFS Test Method;

iii. a Pore Volume Distribution such that greater than 5% of the total pore volume present in the article exists in pores of radii from 2.5 to 30 μm as measured according to the Pore Volume Distribution Test Method;

iv. one or more softness properties selected from the group consisting of:
(1). an Overhang Length of less than 10.6 cm as measured according to the Flexural Rigidity Test Method;
(2). a Plate Stiffness:Basis Weight of less than 0.20 as measured according to the Plate Stiffness and Basis Weight Test Methods;
(3). a Bending Modulus of less than 9.0 as measured according to the Flexural Rigidity Test Method;
(4). a TS7 Value of less than 17.0 dB-vrms as measured according to the Emtec Test Method;
(5). a TS750 Value of greater than 20.0 dB-vrms as measured according to the Emtec Test Method; and
(6). a Geometric Mean Dry Modulus of less than 2250 g/cm at 15 g/cm as measured according to the Dry Tensile Test Method.

4. The article according to claim 1 wherein the article exhibits a Core Height Value of greater than 0.60 mm as measured according to the Surface Texture Analysis Test Method.

5. The article according to claim 1 wherein the article exhibits a Core Height Difference Value of greater than 0.50 mm as measured according to the Surface Texture Analysis Test Method.

6. The article according to claim 1 wherein the article further comprises a non-embossed fibrous structure ply.

7. The article according to claim 1 wherein at least one of the fibrous structure plies is direct formed.

8. The article according to claim 1 wherein the embossed fibrous structure ply is direct formed.

9. The article according to claim 1 wherein the article is in roll form.

10. The article according to claim 1 wherein the fibrous elements comprise a plurality of filaments.

11. The article according to claim 1 wherein the fibrous elements comprise a plurality of fibers.

12. The article according to claim 1 wherein the fibrous elements comprises a plurality of fibers and filaments commingled together.

13. The article according to claim 1 wherein the paper comprises a wet-laid fibrous structure web.

14. The article according to claim 13 wherein the article comprises a multi-fibrous element fibrous structure web associated with the wet-laid fibrous structure web along an interface comprising the wet-laid fibrous structure web and the multi-fibrous element fibrous structure web.

15. The article according to claim 13 wherein the wet-laid fibrous structure web is a through-air dried wet-laid fibrous structure web.

16. The article according to claim 1 wherein at least one of the fibrous structure plies comprises a co-formed fibrous structure web.

17. The article according to claim 1 wherein at least two of the fibrous structure plies are different from each other.

18. The article according to claim 1 wherein the article exhibits two different exterior surfaces.

19. The article according to claim 18 wherein at least one of the article's exterior surfaces comprises embossments and the other exterior surface is non-embossed.

20. The article according to claim 18 wherein at least one of the article's exterior surfaces comprises fibers and the other exterior surface comprises filaments.

* * * * *